US009582805B2

(12) United States Patent
Jung et al.

(10) Patent No.: US 9,582,805 B2
(45) Date of Patent: Feb. 28, 2017

(54) RETURNING A PERSONALIZED ADVERTISEMENT

(75) Inventors: Edward K.Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 943 days.

(21) Appl. No.: 12/001,759

(22) Filed: Dec. 11, 2007

(65) Prior Publication Data

US 2009/0112656 A1    Apr. 30, 2009

Related U.S. Application Data

(63) Continuation-in-part of application No. 11/977,752, filed on Oct. 24, 2007, and a continuation-in-part of application No. 11/977,748, filed on Oct. 25, 2007, and a continuation-in-part of application No. 11/978,206, filed on Oct. 26, 2007, now Pat. No. 8,112,407, and a continuation-in-part of application No. 11/978,534, filed on Oct. 27, 2007, now Pat. No. 8,126,867, and a continuation-in-part of application No. 11/980,321, filed on Oct. 29, 2007, now Pat. No. 8,234,262, and a continuation-in-part of application
(Continued)

(51) Int. Cl.
G06Q 30/00    (2012.01)
G06Q 30/02    (2012.01)

(52) U.S. Cl.
CPC ......... *G06Q 30/02* (2013.01); *G06Q 30/0203* (2013.01)

(58) Field of Classification Search
CPC combination set(s) only.
See application file for complete search history.

(56) References Cited

U.S. PATENT DOCUMENTS 4,075,657 A  *  2/1978  Weinblatt .................. 348/78
4,670,798 A     6/1987  Campbell et al.
(Continued)

FOREIGN PATENT DOCUMENTS

WO    WO 2007/088536 A2    8/2007

OTHER PUBLICATIONS

U.S. Appl. No. 11/981,573, Jung et al.
(Continued)

*Primary Examiner* — Matthew T Sittner

(57) ABSTRACT

Provided embodiments include a device, apparatus, system, computer program product, and method. A provided method includes receiving from a requestor device a marketing impact information indicative of a physiological response by a person to a general advertisement. The method also includes acquiring an indication of a characteristic of the general advertisement. The method further includes initiating a selection of a targeted-advertisement by an advertising rule responsive to at least the characteristic of the general advertisement and the marketing impact information. The method also includes returning an indication of the targeted-advertisement. The method may include analyzing the marketing impact information for an indication of a reaction by the person to the general advertisement.

40 Claims, 69 Drawing Sheets

Related U.S. Application Data

No. 11/981,573, filed on Oct. 30, 2007, and a continuation-in-part of application No. 11/983,406, filed on Nov. 7, 2007, now Pat. No. 8,001,108, and a continuation-in-part of application No. 11/998,820, filed on Nov. 30, 2007, and a continuation-in-part of application No. 11/998,826, filed on Nov. 30, 2007, and a continuation-in-part of application No. 11/998,779, filed on Nov. 30, 2007.

(56) References Cited

U.S. PATENT DOCUMENTS

| | | |
|---|---|---|
| 4,931,865 A | 6/1990 | Scarampi |
| 4,984,098 A | 1/1991 | Buntsis |
| 5,117,407 A | 5/1992 | Vogel |
| 5,227,874 A | 7/1993 | Von Kohorn |
| 5,471,542 A | 11/1995 | Ragland |
| 5,485,139 A | 1/1996 | Tarnovsky |
| 5,657,004 A | 8/1997 | Whittaker et al. |
| 5,676,138 A | 10/1997 | Zawilinski |
| 5,731,805 A | 3/1998 | Tognazzini et al. |
| 5,796,343 A | 8/1998 | Stauder |
| 5,923,252 A | 7/1999 | Sizer et al. |
| 5,982,357 A | 11/1999 | Burgett et al. |
| 6,064,383 A | 5/2000 | Skelly |
| 6,118,888 A | 9/2000 | Chino et al. |
| 6,190,314 B1 | 2/2001 | Ark et al. |
| 6,219,657 B1 | 4/2001 | Hatayama |
| 6,393,136 B1 | 5/2002 | Amir et al. |
| 6,401,050 B1 | 6/2002 | Cooke et al. |
| 6,453,194 B1 | 9/2002 | Hill |
| 6,456,262 B1 | 9/2002 | Bell |
| 6,520,905 B1 | 2/2003 | Surve et al. |
| 6,577,329 B1 | 6/2003 | Flickner et al. |
| 6,585,521 B1 | 7/2003 | Obrador |
| 6,601,021 B2 | 7/2003 | Card et al. |
| 6,606,605 B1 | 8/2003 | Kolls |
| 6,622,140 B1 | 9/2003 | Kantrowitz |
| 6,637,883 B1 | 10/2003 | Tengshe et al. |
| 6,651,045 B1 | 11/2003 | Macaulay |
| 6,656,116 B2 | 12/2003 | Kim et al. |
| 6,687,608 B2 | 2/2004 | Sugimoto et al. |
| 6,704,034 B1 | 3/2004 | Rodriguez et al. |
| 6,708,176 B2 | 3/2004 | Strunk et al. |
| 6,731,307 B1 | 5/2004 | Strubbe et al. |
| 6,807,532 B1 | 10/2004 | Kolls |
| 6,807,675 B1 | 10/2004 | Maillard et al. |
| 6,816,802 B2 | 11/2004 | Kim et al. |
| 6,847,992 B1 | 1/2005 | Haitsuka et al. |
| 6,873,314 B1 | 3/2005 | Campbell |
| 6,874,127 B2 | 3/2005 | Newell et al. |
| 6,904,408 B1 * | 6/2005 | McCarthy ............ A61B 5/6815 705/2 |
| 6,968,334 B2 | 11/2005 | Salmenkaita et al. |
| 7,010,497 B1 | 3/2006 | Nyhan et al. |
| 7,100,818 B2 | 9/2006 | Swaine |
| 7,120,880 B1 | 10/2006 | Dryer et al. |
| 7,169,113 B1 | 1/2007 | Young |
| 7,181,693 B1 | 2/2007 | Anderson et al. |
| 7,197,472 B2 | 3/2007 | Conkwright et al. |
| 7,225,142 B1 | 5/2007 | Apte et al. |
| 7,228,327 B2 | 6/2007 | Shuster |
| 7,260,551 B2 | 8/2007 | Phillips |
| 7,292,252 B2 | 11/2007 | Matsuda |
| 7,356,547 B2 | 4/2008 | Ozer et al. |
| 7,363,282 B2 | 4/2008 | Karnawat et al. |
| 7,418,405 B1 | 8/2008 | Utter et al. |
| 7,460,150 B1 | 12/2008 | Coughlan et al. |
| 7,472,102 B1 | 12/2008 | Heckerman et al. |
| 7,495,659 B2 | 2/2009 | Marriott et al. |
| 7,503,653 B2 | 3/2009 | Endrikhovski et al. |
| 7,547,279 B2 | 6/2009 | Kim et al. |
| 7,555,287 B1 | 6/2009 | Heinonen et al. |
| 7,562,064 B1 | 7/2009 | Chickering et al. |
| 7,590,619 B2 | 9/2009 | Hurst-Hiller et al. |
| 7,590,723 B2 | 9/2009 | Mager et al. |
| 7,599,918 B2 | 10/2009 | Shen et al. |
| 7,636,672 B2 | 12/2009 | Angles et al. |
| 7,679,579 B2 | 3/2010 | Minatogawa |
| 7,689,672 B2 | 3/2010 | Kanojia et al. |
| 7,702,318 B2 | 4/2010 | Ramer et al. |
| 7,703,114 B2 | 4/2010 | Thukral |
| 7,703,611 B1 | 4/2010 | Appelman et al. |
| 7,720,784 B1 | 5/2010 | Froloff |
| 7,742,037 B2 | 6/2010 | Sako et al. |
| 7,760,910 B2 | 7/2010 | Johnson et al. |
| 7,762,665 B2 | 7/2010 | Vertegaal et al. |
| 7,764,311 B2 | 7/2010 | Bill |
| 7,769,632 B2 | 8/2010 | Giraud et al. |
| 7,769,764 B2 | 8/2010 | Ramer et al. |
| 7,779,436 B1 | 8/2010 | Kamen et al. |
| 7,836,481 B1 | 11/2010 | Hendricks |
| 7,839,423 B2 | 11/2010 | Ishiyama |
| 7,844,488 B2 | 11/2010 | Merriman et al. |
| 7,865,404 B2 | 1/2011 | Peckover |
| 7,874,983 B2 | 1/2011 | Zancho et al. |
| 7,881,493 B1 | 2/2011 | Edwards et al. |
| 7,904,439 B2 | 3/2011 | Horvitz et al. |
| 7,907,940 B2 | 3/2011 | Ramer et al. |
| 7,908,150 B2 | 3/2011 | Rochet |
| 7,930,199 B1 | 4/2011 | Hill |
| 7,930,206 B2 | 4/2011 | Koningstein |
| 7,931,602 B2 | 4/2011 | Kayahara et al. |
| 8,126,220 B2 | 2/2012 | Greig |
| 8,235,725 B1 | 8/2012 | Hill |
| 8,244,537 B2 | 8/2012 | Kondo et al. |
| 8,269,834 B2 | 9/2012 | Albertson et al. |
| 8,407,055 B2 | 3/2013 | Asano et al. |
| 8,473,044 B2 | 6/2013 | Lee et al. |
| 8,611,919 B2 * | 12/2013 | Barnes, Jr. ......... G06Q 10/1053 455/456.1 |
| 2001/0044751 A1 | 11/2001 | Pugliese, III et al. |
| 2001/0048439 A1 | 12/2001 | Young |
| 2002/0030163 A1 | 3/2002 | Zhang |
| 2002/0059370 A1 | 5/2002 | Shuster |
| 2002/0072952 A1 | 6/2002 | Hamzy et al. |
| 2002/0107718 A1 | 8/2002 | Morrill et al. |
| 2002/0112035 A1 | 8/2002 | Carey et al. |
| 2002/0127623 A1 | 9/2002 | Minshull et al. |
| 2002/0130898 A1 | 9/2002 | Ogawa et al. |
| 2002/0139842 A1 | 10/2002 | Swaine |
| 2002/0173958 A1 | 11/2002 | Asano et al. |
| 2002/0174425 A1 | 11/2002 | Markel et al. |
| 2002/0184098 A1 | 12/2002 | Giraud et al. |
| 2003/0001846 A1 | 1/2003 | Davis et al. |
| 2003/0060728 A1 | 3/2003 | Mandigo |
| 2003/0060897 A1 | 3/2003 | Matsuyama et al. |
| 2003/0078840 A1 | 4/2003 | Strunk et al. |
| 2003/0088463 A1 | 5/2003 | Kanevsky et al. |
| 2003/0128389 A1 | 7/2003 | Matraszek et al. |
| 2003/0135582 A1 | 7/2003 | Allen et al. |
| 2003/0187844 A1 | 10/2003 | Li et al. |
| 2003/0220835 A1 | 11/2003 | Barnes, Jr. |
| 2003/0236582 A1 | 12/2003 | Zamir et al. |
| 2004/0001616 A1 | 1/2004 | Gutta et al. |
| 2004/0092809 A1 | 5/2004 | DeCharms |
| 2004/0101178 A1 | 5/2004 | Fedorovskaya et al. |
| 2004/0148572 A1 | 7/2004 | Nakanishi et al. |
| 2004/0152957 A1 | 8/2004 | Stivoric et al. |
| 2004/0193488 A1 | 9/2004 | Khoo et al. |
| 2004/0242216 A1 | 12/2004 | Boutsikakis |
| 2005/0010637 A1 | 1/2005 | Dempski et al. |
| 2005/0013104 A1 | 1/2005 | Feague et al. |
| 2005/0017870 A1 | 1/2005 | Allison et al. |
| 2005/0021677 A1 | 1/2005 | Musha et al. |
| 2005/0071865 A1 | 3/2005 | Martins |
| 2005/0084259 A1 | 4/2005 | Manico et al. |
| 2005/0108092 A1 | 5/2005 | Campbell et al. |
| 2005/0131744 A1 * | 6/2005 | Brown ................ G06Q 10/10 705/7.29 |
| 2005/0157377 A1 | 7/2005 | Goldman et al. |
| 2005/0172319 A1 | 8/2005 | Reichardt et al. |
| 2005/0223237 A1 | 10/2005 | Barletta et al. |
| 2005/0235338 A1 | 10/2005 | AbiEzzi et al. |

(56) References Cited

U.S. PATENT DOCUMENTS

| | | |
|---|---|---|
| 2005/0277813 A1 | 12/2005 | Katz et al. |
| 2005/0288954 A1 | 12/2005 | McCarthy et al. |
| 2005/0289582 A1 | 12/2005 | Tavares et al. |
| 2006/0053377 A1 | 3/2006 | Newell et al. |
| 2006/0064411 A1 | 3/2006 | Gross et al. |
| 2006/0074883 A1 | 4/2006 | Teevan et al. |
| 2006/0075108 A1 | 4/2006 | Sylvain |
| 2006/0085818 A1 | 4/2006 | Bodlaender et al. |
| 2006/0093998 A1 | 5/2006 | Vertegaal |
| 2006/0122834 A1 | 6/2006 | Bennett |
| 2006/0129457 A1 | 6/2006 | Nyhan et al. |
| 2006/0133586 A1 | 6/2006 | Kasai et al. |
| 2006/0143647 A1* | 6/2006 | Bill ............... G06F 17/30743 725/10 |
| 2006/0146281 A1 | 7/2006 | Goodall et al. |
| 2006/0170945 A1 | 8/2006 | Bill |
| 2006/0179044 A1 | 8/2006 | Rosenberg |
| 2006/0195441 A1 | 8/2006 | Julia et al. |
| 2006/0208085 A1 | 9/2006 | Cohen et al. |
| 2006/0224046 A1* | 10/2006 | Ramadas ............ A61B 5/0002 600/300 |
| 2006/0282309 A1 | 12/2006 | Zhang et al. |
| 2007/0021058 A1* | 1/2007 | Arseneau ............ G06F 1/1626 455/3.06 |
| 2007/0052672 A1 | 3/2007 | Ritter et al. |
| 2007/0055169 A1 | 3/2007 | Lee et al. |
| 2007/0061244 A1 | 3/2007 | Ramer et al. |
| 2007/0061753 A1 | 3/2007 | Ng et al. |
| 2007/0066323 A1 | 3/2007 | Park et al. |
| 2007/0066916 A1 | 3/2007 | Lemos |
| 2007/0104369 A1 | 5/2007 | Weatherhead |
| 2007/0105071 A1 | 5/2007 | Weatherhead |
| 2007/0112758 A1 | 5/2007 | Livaditis |
| 2007/0150916 A1 | 6/2007 | Begole et al. |
| 2007/0162505 A1 | 7/2007 | Cecchi et al. |
| 2007/0167689 A1 | 7/2007 | Ramadas et al. |
| 2007/0168413 A1 | 7/2007 | Barletta et al. |
| 2007/0184420 A1 | 8/2007 | Mathan et al. |
| 2007/0191691 A1 | 8/2007 | Polanco |
| 2007/0205963 A1* | 9/2007 | Piccionelli ............ G09F 19/00 345/7 |
| 2007/0208719 A1 | 9/2007 | Tran |
| 2007/0214471 A1 | 9/2007 | Rosenberg |
| 2007/0220010 A1 | 9/2007 | Ertugrul |
| 2007/0220040 A1 | 9/2007 | Do |
| 2007/0223871 A1 | 9/2007 | Thelen |
| 2007/0233622 A1 | 10/2007 | Willcock |
| 2007/0239847 A1 | 10/2007 | Takehara et al. |
| 2007/0265090 A1 | 11/2007 | Barsness et al. |
| 2007/0265507 A1 | 11/2007 | de Lemos |
| 2007/0287415 A1 | 12/2007 | Yamada |
| 2007/0293731 A1 | 12/2007 | Downs et al. |
| 2007/0294064 A1 | 12/2007 | Shuster |
| 2008/0004989 A1 | 1/2008 | Yi |
| 2008/0052219 A1 | 2/2008 | Sandholm et al. |
| 2008/0065468 A1 | 3/2008 | Berg et al. |
| 2008/0091512 A1* | 4/2008 | Marci ............... G06Q 10/10 705/7.29 |
| 2008/0091515 A1 | 4/2008 | Thieberger et al. |
| 2008/0097854 A1* | 4/2008 | Young ............... G06Q 30/02 705/14.43 |
| 2008/0104045 A1 | 5/2008 | Cohen et al. |
| 2008/0114756 A1 | 5/2008 | Konig et al. |
| 2008/0146892 A1* | 6/2008 | LeBoeuf ............... A61B 5/11 600/300 |
| 2008/0147488 A1 | 6/2008 | Tunick et al. |
| 2008/0162142 A1 | 7/2008 | Yu et al. |
| 2008/0222671 A1* | 9/2008 | Lee ............... H04H 60/31 725/10 |
| 2008/0235284 A1* | 9/2008 | Aarts ............... A61B 5/0533 |
| 2008/0235594 A1 | 9/2008 | Bhumkar et al. |
| 2008/0249838 A1* | 10/2008 | Angell ............... G06Q 30/02 705/7.33 |
| 2008/0255949 A1 | 10/2008 | Genco et al. |
| 2008/0275700 A1 | 11/2008 | Bingley et al. |
| 2008/0281661 A1 | 11/2008 | Young et al. |
| 2008/0295126 A1* | 11/2008 | Lee ............... G06Q 30/02 725/10 |
| 2008/0306913 A1 | 12/2008 | Newman et al. |
| 2008/0313033 A1 | 12/2008 | Guo et al. |
| 2009/0006188 A1 | 1/2009 | Guo et al. |
| 2009/0018911 A1 | 1/2009 | An Chang et al. |
| 2009/0030978 A1 | 1/2009 | Johnson et al. |
| 2009/0062679 A1 | 3/2009 | Tan et al. |
| 2009/0076887 A1 | 3/2009 | Spivack et al. |
| 2009/0089678 A1 | 4/2009 | Sacco et al. |
| 2009/0100015 A1 | 4/2009 | Golan |
| 2009/0112656 A1* | 4/2009 | Jung ............... G06Q 30/0203 705/7.32 |
| 2009/0112693 A1* | 4/2009 | Jung ............... G06Q 30/0269 705/14.66 |
| 2009/0112694 A1* | 4/2009 | Jung ............... G06Q 30/0201 705/7.29 |
| 2009/0112695 A1* | 4/2009 | Jung ............... G06Q 30/02 705/14.66 |
| 2009/0112696 A1 | 4/2009 | Jung et al. |
| 2009/0112713 A1 | 4/2009 | Jung et al. |
| 2009/0132368 A1 | 5/2009 | Cotter et al. |
| 2009/0138565 A1 | 5/2009 | Shiff et al. |
| 2009/0150363 A1 | 6/2009 | Gross et al. |
| 2009/0157813 A1* | 6/2009 | Jung ............... A61B 5/04842 709/204 |
| 2009/0163777 A1* | 6/2009 | Jung ............... A61B 5/04842 600/301 |
| 2009/0164131 A1* | 6/2009 | Jung ............... A61B 5/16 702/19 |
| 2009/0164132 A1* | 6/2009 | Jung ............... A61B 5/744 702/19 |
| 2009/0171164 A1* | 7/2009 | Jung ............... A61B 5/04842 600/300 |
| 2009/0216744 A1 | 8/2009 | Shriwas et al. |
| 2010/0010289 A1* | 1/2010 | Clare ............... A61M 21/00 600/27 |
| 2010/0010366 A1* | 1/2010 | Silberstein ............ A61B 3/113 600/544 |
| 2010/0122178 A1 | 5/2010 | Konig et al. |
| 2010/0174586 A1 | 7/2010 | Berg, Jr. et al. |
| 2010/0250513 A1 | 9/2010 | Guha |
| 2011/0223884 A1 | 9/2011 | Lau et al. |
| 2011/0238657 A1 | 9/2011 | Hammond et al. |

OTHER PUBLICATIONS

U.S. Appl. No. 11/998,779, Jung et al.
U.S. Appl. No. 11/998,826, Jung et al.
U.S. Appl. No. 11/998,820, Jung et al.
U.S. Appl. No. 12/006,792, Jung et al.
U.S. Appl. No. 12/006,793, Jung et al.
U.S. Appl. No. 12/011,031, Jung et al.
"Eye Gaze Tracking"; ISL eye gaze tracking; pp. 1-3; printed on Sep. 19, 2007; located at http://www.is.cs.cmu.edu/mie/eyegaze.html.
"Eye tracking"; Wikipedia.com; bearing dates of Dec. 2006 and Sep. 13, 2007; pp. 1-5; Wikimedia Foundation, Inc.; USA; printed on Sep. 19, 2007; located at http://en.wikipedia.org/wiki/Eye_tracking.
"Happy, sad, angry or astonished?"; Physorg.com; Jul. 3, 2007; pp. 1-2; Physorg.com; printed on Sep. 19, 2007; located at hup://www.physorg.com/news102696772.html.
Kim, Kyung-Nam; Ramakrishna, R.S.; "Vision-Based Eye-Gaze Tracking for Human Computer Interface"; IEEE; 1999; pp. 324-329; IEEE.
Mao, Xiaoyang, et al.; "Gaze-Directed Flow Visualization"; Proc. of SPIE-IS&T Electronic Imaging; bearing a date of 2004; pp. 141-150; vol. 5295; SPIE and IS&T.
"MyTobii 2.3 means new power to communicate"; tobii.com; bearing a date of 2006; p. 1; Tobii Technology AB; printed on Sep. 19, 2007; located at http://www.tobii.com//default.asp? sid=1220.

(56) References Cited

OTHER PUBLICATIONS

MyTobii User Manual, Version 2.3; tobii.com; bearing dates of Apr. 2007 and 2006; pp. 1-86; Tobii Technology AB.

Ohshima, Toshikazu et al.; "Gaze-directed Adaptive Rendering for Interacting with Virtual Space" (abstract only); Proceedings of the 1996 Virtual Reality Annual International Symposium (VRAIS 96); 1996; p. 103 (pp. 1-3 provided); ISBN:0-8186-7295-1; IEEE Computer Society; Washington, DC; USA; printed on Oct. 2, 2007; located at http://portal.acm.org/citation.cfm?id=836033&coll=Portal&dl=GUIDE&CFID=1534099&CFTOKEN=93189133.

Maglio et al.; "Attentive Agents"; Communications of the ACM; bearing a date of Mar. 2003; pp. 47-51; vol. 46, No. 3; ACM.

Maglio et al.; "SUITOR: An Attentive Information System"; IUI 2000; bearing a date of 2000; pp. 169-176; ACM.

Puolamaki et al.; "Combining Eye Movements and Collaborative Filtering for Proactive Information Retrieval"; SIGIR '05; bearing a date of Aug. 15-19, 2005; pp. 146-153; ACM.

Salojarvi et al.; "Implicit Relevance Feedback from Eye Movements"; Artificial Neural Networks: Biological Inspirations-ICANN (as cited by examiner); bearing a date of 2005; pp. 513-518; Lecture Notes in Computer Science vol. 3696 (as cited by examiner); Springer-Verlag Berlin Heidelberg.

Arapakis et al.; "Using Facial Expressions and Peripheral Physiological Signals as Implicit Indicators of Topical Relevance"; proceedings of the 17th ACM International Conference on Multimedia (provided by examiner); Oct. 19-24, 2009; pp. 461-470; ACM.

Kelly et al.; "Biometric Response as a Source of Query Independent Scoring in Lifelog Retrieval"; Lecture Notes in Computer Science; 2010; pp. 520-531; vol. 5993; Springer-Verlag Berlin Heidelberg.

Definition from Your Dictionary Online; "Wearing"; Webster's New World College Dictionary; cited and printed on Oct. 29, 2013; 2 pages (as provided by examiner); Wiley Publishing, Inc.; Cleveland, Ohio, USA; located at: http://www.yourdictionary.com/wearing.

Bayliss, Jessica D.; "Use of the Evoked Potential P3 Component for Control in a Virtual Apartment"; IEEE Transactions on Neural Systems and Rehabilitation Engineering; Jun. 2003; pp. 113-116; vol. 11, No. 2; IEEE.

Sellers et al.; "A P300-based brain-computer interface: Initial tests by ALS patients"; Clinical Neurophysiology; bearing a date of 2006; pp. 538-548; vol. 117; Elsevier Ireland Ltd.

Webster's Desk Dictionary of the English Language; 1983; p. 320, Random House, Inc.

Definition from Webster's Desk Dictionary of the English Language; "static"; Webster's Desk Dictionary of the English Language; 1990; pp. 1-2; Portland House; New York (as provided by examiner).

Izzetoglu et al.; "Functional Near-Infrared Neuroimaging"; IEEE Transactions on Neural Systems and Rehabilitation Engineering; Jun. 2005; pp. 153-159; vol. 13, No. 2; IEEE.

\* cited by examiner

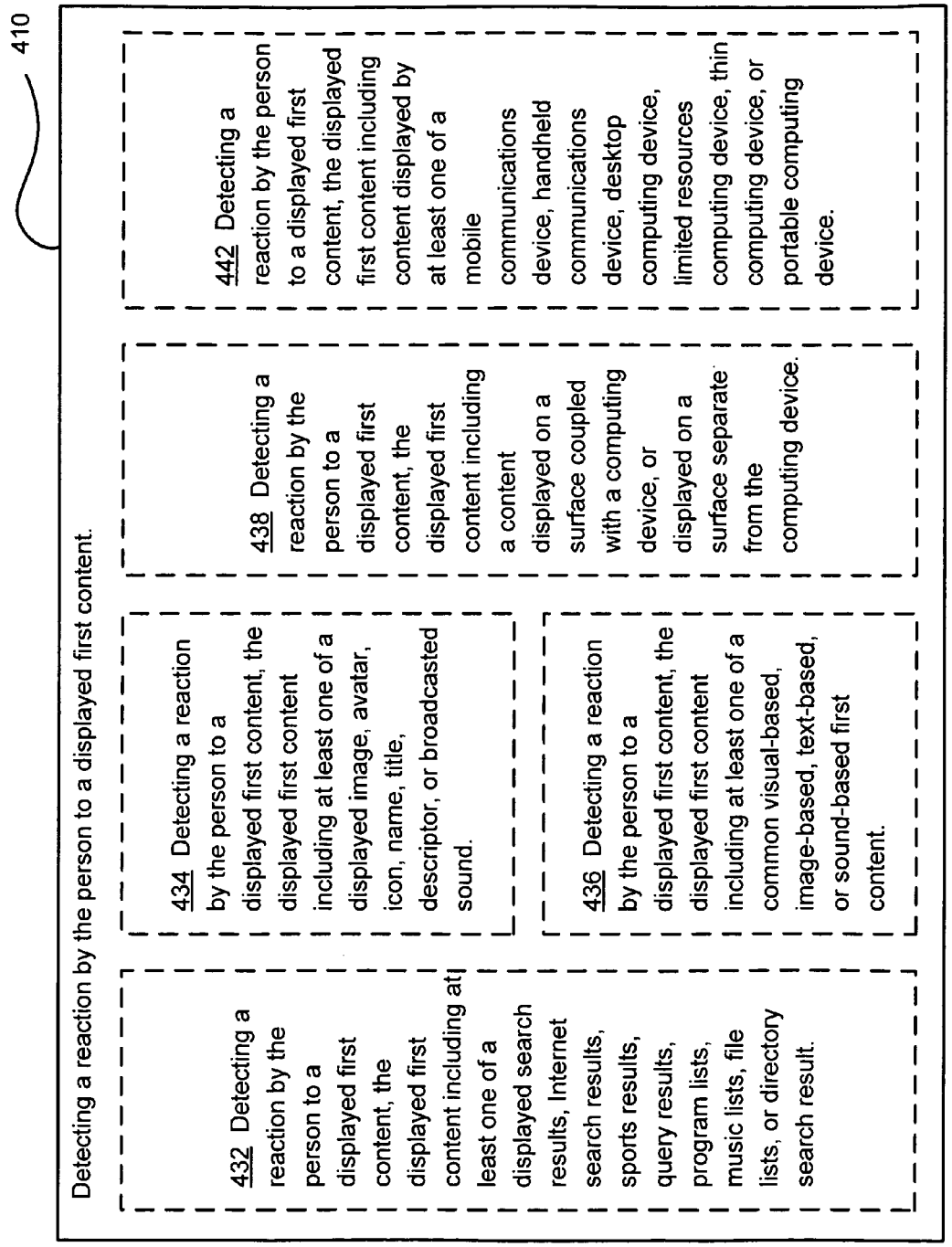

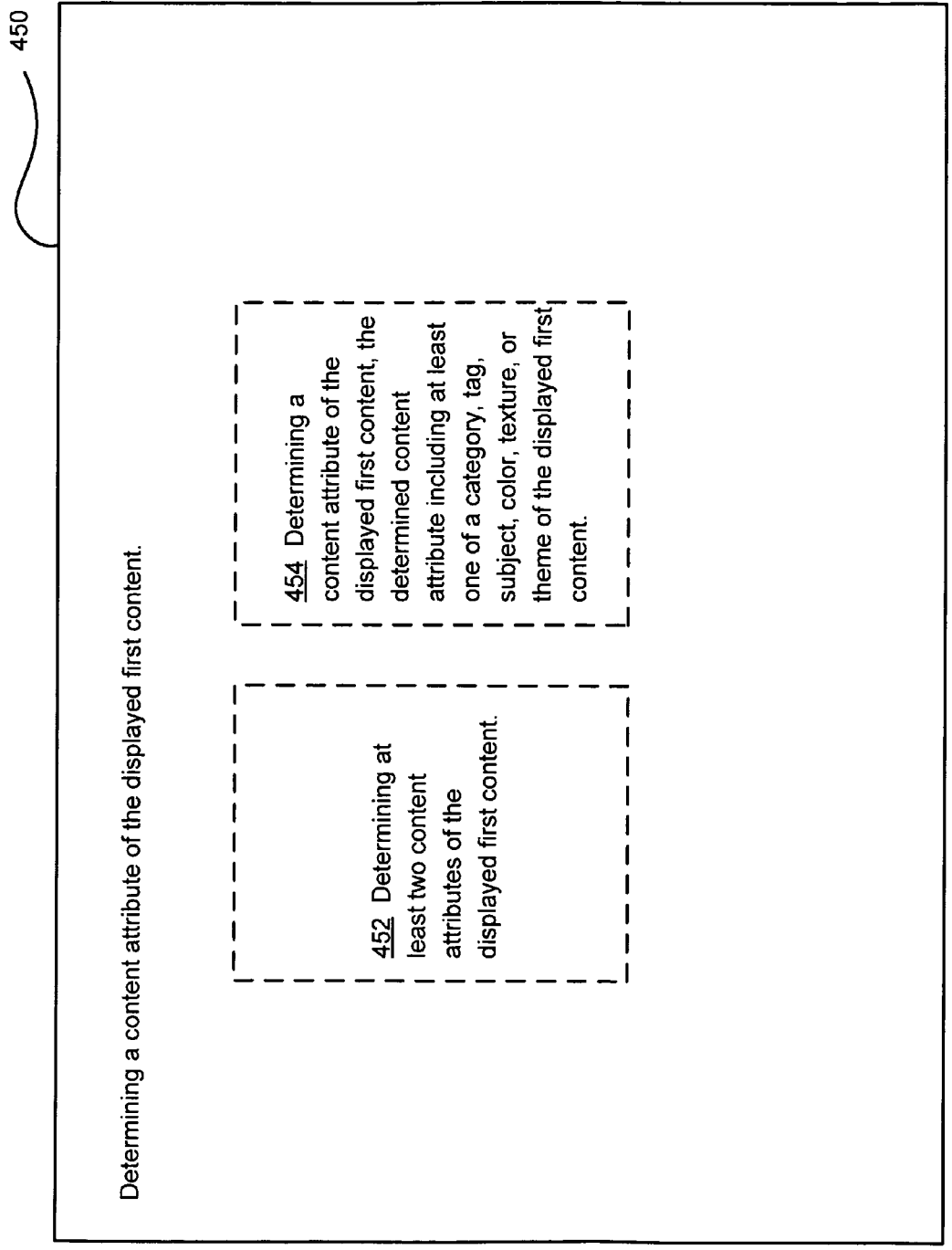

Facilitating a search for a second content based on the detected reaction and on the determined content attribute.

462 Searching a local data store for a second content based on the detected reaction and on the determined content attribute.

464 Facilitating a search by a search engine for a second content based on the detected reaction and on the determined content attribute.

466 Facilitating a search by a Web search engine for a second content based on the detected reaction and on the determined content attribute.

468 Facilitating a search for a second content by a search algorithm responsive to the detected reaction and on the determined content attribute.

472 Facilitating a search for at least two instances of a second content based on the detected reaction and on the determined content attribute.

474 Facilitating a search for a second content based on at least one of a positive correlation, or a negative correlation between the detected reaction and on the determined content attribute.

610 Computer-readable storage medium bearing the program instructions.

620 Program instructions operable to perform a process in a computing device, the process comprising:

detect a reaction by a person to a displayed first content;

determine a content attribute of the displayed first content;

facilitate a search for a second content based on the detected content attribute;

select the second content from a result of the facilitated search; and save data indicative of the selected second content.

622 Facilitating a display of the selected second content.

FIG. 12

705 Electronic device.

710 Means for detecting a reaction by a person to a displayed first content.

720 Means for determining a content attribute of the displayed first content.

730 Means for facilitating a search for a second content based on the detected reaction and on the determined content attribute.

740 Means for displaying the second content in a manner perceivable by the person.

700

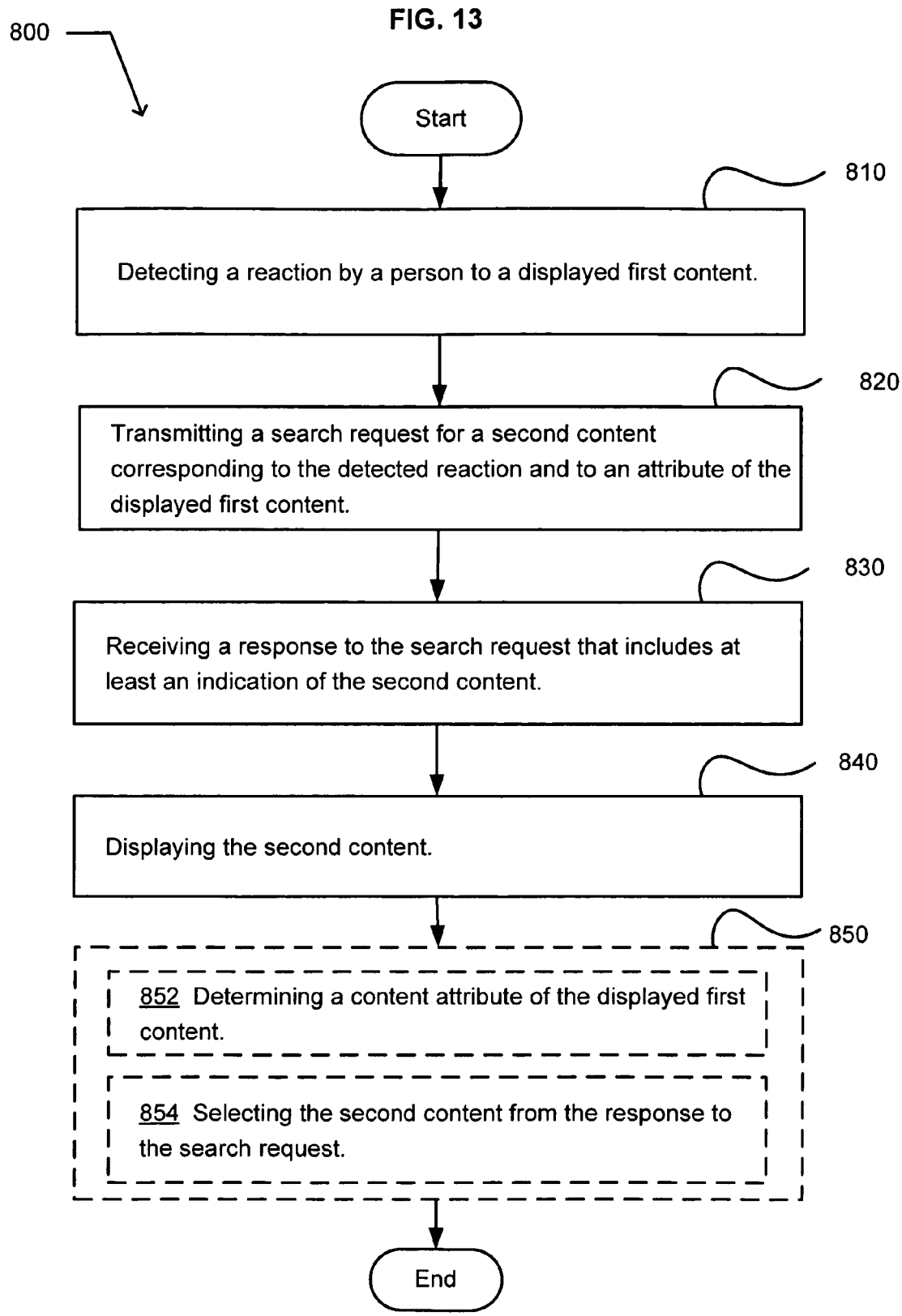

FIG. 14

862 Computer-readable storage medium bearing the program instructions.

864 Program instructions operable to perform a process in a computing device, the process comprising:

detect a reaction by a person to a displayed first content;

transmit a search request for a second content corresponding to the detected reaction and to an attribute of the displayed first content;

receive a response to the search request that includes at least an indication of the second content;

save data indicative of the received response to the search request; and display the second content.

866 Select the second electronic content from the received response to the search request.

1210 Computer-readable medium bearing the program instructions.

1220 Program instructions operable to perform a process in a computing device, the process comprising:
  receive sensor data from a requestor indicative of a response by a person to a viewed first content;
  analyze the received sensor data for an indication of an expression by the person corresponding to the viewed first content;
  facilitate a search of an index for a second content using a search parameter corresponding to the indicated expression and a content attribute of the viewed first content; and
  return to the requestor an indication of the second content.

1222 Select the second content from a result of the search for a second content.
  1224 Save data indicative of the selected second content.

1212 Computer storage medium.

FIG. 20

1305 Electronic device.

1310 Means for receiving data from a requestor indicative of a sensed response by a person to a first content displayed to the person.

1320 Means for analyzing the received data for an indication of an expression by the person corresponding to the first content.

1330 Means for facilitating a search for a second content using a search parameter corresponding to the indication of an expression by the person and a content attribute of the displayed first content.

1340 Means for returning to the requestor an indication of the second content.

1350 Means for receiving an indication of a content attribute of the displayed first content.

1360 Means for determining a content attribute of the displayed first content.

Detecting a reaction by a person to a displayed first content of the at least two instances of displayed content having a common contextual attribute.

1512 At least one of sensing, identifying, or recognizing a reaction by a person to a displayed content of the at least two instances of displayed content having a common contextual attribute.

1516 Sensing a gaze by a person at a displayed first content of the at least two instances of displayed content and detecting a reaction by a person to the displayed first content.

1522 Detecting a physiological response by a person to a displayed first content of the at least two instances of displayed content having a common contextual attribute.

1514 Detecting at least one of a positive or negative reaction by a person to a displayed first content of the at least two instances of displayed content having a common contextual attribute.

1518 Detecting a physiological reaction by a person to a displayed first content of the at least two instances of displayed content having a common contextual attribute.

1524 Detecting a reaction by a person to a displayed first content of the at least two instances of displayed content having a common contextual attribute, the common contextual attribute including the at least two instances of displayed content having been returned in response to a search request.

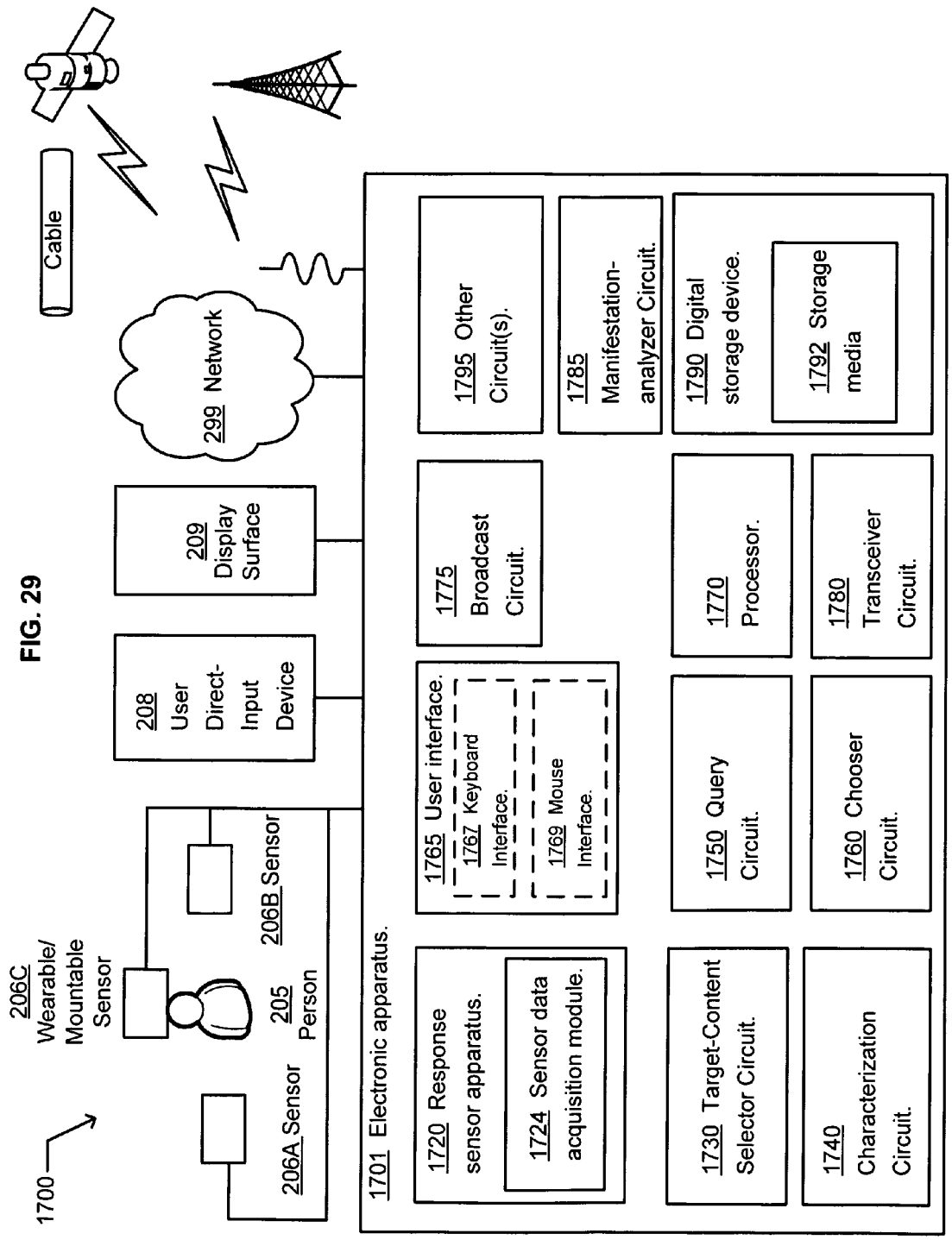

1810 Computer-readable medium bearing the program instructions.

1820 Program instructions operable to perform a process in a computing device, the process comprising:

receive data indicative of respective responses by the person to at least two instances of electronic content being displayed on a surface and having a common contextual attribute;

select a first electronic content as an electronic content of interest over the remaining instances of electronic content based at least in part on the received data;

determine a reaction by the person to the first electronic content and a content attribute of the first electronic content;

initiate a search for a second electronic content based on the determined reaction by the person to the first electronic content and the determined content attribute of the first electronic content;

select the second electronic content from a result of the initiated search; and facilitate a display of the selected second electronic content in a manner perceivable by the person.

1822 Save data indicative of the selected second electronic content.

1812 Computer readable storage medium.

1814 Computer readable communication medium.

2310 Computer-readable medium bearing the program instructions.

2320 Program instructions operable to perform a process in a computing device, the process comprising:

receiving information that is indicative of respective responses by a person to each of at least two instances of electronically displayed content, the received information derived from data acquired by a sensor coupled to the person and sent by a requestor electronic device;

selecting a particular content from the at least two instances of electronically displayed content, the selecting based at least in part on the received information;

facilitating a search for a new content using a search parameter corresponding to a content attribute of the particular content; and returning an indication of the new content to the requestor electronic device.

2322 Receiving information indicative of a content attribute of the particular content.

2324 Determining a content attribute of the particular content.

2326 Analyzing the received information for an indication of a reaction of the person to the particular content.

2328 Receiving information indicative of a common contextual attribute of the at least two instances of electronically displayed content.

2332 Saving data indicative of the new content.

2312 Computer storage medium.

2314 Communication medium.

2405 Electronic apparatus.

2410 Means for receiving information that is indicative of respective responses by a person to each of at least two instances of electronically displayed content, the received information derived from data acquired by a sensor coupled to the person and sent by a requestor electronic device.

2420 Means for selecting a particular content from the at least two instances of electronically displayed content, the selecting based at least in part on the received information.

2430 Means for facilitating a search for a new content using a search parameter corresponding to a content attribute of the particular content.

2440 Means for returning an indication of the new content to the requestor electronic device.

2450 Means for receiving information indicative of a content attribute of the particular content.

2460 Means for determining a content attribute of the particular content.

2470 Means for receiving data indicative of a common contextual attribute of the at least two instances of electronically displayed content.

Generating a marketing impact information indicative of a physiological response by a person to an electronically displayed general advertisement.

2726 Generating a marketing impact information indicative of a response by a person to an electronically displayed general advertisement, the general advertisement electronically displayed using at least one of a screen, a display surface, a projector, or a sound.

2728 Generating a marketing impact information indicative of a response by a person to an electronically displayed general advertisement, the general advertisement including at least one of a promotional content, an offer of a product and/or service, a public service announcement, or a product placement.

2732 Generating a marketing impact information indicative of a response by a person to an electronically displayed general advertisement, the general advertisement including a form of communication designed to persuade the person to take some action, now or in the future.

2734 Generating a marketing impact information indicative of a response by a person to an electronically displayed general advertisement, the general advertisement including a communication designed to encourage or stimulate patronization of a specific seller or purchase of a particular product.

2736 Generating a marketing impact information indicative of a response by a person to an electronically displayed general advertisement, the general advertisement received from an advertising server via a network.

2738 Generating a marketing impact information indicative of a response by a person to an electronically displayed general advertisement, the general advertisement received from an advertising server via a network in conjunction with another content configurable for electronic display.

FIG. 46

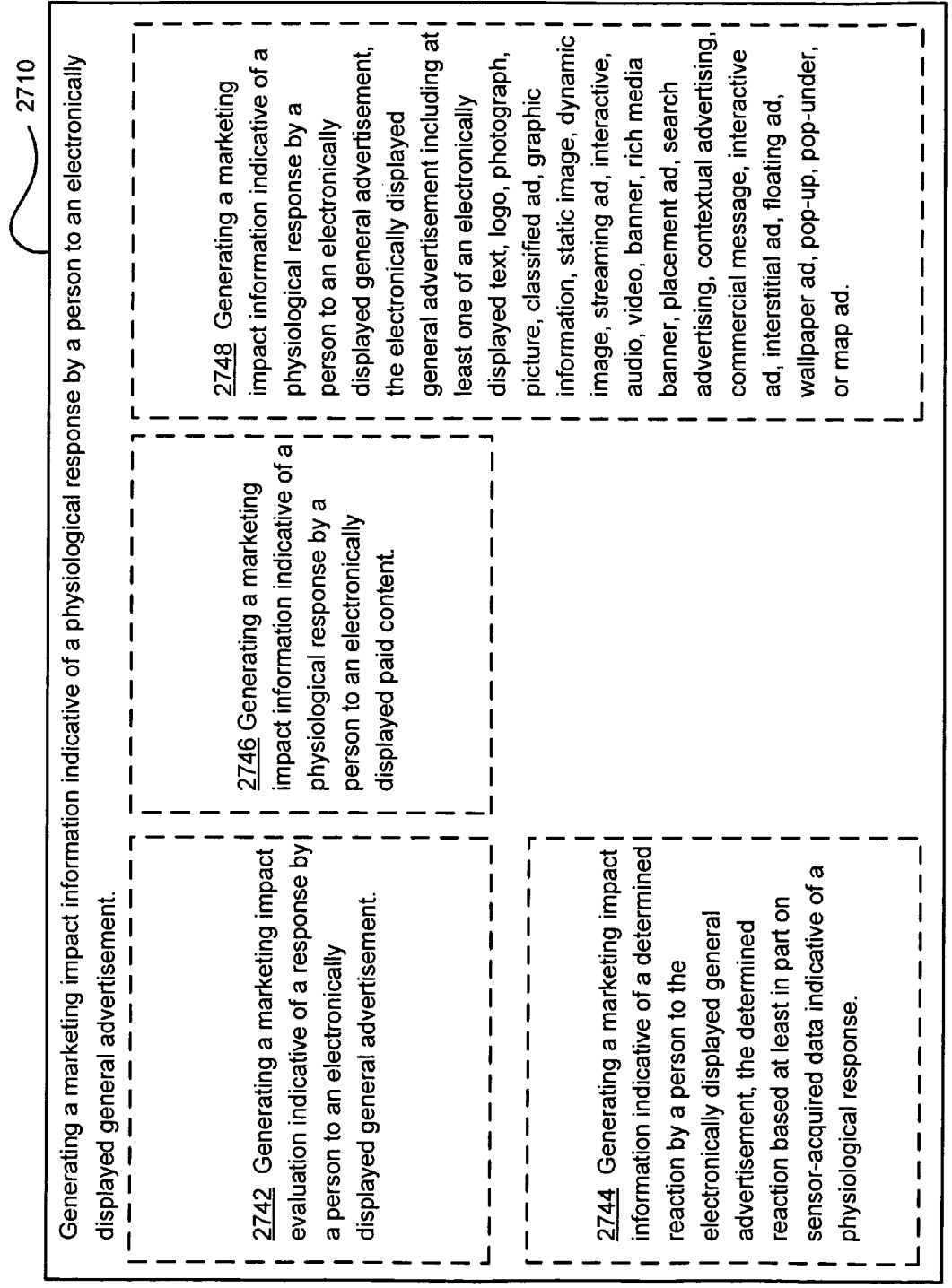

2710

Generating a marketing impact information indicative of a physiological response by a person to an electronically displayed general advertisement.

2742 Generating a marketing impact evaluation indicative of a response by a person to an electronically displayed general advertisement.

2744 Generating a marketing impact information indicative of a determined reaction by a person to the electronically displayed general advertisement, the determined reaction based at least in part on sensor-acquired data indicative of a physiological response.

2746 Generating a marketing impact information indicative of a physiological response by a person to an electronically displayed paid content.

2748 Generating a marketing impact information indicative of a physiological response by a person to an electronically displayed general advertisement, the electronically displayed general advertisement including at least one of an electronically displayed text, logo, photograph, picture, classified ad, graphic information, static image, dynamic image, streaming ad, interactive, audio, video, banner, rich media banner, placement ad, search advertising, contextual advertising, commercial message, interactive ad, interstitial ad, floating ad, wallpaper ad, pop-up, pop-under, or map ad.

FIG. 50

3010 Computer-readable medium bearing the program instructions.

3020 Program instructions operable to perform a process in a computing device, the process comprising:

3030 generating a marketing impact information indicative of a physiological response by a person to an electronically displayed general advertisement;

3040 acquiring an indication of a characteristic of the electronically displayed general advertisement;

3050 initiating a selection of a targeted-advertisement using an advertising rule responsive to at least the characteristic of the electronically displayed general advertisement and the marketing impact information.

| 3090 Additional instruction(s). |
| --- |
| 3092 Initiating an electronic display of the general advertisement. |
| 3094 Receiving an indication of the targeted-advertisement. |
| 3096 Saving an indication of the targeted-advertisement. |

| 3052 Sending a request to an advertising server for a selection of a targeted-advertisement using an advertising rule responsive to at least the characteristic of the electronically displayed general advertisement and the marketing impact information. |
| --- |
| 3054 Receiving a selected targeted-advertisement from an advertising server, the targeted-advertisement selected using an advertising rule responsive to at least the characteristic of the electronically displayed general advertisement and the marketing impact information. |

3012 Computer storage medium.

3014 Communication medium.

3000

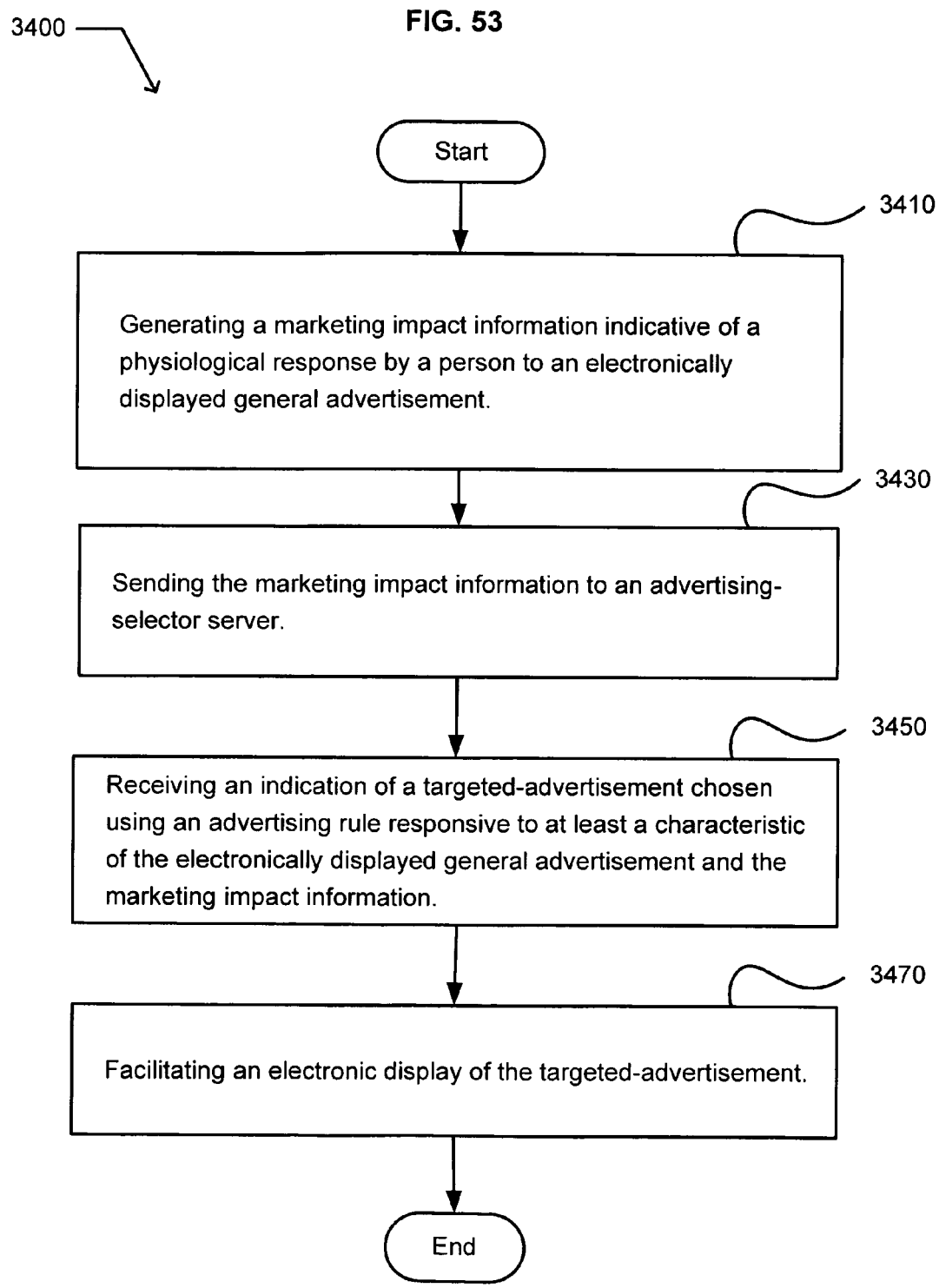

Start
↓
3410 Generating a marketing impact information indicative of a physiological response by a person to an electronically displayed general advertisement.
↓
3430 Sending the marketing impact information to an advertising-selector server.
↓
3450 Receiving an indication of a targeted-advertisement chosen using an advertising rule responsive to at least a characteristic of the electronically displayed general advertisement and the marketing impact information.
↓
3470 Facilitating an electronic display of the targeted-advertisement.
- 3472 Electronically displaying the targeted-advertisement.
↓
3490 At least one additional operation.
- 3492 Electronically displaying the targeted-advertisement.
- 3494 Saving the indication of a targeted-advertisement.
- 3496 Determining a characteristic of the electronically displayed general advertisement.
- 3498 Receiving the selected targeted-advertisement.
- 3499 Receiving the selected targeted-advertisement from an advertising-content server.
↓
End

Sending the marketing impact information to an advertising-selector server.

3432 Sending the marketing impact information and a determined characteristic of the electronically displayed general advertisement to an advertising-selector server.

3434 Sending the marketing impact information and a received characteristic of the electronically displayed general advertisement to an advertising-selector server.

3436 Sending the marketing impact information and a request for a targeted-advertisement to an advertising-selector server.

3610 Computer-readable medium bearing the program instructions.

3620 Program instructions operable to perform a process in a computing device, the process comprising:

3630 generating a marketing impact information indicative of a physiological response by a person to an electronically displayed general advertisement and based at least in part on data produced by a sensor coupled to a person;

3640 sending the marketing impact information to an advertising-selector server;

3650 receiving an indication of a targeted-advertisement chosen using an advertising rule responsive to at least a characteristic of the electronically displayed general advertisement and the marketing impact information; and 3660 facilitating an electronic display of the targeted-advertisement;

3690 The process includes at least one additional element.

3692 Facilitating an electronic display of the general advertisement.

3694 Saving an indication of the targeted-advertisement.

3652 Receiving a targeted-advertisement chosen using an advertising rule responsive to at least a characteristic of the electronically displayed general advertisement and the marketing impact information.

3654 Receiving from the advertising-selector server an indication of a targeted-advertisement chosen using an advertising rule responsive to at least a characteristic of the electronically displayed general advertisement and the marketing impact information.

3612 Computer storage medium.

3614 Communication medium.

FIG. 60

3701 Electronic device.

3710 Means for generating a marketing impact information indicative of a physiological response by a person to an electronically displayed general advertisement and based at least in part on data produced by a sensor coupled to a person.

3720 Means for sending the marketing impact information to an advertising-selector server.

3730 Means for receiving an indication of a targeted-advertisement chosen using an advertising rule responsive to at least a characteristic of the electronically displayed general advertisement and the marketing impact information.

3740 Means for facilitating an electronic display of the targeted-advertisement.

3750 Means for electronically displaying the targeted-advertisement.

3760 Means for saving the indication of a targeted-advertisement.

3770 Means for determining a characteristic of the electronically displayed general advertisement.

3780 Means for receiving the indication of a targeted-advertisement.

4305 Electronic device.

4310 Means for receiving from a requestor device a marketing impact information indicative of a physiological response by a person to a general advertisement.

4320 Means for acquiring an indication of a characteristic of the general advertisement.

4330 Means for initiating a selection of a targeted-advertisement by an advertising rule responsive to at least the characteristic of the general advertisement and the marketing impact information.

4340 Means for returning an indication of the targeted-advertisement.

RETURNING A PERSONALIZED ADVERTISEMENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/977,752, entitled METHOD OF SELECTING A SECOND CONTENT BASED ON A USER'S REACTION TO A FIRST CONTENT, naming EDWARD K. Y. JUNG; ROYCE A. LEVIEN; ROBERT W. LORD; MARK A. MALAMUD; JOHN D. RINALDO, JR. as inventors, filed 24, Oct., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/977,748, entitled REQUESTING A SECOND CONTENT BASED ON A USER'S REACTION TO A FIRST CONTENT, naming EDWARD K. Y. JUNG; ROYCE A. LEVIEN; ROBERT W. LORD; MARK A. MALAMUD; JOHN D. RINALDO, JR. as inventors, filed 25, Oct., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/978,206, now issued as U.S. Pat. No. 8,312,407 B2, entitled SELECTING A SECOND CONTENT BASED ON A USER'S REACTION TO A FIRST CONTENT, naming EDWARD K. Y. JUNG; ROYCE A. LEVIEN; ROBERT W. LORD; MARK A. MALAMUD; JOHN D. RINALDO, JR. as inventors, filed 26, Oct., 2007.

For purposes of the USPTO extra-statutory requirements, the present application constitutes a continuation-in-part of U.S. patent application Ser. No. 11/978,534, now issued as U.S. Pat. No. 8,126,867 B2, entitled RETURNING A SECOND CONTENT BASED ON A USER'S REACTION TO A FIRST CONTENT, naming EDWARD K. Y. JUNG; ROYCE A. LEVIEN; ROBERT W. LORD; MARK A. MALAMUD; JOHN D. RINALDO, JR. as inventors, filed 27, Oct., 2007.

For purposes of the USPTO extra-statutory requirements, the present application constitutes a continuation-in-part of U.S. patent application Ser. No. 11/980,321, now issued as U.S. Pat. No. 8,234,262 B2, entitled METHOD OF SELECTING A SECOND CONTENT BASED ON A USER'S REACTION TO A FIRST CONTENT OF AT LEAST TWO INSTANCES OF DISPLAYED CONTENT, naming EDWARD K. Y. JUNG; ROYCE A. LEVIEN; ROBERT W. LORD; MARK A. MALAMUD; JOHN D. RINALDO, JR. as inventors, filed 29, Oct., 2007.

For purposes of the USPTO extra-statutory requirements, the present application constitutes a continuation-in-part of U.S. patent application Ser. No. 11/981,573, entitled SELECTING A SECOND CONTENT BASED ON A USER'S REACTION TO A FIRST CONTENT OF AT LEAST TWO INSTANCES OF DISPLAYED CONTENT, naming EDWARD K. Y. JUNG; ROYCE A. LEVIEN; ROBERT W. LORD; MARK A. MALAMUD; JOHN D. RINALDO, JR. as inventors, filed 30, Oct., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/983,406, now issued as U.S. Pat. No. 8,001,108 B2, entitled RETURNING A NEW CONTENT BASED ON A PERSON'S REACTION TO AL LEAST TWO INSTANCES OF PREVIOUSLY DISPLAYED CONTENT, naming EDWARD K. Y. JUNG; ROYCE A. LEVIEN; ROBERT W. LORD; MARK A. MALAMUD; JOHN D. RINALDO, JR. as inventors, filed 7, Nov., 2007.

For purposes of the USPTO extra-statutory requirements, the present application constitutes a continuation-in-part of U.S. patent application Ser. No. 11/998,820, entitled TARGETED-ADVERTISING BASED ON A SENSED PHYSIOLOGICAL RESPONSE BY A PERSON TO A GENERAL ADVERTISEMENT, naming EDWARD K. Y. JUNG; ROYCE A. LEVIEN; ROBERT W. LORD; MARK A. MALAMUD; JOHN D. RINALDO, JR. as inventors, filed 30, Nov., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/998,826, entitled PHYSIOLOGICAL RESPONSE BASED TARGETED ADVERTISING, naming EDWARD K. Y. JUNG; ROYCE A. LEVIEN; ROBERT W. LORD; MARK A. MALAMUD; JOHN D. RINALDO, JR. as inventors, filed 30, Nov., 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/998,779, entitled PROVIDING PERSONALIZED ADVERTISING, naming EDWARD K. Y. JUNG; ROYCE A. LEVIEN; ROBERT W. LORD; MARK A. MALAMUD; JOHN D. RINALDO, JR. as inventors, filed 30, Nov., 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment provides method implemented in an environment that includes a person viewing content displayed by an electronic device. The method includes generating a marketing impact information indicative of a physiological response by a person to an electronically displayed general advertisement. The method also includes acquiring an indication of a characteristic of the electronically displayed general advertisement. The method further includes initiating a selection of a targeted-advertisement using an advertising rule responsive to at least the characteristic of the electronically displayed general advertisement and the marketing impact information. The method may include electronically displaying the general advertisement in a manner perceivable by the person. The method may include receiving the targeted-advertisement. The method may include saving an indication of the targeted-advertisement. The method may include electronically displaying the selected targeted-advertisement. In addition to the foregoing, other method embodiments are described in the claims, drawings, and text that form a part of the present application.

Another embodiment provides an electronic system. The electronic system includes a response sensor apparatus operable to acquire data indicative of a physiological response by a person to an advertisement. The system also includes a recognition circuit operable to generate a marketing impact information about the general advertisement based at least in part on the acquired data indicative of a physiological response. The system further includes a query circuit operable to initiate a selection of a targeted-advertisement by a targeted-advertising selection engine responsive to at least a characteristic of the general advertisement and the marketing impact information. The system also includes an electronic display circuit operable to present the targeted-advertisement in a manner perceivable by a person. The system may include a digital storage device operable to save an indication of the selected targeted-advertisement. The system may include an advertising broadcast circuit operable to facilitate a display of the selected targeted-advertisement by the electronic display. The system may include a receiver circuit operable to receive an indication of the selected targeted-advertisement. In addition to the foregoing, other system embodiments are described in the claims, drawings, and text that form a part of the present application.

A further embodiment provides a computer program product. The computer program product includes a computer-readable storage medium bearing program instructions. The program instructions are operable to perform a process in a computing device. The process includes generating a marketing impact information indicative of a physiological response by a person to an electronically displayed general advertisement. The process also includes acquiring an indication of a characteristic of the electronically displayed general advertisement. The process further includes initiating a selection of a targeted-advertisement using an advertising rule responsive to at least the characteristic of the electronically displayed general advertisement and the marketing impact information. The process may include initiating an electronic display of the general advertisement. The process may include receiving an indication of the targeted-advertisement. The process may include saving an indication of the targeted-advertisement. In addition to the foregoing, other computer program embodiments are described in the claims, drawings, and text that form a part of the present application.

An embodiment provides an electronic device. The electronic device includes means for generating a marketing impact information indicative of a physiological response by a person to an electronically displayed general advertisement. The electronic device also includes means for acquiring an indication of a characteristic of the electronically displayed general advertisement. The electronic device further includes means for initiating a selection of a targeted-advertisement using an advertising rule responsive to at least the characteristic of the electronically displayed general advertisement and the marketing impact information. The electronic device may include means for electronically displaying the general advertisement in a manner perceivable by the person. The electronic device may include means for receiving the targeted-advertisement. The electronic device may include means for saving an indication of the targeted-advertisement. In addition to the foregoing, other electronic device embodiments are described in the claims, drawings, and text that form a part of the present application.

Another embodiment provides a method. The method includes generating a marketing impact information indicative of a physiological response by a person to an electronically displayed general advertisement. The method also includes sending the marketing impact information to an advertising-selector server. The method further includes receiving an indication of a targeted-advertisement chosen using an advertising rule responsive to at least a characteristic of the electronically displayed general advertisement and the marketing impact information. The method also includes facilitating an electronic display of the targeted-advertisement. The method may include electronically displaying the targeted-advertisement. The method may include saving the indication of a targeted-advertisement. The method may include determining a characteristic of the electronically displayed general advertisement. The method may include receiving the selected targeted-advertisement. In addition to the foregoing, other method embodiments are described in the claims, drawings, and text that form a part of the present application.

A further embodiment provides an electronic system. The electronic system includes a sensor apparatus operable to acquire data indicative of a physiological response by a person to a general advertisement. The electronic system also includes a recognition circuit operable to generate a marketing impact information about the general advertisement based at least in part on the acquired data indicative of a physiological response by the person to the general advertisement. The electronic system further includes a caller circuit operable to send a request for a targeted-advertisement. The electronic system also includes a receiver circuit operable to receive an indication of a targeted-advertisement selected from at least two instances of available marketing content by a selection engine responsive at least to a characteristic of the general advertisement and the marketing impact information. The electronic system further includes an electronic display circuit operable to present the targeted-advertisement in a manner perceivable by the person. The electronic system may include a characterization circuit operable to acquire an indication of a characteristic of the general advertisement. The electronic system may include a characterization circuit operable to at least one of receive, or determine an indication of a characteristic of the general advertisement. The electronic system may include a digital storage device operable to save an indication of the selected targeted-advertisement. The electronic system may include an advertising broadcast circuit operable to facilitate a display of the selected targeted-advertisement by the electronic display circuit. In addition to the foregoing, other electronic system embodiments are described in the claims, drawings, and text that form a part of the present application.

An embodiment provides a computer program product. The computer-program product includes a computer-readable storage medium bearing program instructions. The program instructions are operable to perform a process in a computing device. The process includes generating a marketing impact information indicative of a physiological response by a person to an electronically displayed general advertisement and based at least in part on data produced by a sensor coupled to a person. The process also includes sending the marketing impact information to an advertising-selector server. The process further includes receiving an indication of a targeted-advertisement chosen using an advertising rule responsive to at least a characteristic of the electronically displayed general advertisement and the marketing impact information. The process also includes facilitating an electronic display of the targeted-advertisement. The process may include facilitating an electronic display of the general advertisement. The process may include saving an indication of the targeted-advertisement. In addition to the foregoing, other computer program product embodiments are described in the claims, drawings, and text that form a part of the present application.

Another embodiment provides an electronic device. The electronic device includes means for generating a marketing impact information indicative of a physiological response by a person to an electronically displayed general advertisement and based at least in part on data produced by a sensor coupled to a person. The electronic device also includes means for sending the marketing impact information to an advertising-selector server. The electronic device further includes means for receiving an indication of a targeted-advertisement chosen using an advertising rule responsive to at least a characteristic of the electronically displayed general advertisement and the marketing impact information. The electronic device also includes means for facilitating an electronic display of the targeted-advertisement. The electronic device may include means for electronically displaying the targeted-advertisement. The electronic device may include means for saving the indication of a targeted-advertisement. The electronic device may include means for determining a characteristic of the electronically displayed general advertisement. The electronic device may include means for receiving the indication of a targeted-advertisement. In addition to the foregoing, other electronic device embodiments are described in the claims, drawings, and text that form a part of the present application.

A further embodiment provides a method. The method includes receiving from a requester device a marketing impact information indicative of a physiological response by a person to a general advertisement. The method also includes acquiring an indication of a characteristic of the general advertisement. The method further includes initiating a selection of a targeted-advertisement using an advertising rule responsive to at least the characteristic of the general advertisement and the marketing impact information. The method also includes returning an indication of the targeted-advertisement. The method may analyzing the marketing impact information for an indication of a reaction by the person to the general advertisement. In addition to the foregoing, other method embodiments are described in the claims, drawings, and text that form a part of the present application.

An embodiment provides an electronic device. The electronic device includes an advertising services circuit operable to receive from a requestor device a marketing impact information indicative of a physiological response by a person to a general advertisement. The electronic device also includes an attribute circuit operable to obtain an indication of a characteristic of the general advertisement. The electronic device further includes a targeted-advertising selection engine operable to pick a targeted-advertisement based on at least the indication of a characteristic of the general advertisement and the marketing impact information. The electronic device also includes a reply circuit operable to return an indication of the targeted-advertisement. The electronic device may include a storage device operable to save data indicative of the targeted-advertisement. The electronic device may include an advertising services circuit operable to receive from a requester device a marketing impact information based at least in part on data produced by a sensor coupled to the person and indicative of a physiological response by a person to a general advertisement. In addition to the foregoing, other method embodiments are described in the claims, drawings, and text that form a part of the present application.

Another embodiment provides a computer program product. The computer program product includes a computer-readable storage medium bearing program instructions, and the program instructions. The program instructions are operable to perform a process in a computing device. The process includes receiving from a requestor device a marketing impact information indicative of a physiological response by a person to a general advertisement. The process also includes acquiring an indication of a characteristic of the general advertisement. The process further includes initiating a selection of a targeted-advertisement using an advertising rule responsive to at least the characteristic of the general advertisement and the marketing impact information. The process also includes returning an indication of the targeted-advertisement. In addition to the foregoing, other computer program product embodiments are described in the claims, drawings, and text that form a part of the present application.

A further embodiment provides an electronic device. The electronic device includes means for receiving from a requestor device a marketing impact information indicative of a physiological response by a person to a general advertisement. The electronic device also includes means for acquiring an indication of a characteristic of the general advertisement. The electronic device further includes means for initiating a selection of a targeted-advertisement using an advertising rule responsive to at least the characteristic of the general advertisement and the marketing impact information. The electronic device also includes means for returning an indication of the targeted-advertisement. In addition to the foregoing, other electronic device embodiments are described in the claims, drawings, and text that form a part of the present application.

An embodiment provides a method. The method includes receiving from a requestor device a marketing impact information indicative of a physiological response by a person to a general advertisement. The method also includes acquiring an indication of a characteristic of the general advertisement. The method further includes initiating a selection of a targeted-advertisement by an advertising rule responsive to at least the characteristic of the general advertisement and the marketing impact information. The method also includes returning an indication of the targeted-advertisement. The method may include analyzing the marketing impact information for an indication of a reaction by the person to the general advertisement. In addition to the foregoing, other method embodiments are described in the claims, drawings, and text that form a part of the present application.

Another embodiment provides an electronic device. The electronic device includes an advertising services circuit, an attribute circuit, a targeted-advertising selection engine, and a reply circuit. The advertising circuit includes an advertising services circuit operable to receive from a requestor device a marketing impact information indicative of a physiological response by a person to a general advertisement. The attribute circuit includes an attribute circuit operable to obtain an indication of a characteristic of the general advertisement. The targeted-advertising selection engine includes a targeted-advertising selection engine operable to pick a targeted-advertisement based on at least the indication of a characteristic of the general advertisement and the marketing impact information. The reply circuit includes a reply circuit operable to return an indication of the targeted-advertisement. The electronic device may include a digital storage device operable to save data indicative of the targeted-advertisement. In addition to the foregoing, other electronic device embodiments are described in the claims, drawings, and text that form a part of the present application.

A further embodiment provides a computer program product. The computer program product includes a computer-readable storage medium bearing program instructions. The program instructions are operable to perform a process in a computing device. The process includes receiving from a requestor device a marketing impact information indicative of a physiological response by a person to a general advertisement. The process also includes acquiring an indication of a characteristic of the general advertisement. The process further includes initiating a selection of a targeted-advertisement by an advertising rule responsive to at least the characteristic of the general advertisement and the marketing impact information. The process also includes returning an indication of the targeted-advertisement. The process may further include transforming the marketing impact information to include an indication of a reaction by the person to the general advertisement. In addition to the foregoing, other computer program product embodiments are described in the claims, drawings, and text that form a part of the present application.

An embodiment provides an electronic device. The electronic device includes means for receiving from a requester device a marketing impact information indicative of a physiological response by a person to a general advertisement. The electronic device also includes means for acquiring an indication of a characteristic of the general advertisement. The electronic device further includes means for initiating a selection of a targeted-advertisement by an advertising rule responsive to at least the characteristic of the general advertisement and the marketing impact information. The electronic device also includes means for returning an indication of the targeted-advertisement. In addition to the foregoing, other electronic device embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates a further alternative embodiment of the operational flow of FIG. 4;

FIG. 8 illustrates an alternative embodiment of the operational flow of FIG. 4;

FIG. 9 illustrates another alternative embodiment of the operational flow of FIG. 4;

FIG. 11 illustrates an example computer program product;

FIG. 12 illustrates an example environment that includes an electronic device;

FIG. 13 illustrates an example operational flow implemented in an environment that includes a person viewing content displayed by an electronic device;

FIG. 14 illustrates an example computer program product;

FIG. 19 illustrates an example computer program product;

FIG. 20 illustrates an example system that includes an electronic device;

FIG. 25 illustrates a further alternative embodiment of the operational flow of FIG. 22;

FIG. 29 illustrates an example environment;
FIG. 30 illustrates an example computer program product;
FIG. 39 illustrates an example computer program product;
FIG. 40 illustrates an example electronic device;
FIG. 45 illustrates another alternative embodiment of the operational flow of FIG. 42;
FIG. 46 illustrates an alternative embodiment of the operational flow of FIG. 42;
FIG. 50 illustrates an example computer program product;
FIG. 53 illustrates an example operational flow;
FIG. 54 illustrates an alternative embodiment of the operational flow of FIG. 53;
FIG. 56 illustrates a further alternative embodiment of the operational flow of FIG. 53;
FIG. 59 illustrates an example computer program product;
FIG. 60 illustrates an example electronic device;
FIG. 69 illustrates an example electronic device.

DETAILED DESCRIPTION

Figure 1:
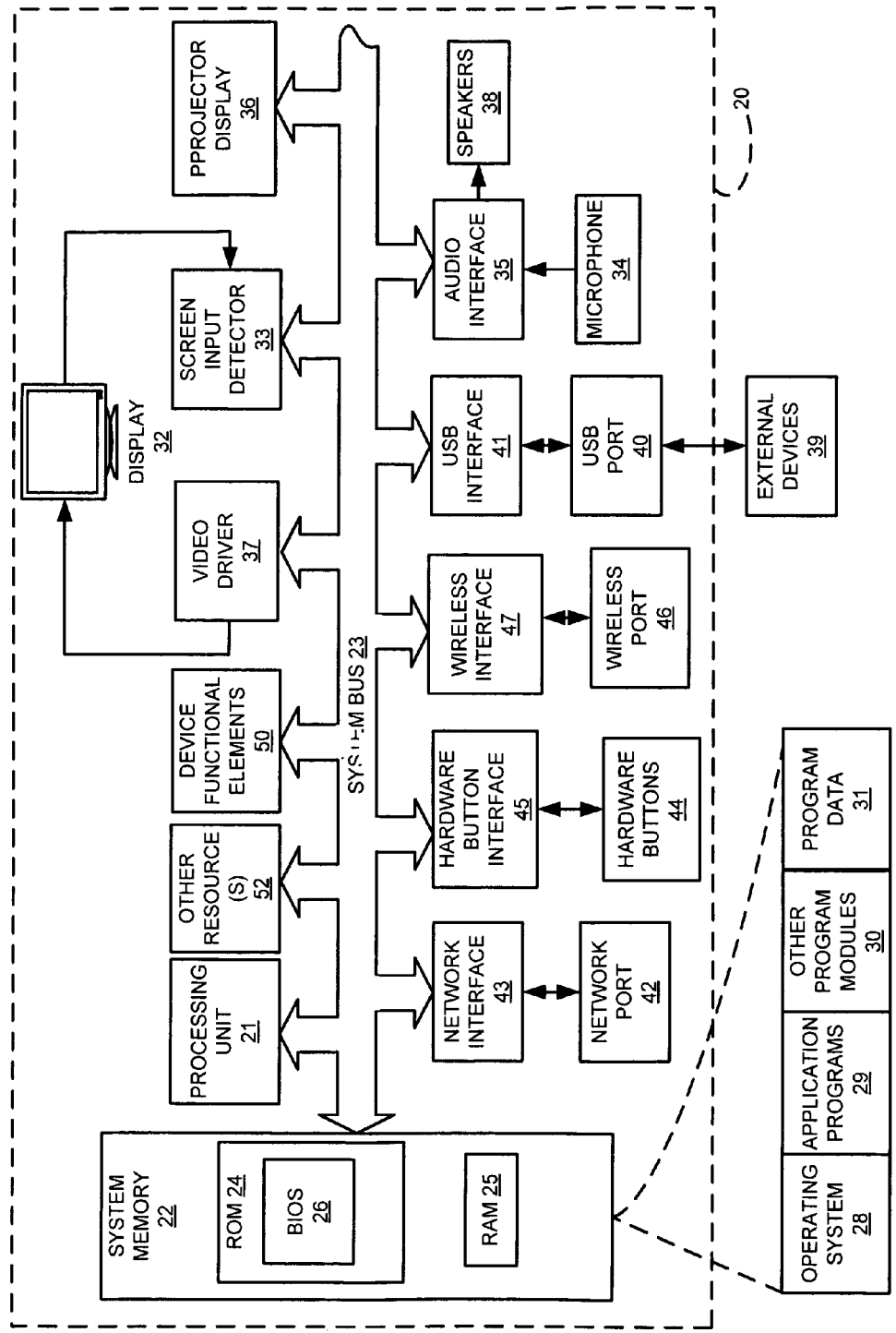
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a PDA, a Blackberry® device, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between subcomponents within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display with suitable input detection circuitry, illustrated as a display 32 and screen input detector 33. The output circuitry of the touch-sensitive display 32 is connected to the system bus 23 via a video driver 37. Other input devices may include a microphone 34 connected through a suitable audio interface 35, and a physical hardware keyboard (not shown). Output devices may include at least one the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
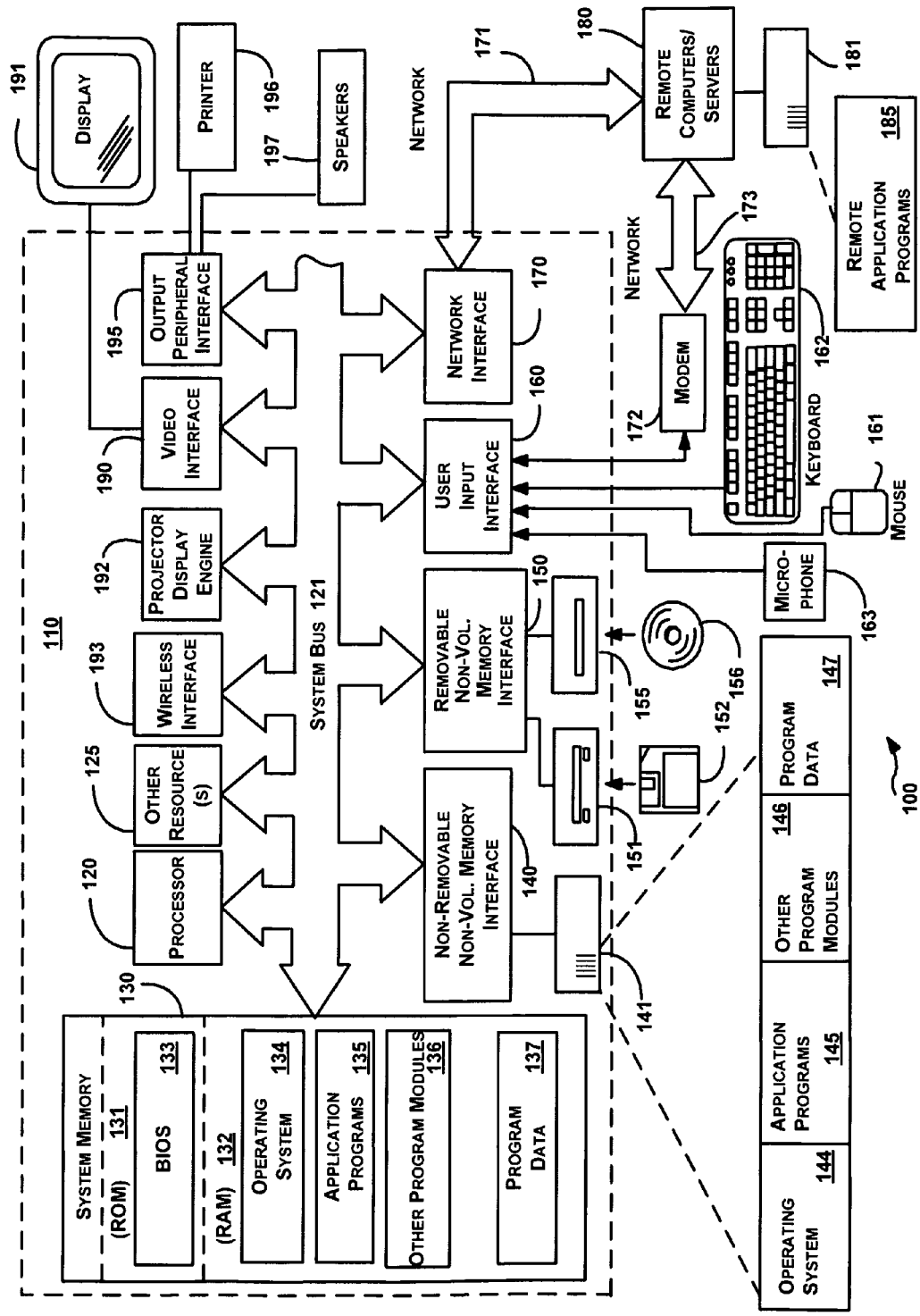
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch sensitive display, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
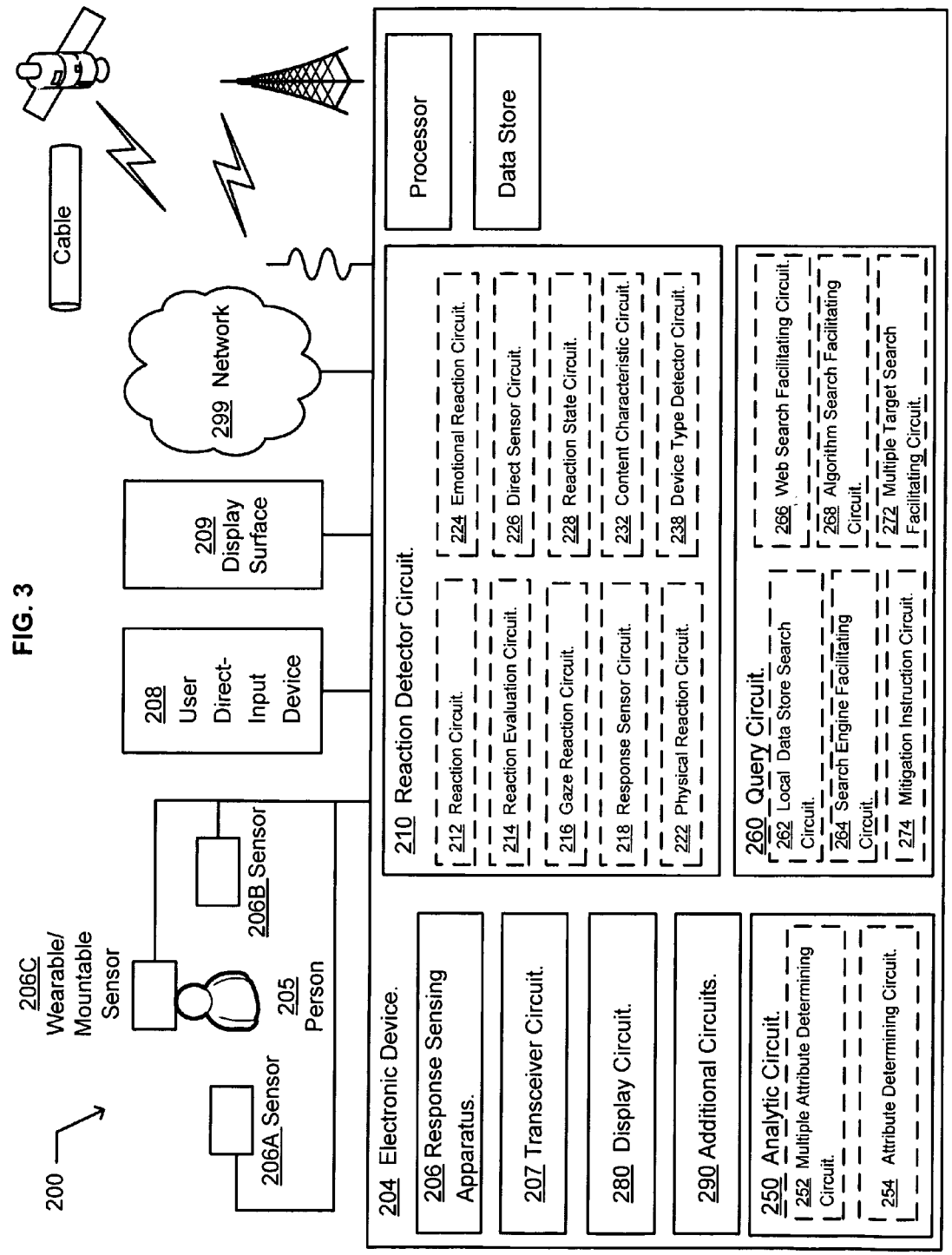
FIG. 3 illustrates an example environment in which embodiments may be implemented.

FIG. 3 illustrates an example environment 200 in which embodiments may be implemented. The example environment includes an electronic device 204, a response sensing apparatus 206, a transceiver circuit 207, a user direct-input device 208, and a display surface 209. In some embodiments, one or more of the response sensing apparatus, the transceiver circuit, the user direct-input interface, and the display surface may be structurally distinct from the remaining circuits or the electronic device. The response sensing apparatus includes at least one user sensor operable to acquire data indicative of a response by a person 205 to a content displayed by or on the display surface. The at least one user sensor is illustrated as a sensor 206A, a sensor 206B, and a wearable/mountable sensor 206C. The at least one user sensor may be physically incorporated with the electronic device, or may be physically separate from the electronic device and electronically coupled with the device. The user direct-input device 208 includes at least one device that may be used by the person to directly interact with the electronic device, such as the mouse 161, keyboard 162, microphone 163, and/or speakers 197 described in conjunction with FIG. 2, or a touch screen, such as the display 32 combined with the screen input detector 33 described in conjunction with FIG. 1. The display surface may include any surface suitable for displaying a content to the person. The display surface may include the monitor 191 described in conjunction with FIG. 2, or a surface such as a wall or another planar surface (not shown) onto which a content may be projected for display to the person. The display surface may be physically incorporated with the electronic device, or may be physically separate from the electronic device and electronically coupled with the device.

The electronic device 204 may include a wired or wireless access to digital content using the transceiver 207, such as via a network 299. In an alternative embodiment, the electronic device may be coupled to the network via a wireless link, a satellite link, and/or a wired link.

In an embodiment, the electronic device 204 includes a reaction detector circuit 210, an analytic circuit 250, a query circuit 260, and a display circuit 280. In some embodiments, one or more of the reaction detector circuit, the analytic determining circuit, the query circuit, and/or the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 204 using the user direct-input device 208.

The electronic device 204 may include at least one additional circuit. The at least one additional circuit may include additional circuits 290. In addition, the electronic device may include a processor (not illustrated), such as the processing unit 21 described in conjunction with FIG. 1, and/or the processor 120 described in conjunction with FIG. 2. In further addition, the electronic device may include a computer storage media illustrated as a data store. In an embodiment, the electronic device 204 may include a mobile electronic device.

In an embodiment, the reaction detector circuit 210 may include at least one additional circuit. The at least one additional circuit may include at least one of a reaction circuit 212, reaction evaluation circuit 214, a gaze reaction circuit 216, a response sensor circuit 218, a physical reaction circuit 222, an emotional reaction circuit 224, a direct sensor circuit 226, a reaction state circuit 228, a content characteristic circuit 232, and/or a device type detector circuit 236.

In another embodiment, the analytic circuit 250 may include at least one additional circuit. The at least one additional circuit may include at least one of a multiple attribute determining circuit 252 and/or an attribute determining circuit.

In a further embodiment, the query circuit 260 may include at least one additional circuit. The at least one additional circuit may include at least one of a local data store search circuit 262, a search engine facilitating circuit 264, a mitigation instruction circuit 274, a Web search facilitating circuit 266, an algorithm search facilitating circuit, and/or a multiple target search facilitating circuit 272.

Figure 4:
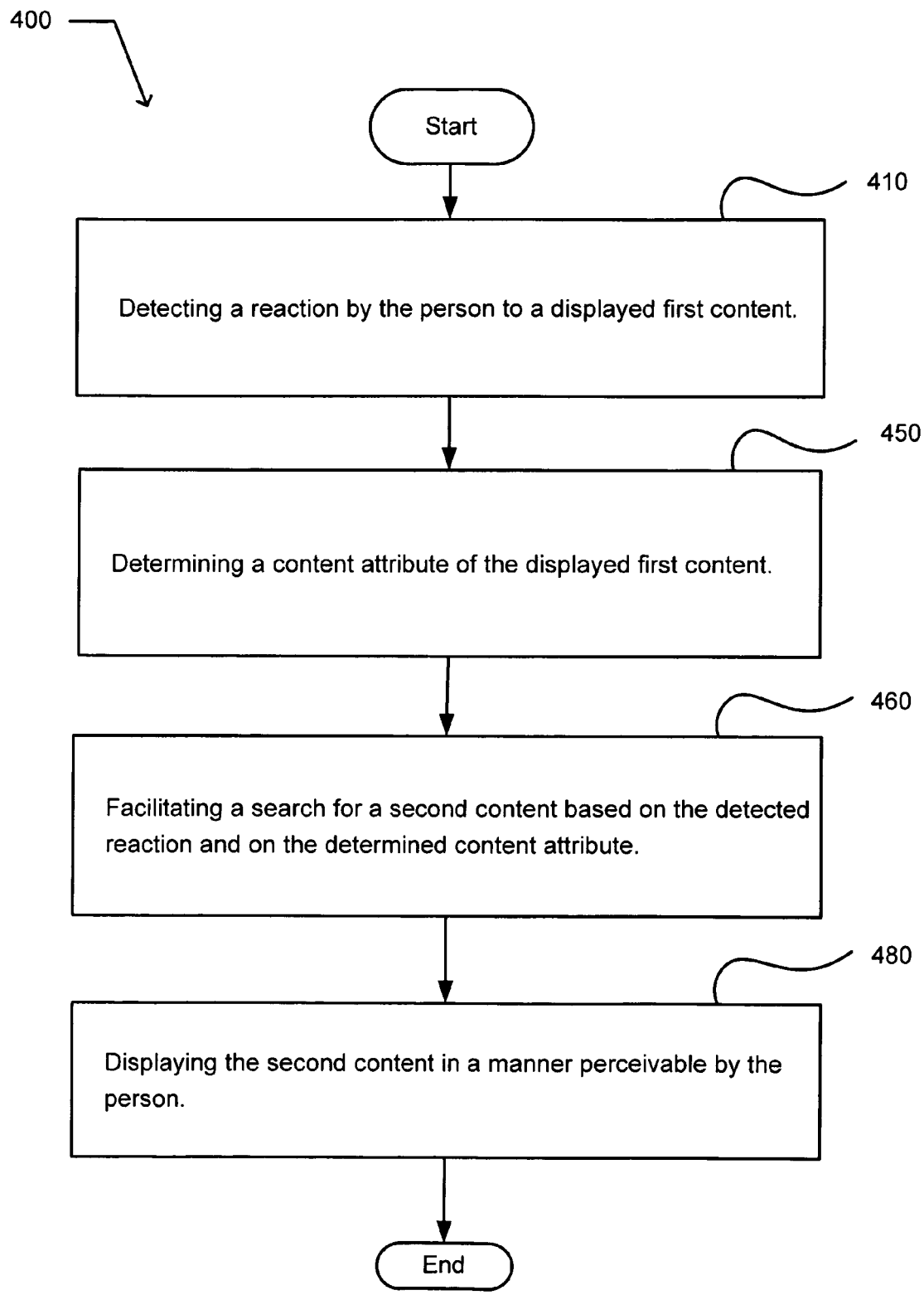
FIG. 4 illustrates an example of an operational flow implemented in an environment that includes a person interacting with an electronic device using a user direct-input device.

FIG. 4 illustrates an example of an operational flow 400 implemented in an environment that includes a person interacting with an electronic device using a user direct-input device. In an alternative embodiment, the environment that includes a person interacting with an electronic device using a user direct-input device further includes environment that includes a person viewing content displayed by an electronic device and directly interacting with the electronic device using a user direct-input device. FIG. 4 and several following figures may include various examples of operational flows, discussions, and explanations with respect to the above-described environment 200 of FIG. 3, and/or with respect to other examples and contexts. However, it should be understood that the operational flows may be executed in a number of other environments and contexts, and/or in modified versions of FIG. 3. Also, although the various operational flows are illustrated in a sequence(s), it should be understood that the various operations may be performed in other orders than those which are illustrated, and/or may be performed concurrently.

After a start operation implemented in the environment that includes a person viewing content displayed by an electronic device using a user direct-input device, the operational flow 400 includes an observation operation 410. The observation operation detects a reaction by the person to a displayed first content. The observation operation may be implemented using the reaction detector circuit 210, and/or the response sensing apparatus 206. An analytical operation 450 determines a content attribute of the displayed first content. The analytical operation may be implemented using the analytic circuit 250. A query operation 460 facilitates a search for a second content based on the detected reaction by the observation operation and on the determined content attribute by the investigation operation. The query operation may be implemented using the query circuit 260. A broadcast operation 480 displays the second content in a manner perceivable by the person. The broadcast operation may be implemented using the display circuit 280. The operational flow 400 then proceeds to an end operation.

In an embodiment, the observation operation 410 may be implemented using the reaction detector circuit 210 of FIG. 3. For example, optically based observation data of the person 205 may be acquired by the sensor 206A, and/or sensor 206B. Physiological based data of the person may be acquired by the wearable/mountable sensor 206C. A circuit in the response sensing apparatus 206 may transform data acquired by the sensors 206A-206C into data indicative of a response by the person to the displayed first content. For example, a response may include at least one of a change in breathing rate, a change in heart rate, eye movements, facial movements, gaze direction and/or time, or a brain wave pattern. Another circuit in the response sensing circuit may detect a reaction by the person to a displayed first content based on the data indicative of a response by the person to the displayed first content. For example, a facial response that includes the person moving the ends of their lips above the center portion of the lips may be detected as a "smile" reaction or a "positive" reaction. A facial response that includes the person moving the ends of the lips below the center portion of the lips may be detected as a "frown" reaction or a "negative" reaction. The observation operation does not include data directly inputted by the person 205 using the user direct-input device 208, such as keyboard, mouse, and voice commands entered by the user through the user direct-input device. However, in an alternative embodiment, the observation operation may include at least one of a quality, or a manner of the person's input of data using the direct-input device. For example, the observation operation may acquire data indicative of the person shouting a voice command without regard to a nature of the voice command, or the person striking keys of the keyboard particularly hard without regard to the keyed command or text. In a further embodiment, the observation operation may acquire sensor data indicative of the person shouting a voice command and associate a reaction with the nature of the voice command. For example, data indicative of a loud voice response may be associated with a-spoken command "Delete this Web page" as a negative reaction to the content of the Web page.

In an embodiment, data indicative of a response may include data indicative of at least one of a person's gaze, attention, gaze dwell time, facial movements, eye movements, pupil dilation, physiological parameters (heart rate, respiration rate, etc.), stance, sub-vocalization (and other non-word audio), P-300 response, brain waves, brain patterns, or other detectable aspects. In another embodiment, data indicative of a response may include data indicative of at least one of a person's physiological, behavioral, emotional, voluntary, or involuntary response. In a further embodiment, data indicative of a response may include data acquired by functional near-infrared spectroscopy (fNIRS) indicative of a response. fNIRS data may be acquired by a fNIRS device, an embodiment of which is illustrated as the wearable/mountable sensor 206C.

In another embodiment, the observation operation 410 detects a reaction by the person to a displayed first content by applying pattern recognition to the data indicative of a response by the person to the displayed first content. For example, a reaction may include a response that reveals the person 205's feelings or attitude toward the displayed first content. In a further embodiment, the observation operation detects a reaction by the person to a displayed first content by applying pattern matching to the data indicative of a response by the person to the displayed first content.

In use, an embodiment of the operational flow 400 may illustrated by reference to FIG. 3. For example, a first content may be displayed to the person 205 on a portion of the display surface 209, such as a screen of BlackBerry® or other PDA electronic device. In this example, the displayed first content may be a picture of a new car from a brother of the person 205. Data indicative of a response by the person 205 to the displayed new car is acquired using at least one of sensors 206A-206C. The observation operation 410 determines a reaction by the person to the displayed new car based on the data indicative of a response. If, for example, the data indicates an upward movement of the ends of the person's lips and an opening of their eyes, a positive reaction may be detected. The analytical operation 450 determines a content attribute of the displayed picture of the brother's new car. A content attribute may include at least one of a manufacturer of the new car, a color of the new car, or a body style of the new car, such as a convertible, coupe, four-door, or SUV. The query operation 460 facilitates a search for a second content based on the detected reaction (positive) and on the determined content attribute (convertible sports car).

The search may be facilitated by communicating with an Internet based search service, such as Google, Yahoo, and/or Live Search. The broadcast operation 480 displays a second content in a manner perceivable by the person by receiving a result of the facilitated search that includes an indication of the second content, and displaying the second content using the display surface 209. For example, the second content may include a picture of next year's model of the same car as the brother's new car.

Figure 5:
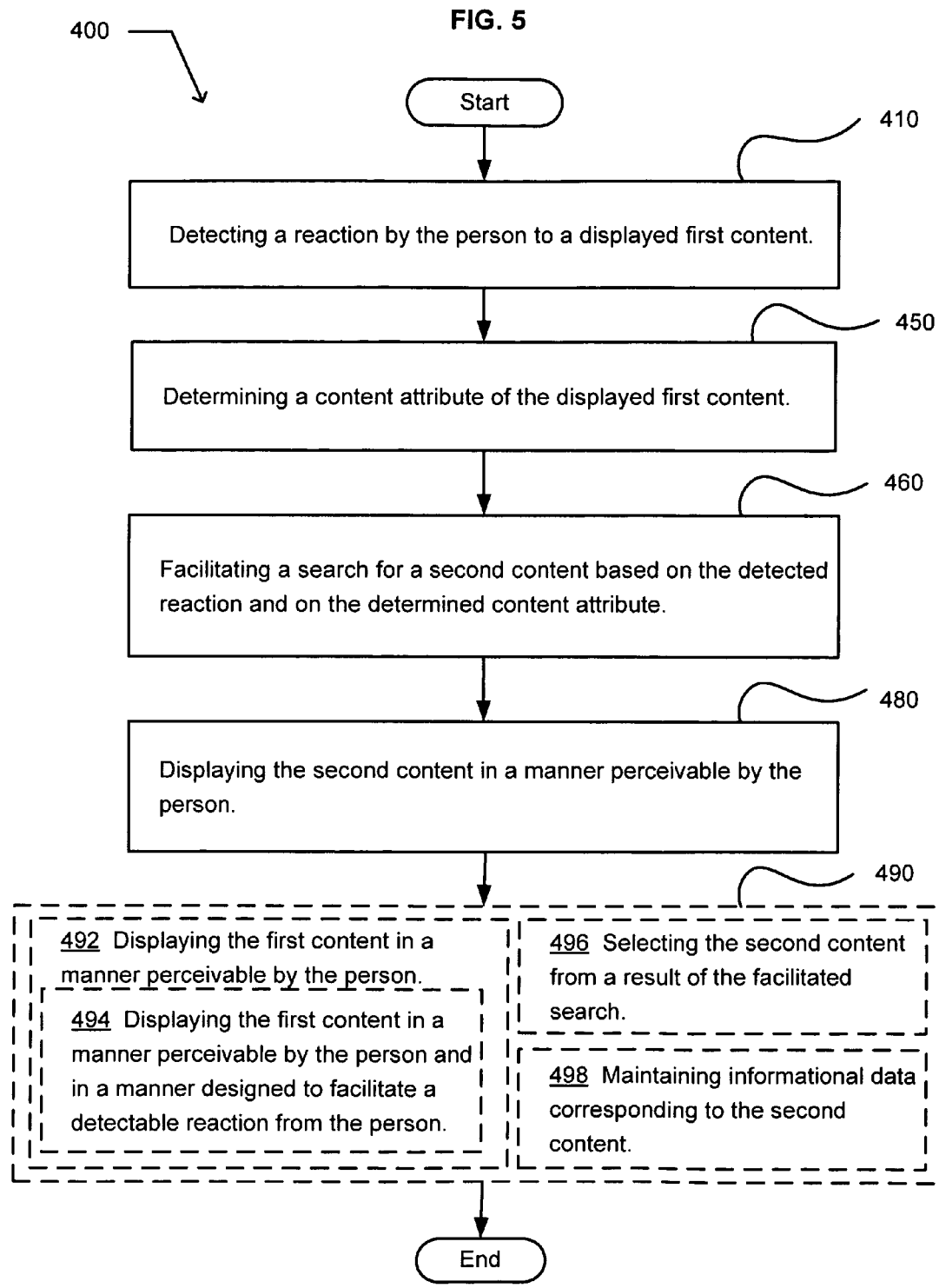
FIG. 5 illustrates an alternative embodiment of the operational flow of FIG. 4.

FIG. 5 illustrates an alternative embodiment of the operational flow 400 of FIG. 4. The operational flow may include an additional operation 490. The additional operation may include at least one of an operation 492, an operation 494, an operation 496, or an operation 498. The operation 492 displays the first content in a manner perceivable by the person. The operation 492 may include at least one additional operation, such as the operation 494. The operation 494 displays the first content in a manner perceivable by the person and in a manner designed to facilitate a detectable reaction from the person. The operation 496 selects the second content from a result of the facilitated search. In an embodiment, the second content may be selected in response to an algorithm that includes a machine learning aspect. In an alternative embodiment, the selection algorithm may include a pattern recognition algorithm. The operation 498 maintains informational data corresponding to the second content. The operation 490 may be implemented using at least one circuit of the additional circuits 290 of FIG. 3.

Figure 6:
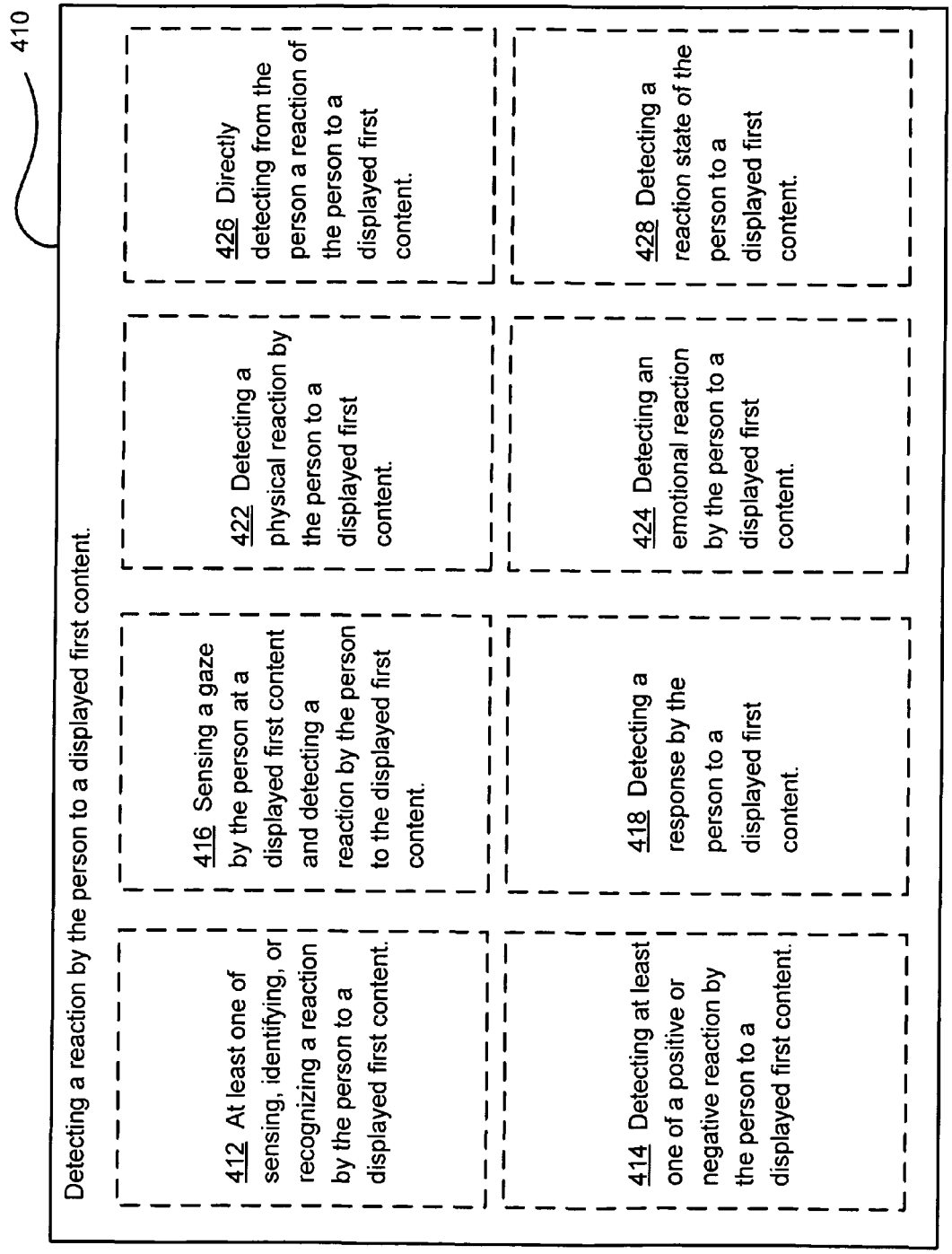
FIG. 6 illustrates another alternative embodiment of the operational flow of FIG. 4.

FIG. 6 illustrates another alternative embodiment of the operational flow 400 of FIG. 4. The observation operation 410 may include at least one additional operation. The at least one additional operation may include an operation 412, an operation 414, an operation 416, an operation 418, an operation 422, an operation 424, an operation 426, or an operation 428. The operation 412 includes at least one of sensing, identifying, or recognizing a reaction by the person to a displayed first content. The operation 412 may be implemented using the reaction circuit 212 of FIG. 3. The operation 414 includes detecting at least one of a positive or negative reaction by the person to a displayed first content. The operation 414 may be implemented using the reaction evaluation circuit 214. The operation 416 includes sensing a gaze by the person at a displayed first content and detecting a reaction by the person to the displayed first content. The operation 416 may be implemented using the gaze reaction circuit 216. The operation 418 includes detecting a response by the person to a displayed first content. The operation 418 may be implemented using the response sensor circuit 218. The operation 422 includes detecting a physical reaction by the person to a displayed first content. The operation 422 may be implemented using the physical reaction circuit 222. The operation 424 includes detecting an emotional reaction by the person to a displayed first content. The operation 424 may be implemented using the emotional reaction circuit 224. The operation 426 includes directly detecting from the person a response of the person to a displayed first content. The operation 426 may be implemented using the direct sensor circuit 226. The operation 428 includes detecting a reaction state of the person to a displayed first content. The operation 428 may be implemented using the reaction state sensor circuit 228.

FIG. 7 illustrates a further alternative embodiment of the operational flow 400 of FIG. 4. The observation operation 410 may include at least one additional operation. The at least one additional operation may include an operation 432, an operation 434, an operation 436, an operation 438, or an operation 442. The operation 432 includes detecting a reaction by the person to a displayed first content. The displayed first content includes at least one of a displayed search result, Internet search results, such as from a search provider such as Google, Yahoo, or Live Search. Alternatively, the displayed first content may include sports scores, or news. For example, the displayed search results may include a displayed result of a restaurant search, a movie search, or car repair shops. In further alternative, the displayed first content may include a program list, a music list, a file lists, or directory search result of locally stored files. The operation 434 includes detecting a reaction by the person to a displayed first content. The displayed first content includes at least one of a displayed image, avatar, icon, name, title, descriptor, or broadcasted sound. For example, a title may include a song title, a book title, or a movie title. The operation 436 includes detecting a reaction by the person to a displayed first content. The displayed first content includes at least one of a visual-based, image-based, text-based, or sound-based content. The operations 432, 434, and/or 436 may be implemented using the content characteristic circuit 232.

The operation 438 includes detecting a reaction by the person to a displayed first content. The displayed first content includes a content displayed on a surface coupled with a computing device, such as a built-in screen of the computing device or a screen physically coupled with computing device, or displayed on a surface separate from the computing device, such as projected onto a separate screen or a wall surface. The operation 442 includes detecting a reaction by the person to a displayed first content. The displayed first content includes a content displayed by at least one of a mobile communications device, handheld communications device, desktop computing device, limited resources computing device, thin computing device, or portable computing device. The operations 438 and/or 442 may be implemented using the device type detector circuit.

FIG. 8 illustrates an alternative embodiment of the operational flow 400 of FIG. 4. The analytical operation 450 may include at least one additional operation. The at least one additional operation may include an operation 452, or an operation 454. The operation 452 includes determining at least two content attributes of the displayed first content. The operation 452 may be implemented using the multiple attribute determining circuit 252. The operation 454 includes determining a content attribute of the displayed first content. The determined content attribute may include at least one of a category, tag, subject, color, texture, or theme attribute of the displayed first content. For example, a theme attribute may include a sunset, famous athlete, convict, dog, cat, horse, car, airplane, flower, people, inventor, or entertainer attribute. The operation 454 may be implemented using the attribute determining circuit 254.

FIG. 9 illustrates another alternative embodiment of the operational flow 400 of FIG. 4. The query operation 460 may include at least one additional operation. The at least one additional operation may include an operation 462, an operation 464, an operation 466, an operation 468, an operation 472, or an operation 474. The operation 462 includes searching a local data store for a second content based on the detected reaction and on the determined content attribute. In an embodiment, the local data store may include a hard drive having at least one of stored music, or stored video files. The operation 462 may be implemented using the local data store search circuit 262. The operation 464 includes facilitating a search by a search engine for a second content based on the detected reaction and on the determined content attribute. The operation 464 may be implemented using the search engine facilitating circuit 264. The operation 466 includes facilitating a search by a Web search engine for a second content based on the detected reaction and on the determined content attribute. For example, a Web search engine provides the person 205 with tools to search through Web sites, images, videos, news, and a number of other categories. In an embodiment, a Web search engine includes at least one of Google, Yahoo, or Live Search. The operation 466 may be implemented using the Web search facilitating circuit 266. The operation 468 includes facilitating a search for a second content by a search algorithm responsive to the detected reaction and on the determined content attribute. The operation 468 may be implemented using the algorithm search facilitating circuit 268. The operation 472 includes facilitating a search for at least two instances of a second content based on the detected reaction and on the determined content attribute. The operation 472 may be implemented using the multiple target search facilitating circuit 272. The operation 474 includes facilitating a search for a second content based on at least one of a positive correlation, or a negative correlation between the detected reaction and on the determined content attribute. For example, the search may be facilitated based upon a detected positive reaction by the person and on the determined content attribute to locate a second content that is more of the same as the first content. In another example, the search may be facilitated based upon a detected negative reaction by the person and on the determined content attribute to locate a second content that is different from the first content.

Figure 10:
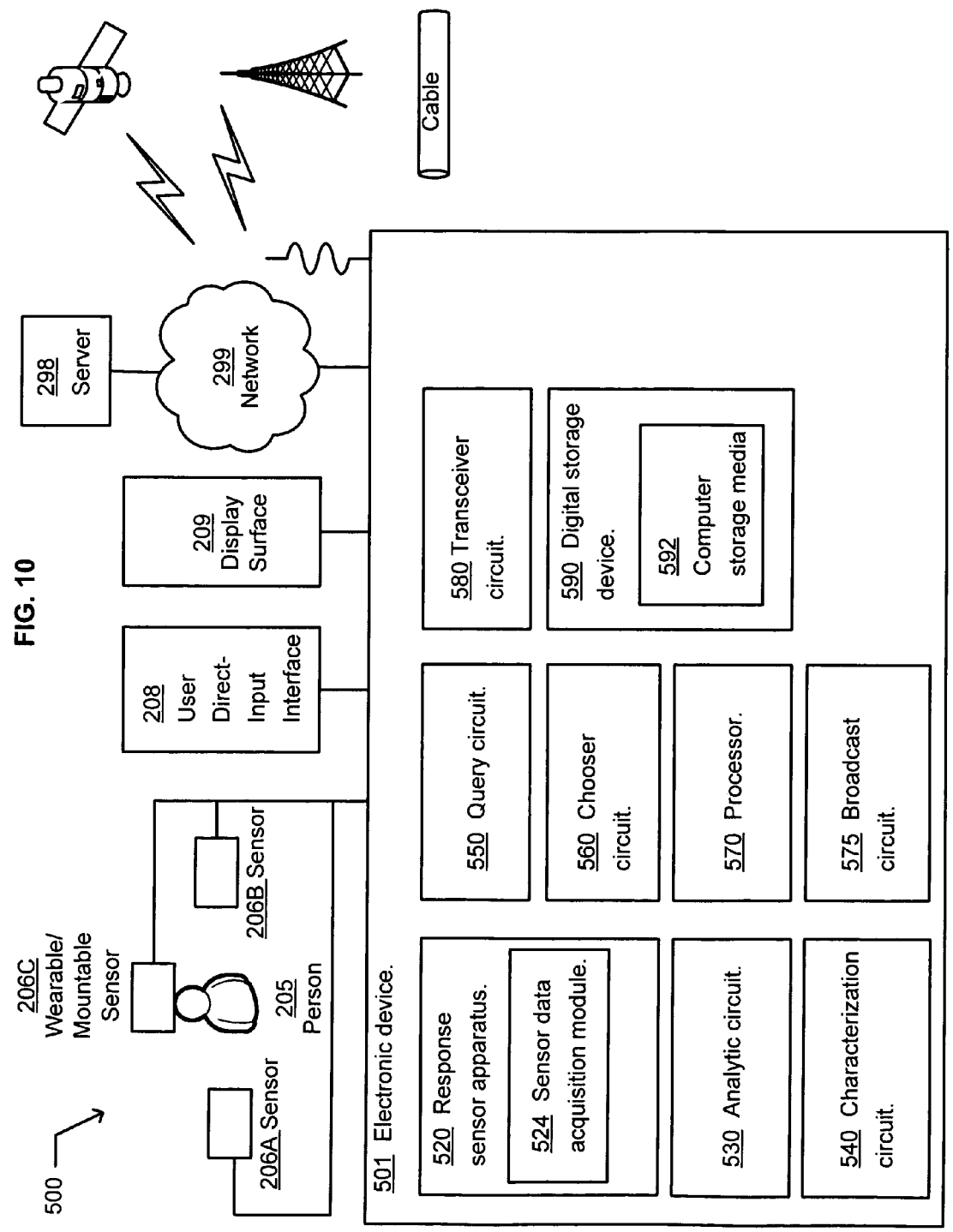
FIG. 10 illustrates an example environment.

FIG. 10 illustrates an example environment 500. The environment includes an electronic device 501 that is coupleable to a network 299, and which may be used by a person 205. The electronic device may be coupled to the network via a wired link, illustrated as a cable link, and/or a wireless link illustrated as a satellite link. The electronic device includes the user direct-input device 208, the display surface 209, a response sensor apparatus 520, an analytic circuit 530, a characterization circuit 540, a query circuit 550, and a chooser circuit 560. In an alternative embodiment, the electronic device includes at least one of a portable electronic device, or a mobile electronic device.

The display surface 209 includes a display surface operable to display electronic content in a manner perceivable by a person. In an embodiment, the electronic content includes electronically stored information. In another embodiment, electronically stored content may include electronically stored content as described in Federal Rule of Civil Procedure 26(f). In a further embodiment, electronic content may include at least one of electronically stored text, Web content, picture, image, or streaming image. The response sensor apparatus 520 includes the sensor 206A, the sensor 206B, the wearable/mountable sensor 206C, and a sensor data acquisition module 524. The response sensor apparatus includes a sensor apparatus operable to acquire data indicative of a response by the person 205 to a first electronic content displayed on the surface 209.

The analytic circuit 530 includes an analytic circuit operable determine an indication of an expression by the person corresponding with the displayed first electronic content, the determination based on the data indicative of a response. In an embodiment, the expression by the person may include at least one of an expression by the person of interest, disinterest, like, dislike, happiness, or anger. The characterization circuit 540 includes a characterization circuit operable to determine an attribute of the displayed first electronic content. The query circuit 550 includes a query circuit operable to cause a search for a second electronic content corresponding to the indication of expression and to the attribute of the first electronic content. The chooser circuit 560 includes a chooser circuit operable to select the second electronic content from a result of the search.

In an alternative embodiment, the electronic device 501 may include a digital storage device 590 operable to save the selected second electronic content. In another embodiment, the electronic device may include a broadcast circuit 575 operable to facilitate a display at least the first electronic content and the selected second electronic content. In a further embodiment, the electronic device may include a receiver circuit, illustrated as a transceiver circuit 580, operable to receive a result of the initiated search.

In an alternative embodiment, the display surface 209 may include a display surface operable to display electronic content in a manner perceivable by a person 205 and in a manner designed to facilitate sensing a response by the person. In another embodiment, the response sensor apparatus 520 may include a sensor apparatus operable to acquire data indicative of a physically manifested response by the person to a first electronic content displayed on the surface. In a further embodiment, the analytic circuit 530 may include an analytic circuit operable determine an indication of an emotional expression by the person corresponding with the displayed first electronic content, the determination based on the data indicative of a response.

FIG. 11 illustrates an example computer program product 600. The computer program product includes a computer-readable storage medium 610 bearing program instructions 620. The program instructions are operable to perform a process in a computing device. The process includes detect a reaction by a person to a displayed first content. The process also includes determine a content attribute of the displayed first content. The process further includes facilitate a search for a second content based on the detected reaction and on the determined content attribute. The process also includes select the second content from a result of the facilitated search, and save data indicative of the selected second content. In an alternative embodiment 622, the process may include facilitating a display of the selected second content.

FIG. 12 illustrates an example environment 700 that includes an electronic device 705. The electronic device includes means 710 for detecting a reaction by a person to a displayed first content. The electronic device also includes means 720 for determining a content attribute of the displayed first content. The electronic device further includes means 730 for facilitating a search for a second content based on the detected reaction and on the determined content attribute. The electronic device includes means 740 for displaying the second content in a manner perceivable by the person.

FIG. 13 illustrates an example operational flow 800 implemented in an environment that includes a person viewing content displayed by an electronic device. In an alternative embodiment, the operational flow is 800 implemented in an environment that includes a person viewing content displayed by an electronic device and directly interacting with the electronic device via a user interface. After a start operation, a discovery operation 810 includes detecting a reaction by the person to a displayed first content. In an embodiment, the detected reaction includes at least one of a detected gesture, movement, physiological, or physical reaction. A call operation 820 includes transmitting a search request for a second content corresponding to the detected reaction and to an attribute of the displayed first content. A reception operation 830 includes receiving a response to the search request that includes at least an indication of the second content. A broadcast operation 840 includes displaying the second content. The operational flow the proceeds to an end operation.

In an alternative embodiment, the operational flow may include at least one additional operation 850. The at least one additional operation may include an operation 852, and/or an operation 854. The operation 852 includes determining a content attribute of the displayed first content. The operational flow 854 includes selecting the second content from the response to the search request.

Returning to FIG. 10, an alternative embodiment of the example environment 500 includes the electronic device 501 coupleable to a network 299. The display surface 209 includes a display surface operable to display electronic content in a manner perceivable by the person 205. The response sensor apparatus 520 includes a sensor apparatus operable to acquire data indicative of a response by the person to a first electronic content displayed on the surface. The analytic circuit 530 includes an analytic circuit operable to detect a reaction by a person to a displayed first content in response to the acquired data. The query circuit 550 includes a query circuit operable to transmit a search request for a second electronic content that corresponds to the detected reaction and to an attribute of the displayed first content. For example, the search request may be addressed to the server 298 and transmitted over the network 299. The transceiver circuit 580 includes a receiver circuit operable to receive a response to the search request that includes at least an indication of the second content.

In another alternative embodiment, the chooser circuit 560 may include a chooser circuit operable to select the second electronic content from the received response to the search request. In a further embodiment, the broadcast circuit 575 may include a broadcast circuit operable to facilitate a display of the first electronic content and the second electronic content. In another embodiment, the transceiver circuit 580 may include a receiver circuit operable to receive a result of the initiated search. In a further embodiment, the digital storage device 590 may include a digital storage device operable to save the received response to the search request. In another embodiment, the display surface 209 may include a display surface operable to display electronic content in a manner perceivable by the person and in a manner designed to facilitate sensing a response by the person. In a further embodiment, the sensor apparatus 520 may include a sensor apparatus operable to acquire data indicative of a physically manifested response by the person to a first electronic content displayed on the surface.

FIG. 14 illustrates an example computer program product 860. The computer program product includes a computer-readable computer storage medium 862 bearing program instructions 864. The program instructions are operable to perform a process in a computing device. The process includes detect a reaction by a person to a displayed first content. The process also includes transmit a search request for a second content corresponding to the detected reaction and to an attribute of the displayed first content. The process further includes receive a response to the search request that includes at least an indication of the second content. The process also includes save data indicative of the received response to the search request. The process further includes display the second content. In an alternative embodiment, the process may include select the second content from the received response to the search request 866.

Figure 15:
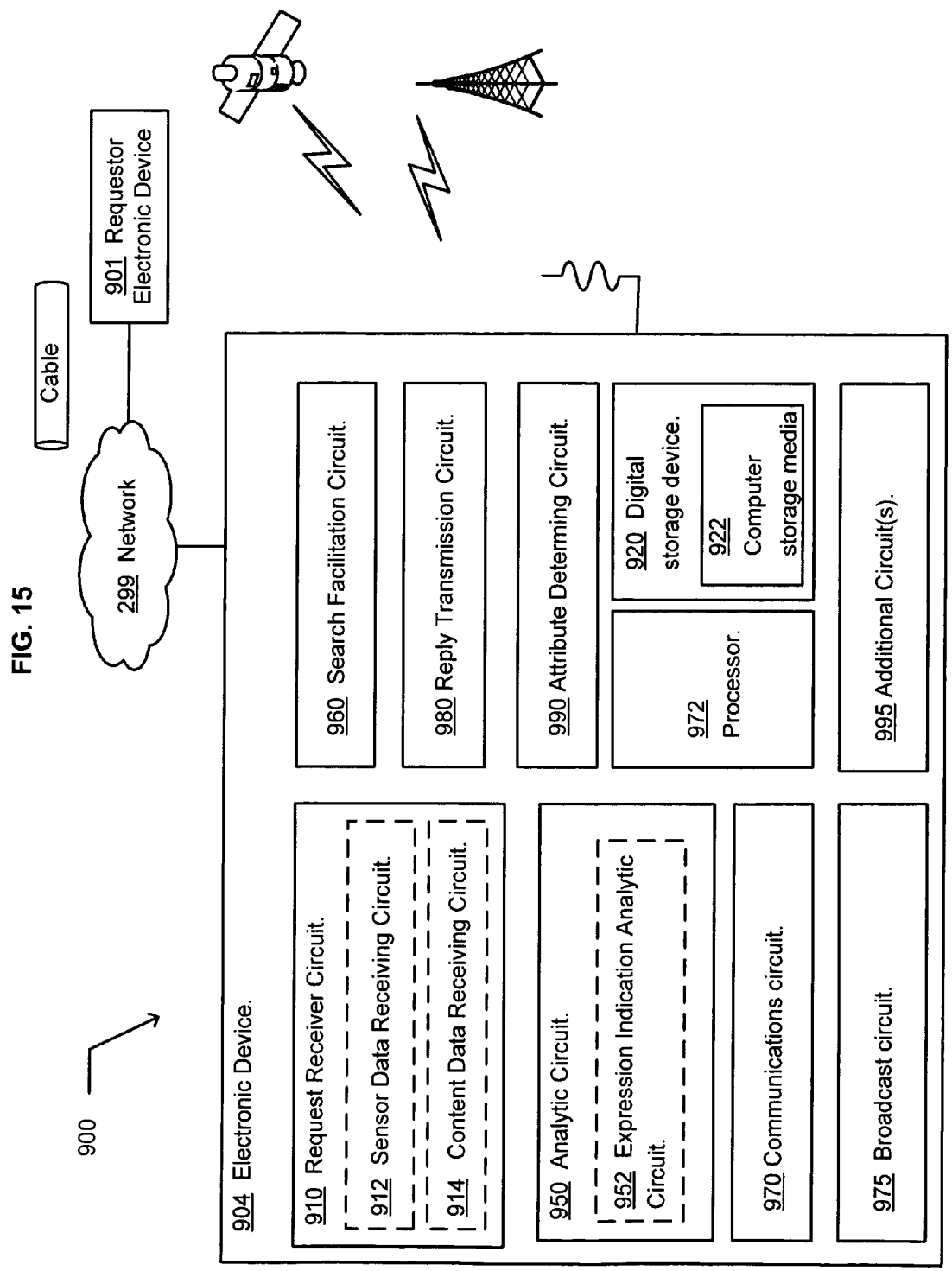
FIG. 15 illustrates an example environment in which embodiments may be implemented.

FIG. 15 illustrates an example environment 900 in which embodiments may be implemented. The example environment includes an electronic device 904 that includes a request receiver circuit 910, an analytic circuit 950, a search facilitation circuit 960, and a reply transmission circuit 980. In some embodiments, one or more of the request receiver circuit, the analytic circuit, the search facilitation circuit, and the reply transmission circuit may be structurally distinct from the remaining circuits or the electronic device. The electronic device 904 may include a wired or wireless access to a requester electronic device 901 via the network 299 using the communications circuit 970. In an alternative embodiment, the electronic device may be coupled to the network via a wireless link, a satellite link, and/or a wired link. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware.

The electronic device 904 may include at least one additional circuit. The at least one additional circuit may include additional circuit(s) 995. In addition, the electronic device may include a processor 972, such as the processing unit 21 described in conjunction with FIG. 1, and/or the processor 120 described in conjunction with FIG. 2. In further addition, the electronic device may include a digital storage media 920, a communications circuit 970, and/or a broadcast circuit 975. In an embodiment, the electronic device 904 may include a network server electronic device, or a group of network server electronic devices.

In an embodiment, the request receiver circuit 910 may include at least one additional circuit. The at least one additional circuit may include at least one of a sensor data receiving circuit 912, and/or a content data receiving circuit 914. In another embodiment, the analytic circuit 950 may include at least one additional circuit, such as an expression indication analytic circuit 952.

Figure 16:
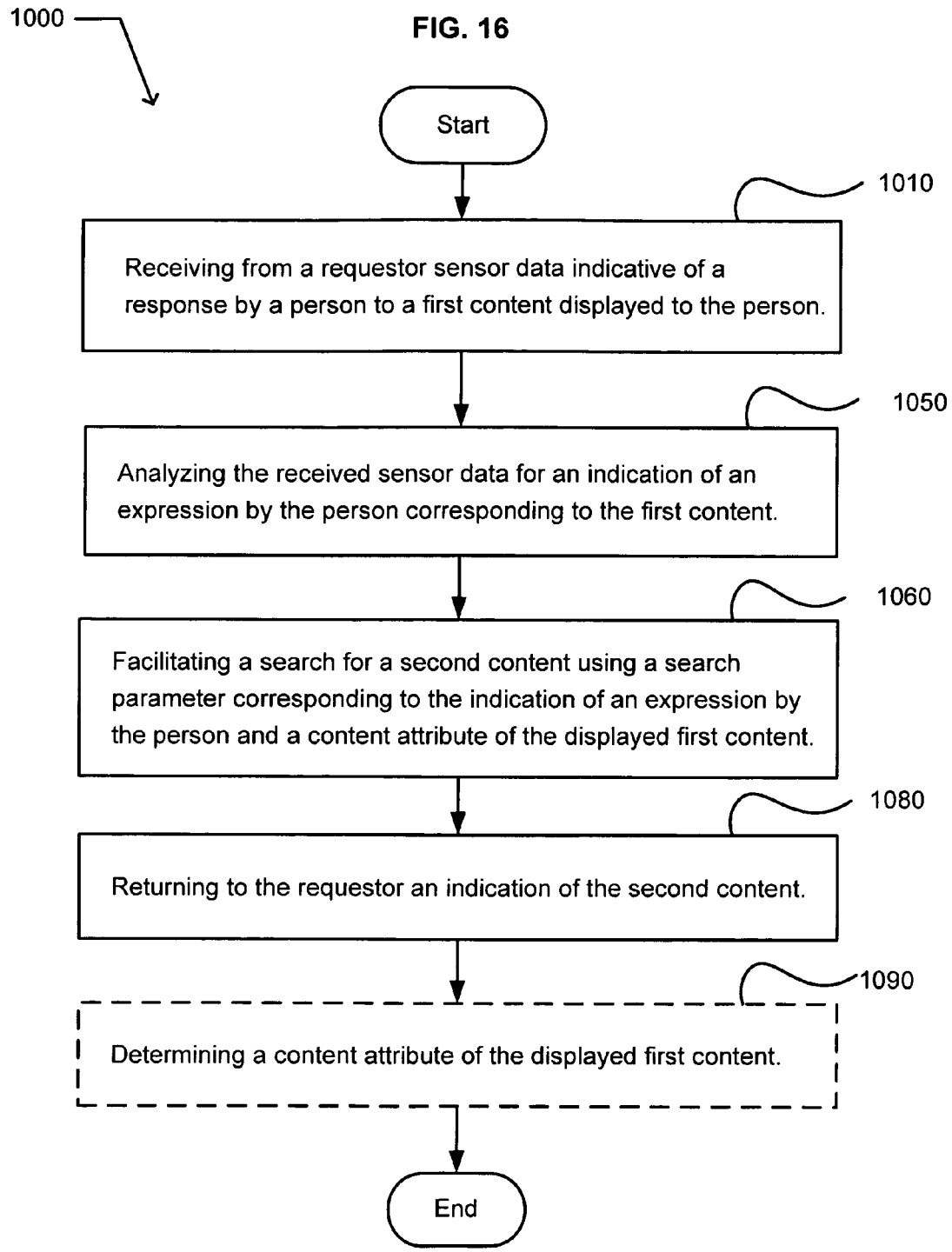
FIG. 16 illustrates an example operational flow.

FIG. 16 illustrates an example operational flow 1000. FIG. 16 and several following figures may include various examples of operational flows, discussions, and explanations with respect to the above-described environment 900 of FIG. 15, and/or with respect to other examples and contexts. However, it should be understood that the operational flows may be executed in a number of other environments and contexts, and/or in modified versions of FIG. 15. Also, although the various operational flows are illustrated in a sequence(s), it should be understood that the various operations may be performed in other orders than those which are illustrated, and/or may be performed concurrently.

After a start operation, the operational flow 1000 includes a reception operation 1010. The reception operation includes receiving, from a requester, sensor data indicative of a response by a person to a first content displayed to the person. In an alternative embodiment, the reception operation includes receiving the sensor data from a requestor via at least one of a network, or the Internet. The reception operation may be implemented using the request circuit 910 of FIG. 15. An analysis operation 1050 includes analyzing the received sensor data for an indication of an expression by the person corresponding to the first content. The analysis operation may be implemented using the analytic circuit 950. A query operation 1060 includes facilitating a search for a second content using a search parameter corresponding to the indication of an expression by the person and to a content attribute of the displayed first content. In an alternative embodiment, the search may include at least one of a search of a local data store, a search by a search engine, or a search by a Web search engine. The query operation may be implemented using the search circuit 960. A reply operation 1080 includes returning to the requestor an indication of the second content. The indication of the second content may be returned to the requester via at least one of a network, or the Internet. The reply operation may be implemented using the reply transmission circuit 980. The operational flow 400 includes an end operation.

In an alternative embodiment, the operational flow 1000 may include at least one additional operation, such as an operation 1090. The operation 1090 includes determining a content attribute of the displayed first content. The operation 1090 may be implemented using the attribute determining circuit 990.

Figure 17:
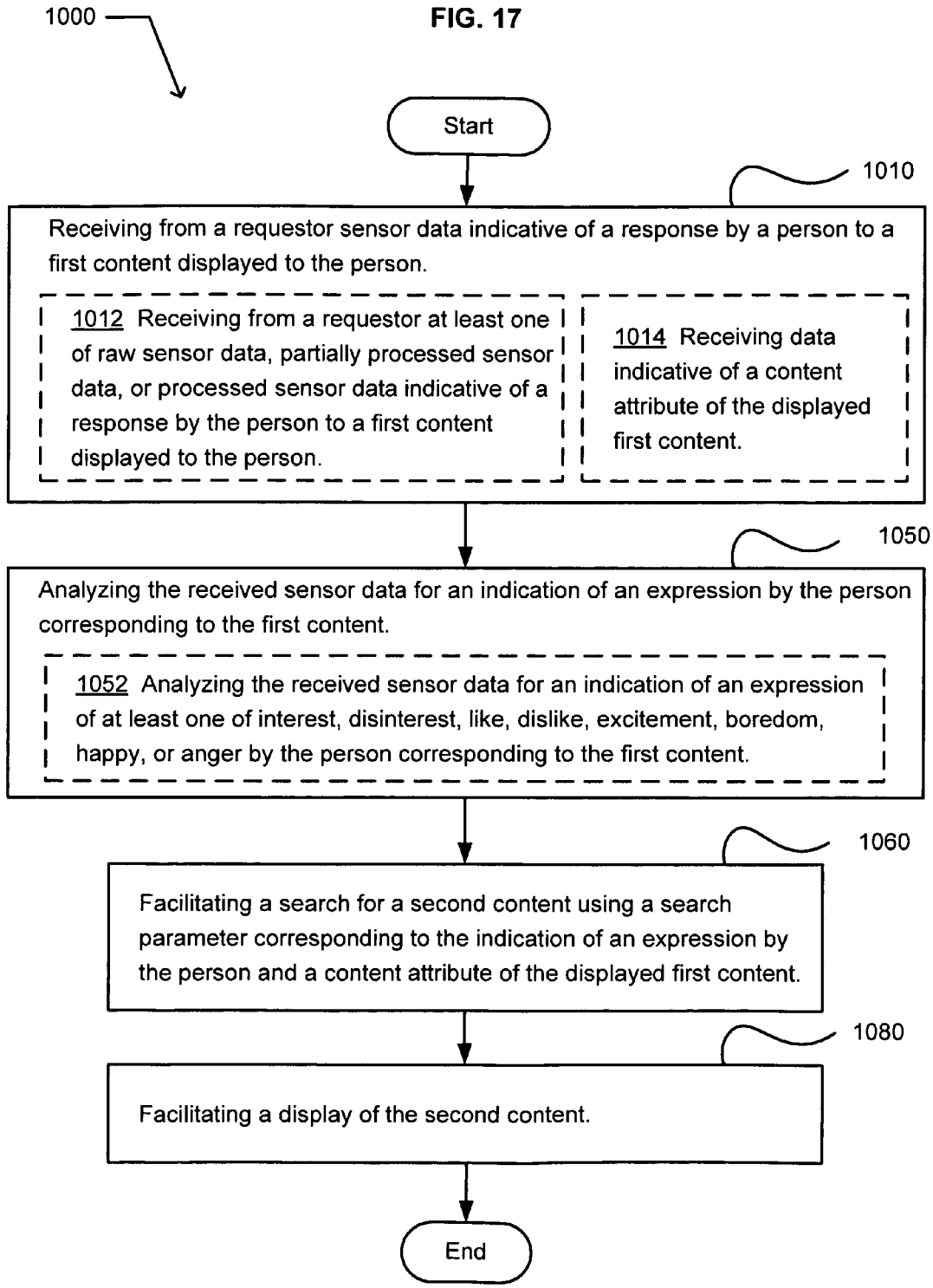
FIG. 17 illustrates another alternative embodiment of the operational flow of FIG. 16.

FIG. 17 illustrates another alternative embodiment of the operational flow 1000 of FIG. 16. The reception operation 1010 may include at least one additional operation. The at least one additional operation may include an operation 1012, or an operation 1014. The operation 1012 includes receiving from a requester at least one of raw sensor data, partially processed sensor data, or processed sensor data indicative of a response by the person to a first content displayed to the person. The operation 1012 may be implemented using the sensor data receiving circuit 912. The operation 1014 includes receiving data indicative of a content attribute of the displayed first content. The operation 1014 may be implemented using content data receiving circuit 914.

The analysis operation 1050 may include at least one additional operation, such as an operation 1052. The operation 1052 includes analyzing the received sensor data for an indication of an expression of at least one of interest, disinterest, like, dislike, excitement, boredom, happy, or anger by the person corresponding to the first content. The operation 1052 may be implemented using the expression indication analytic circuit 952.

Figure 18:
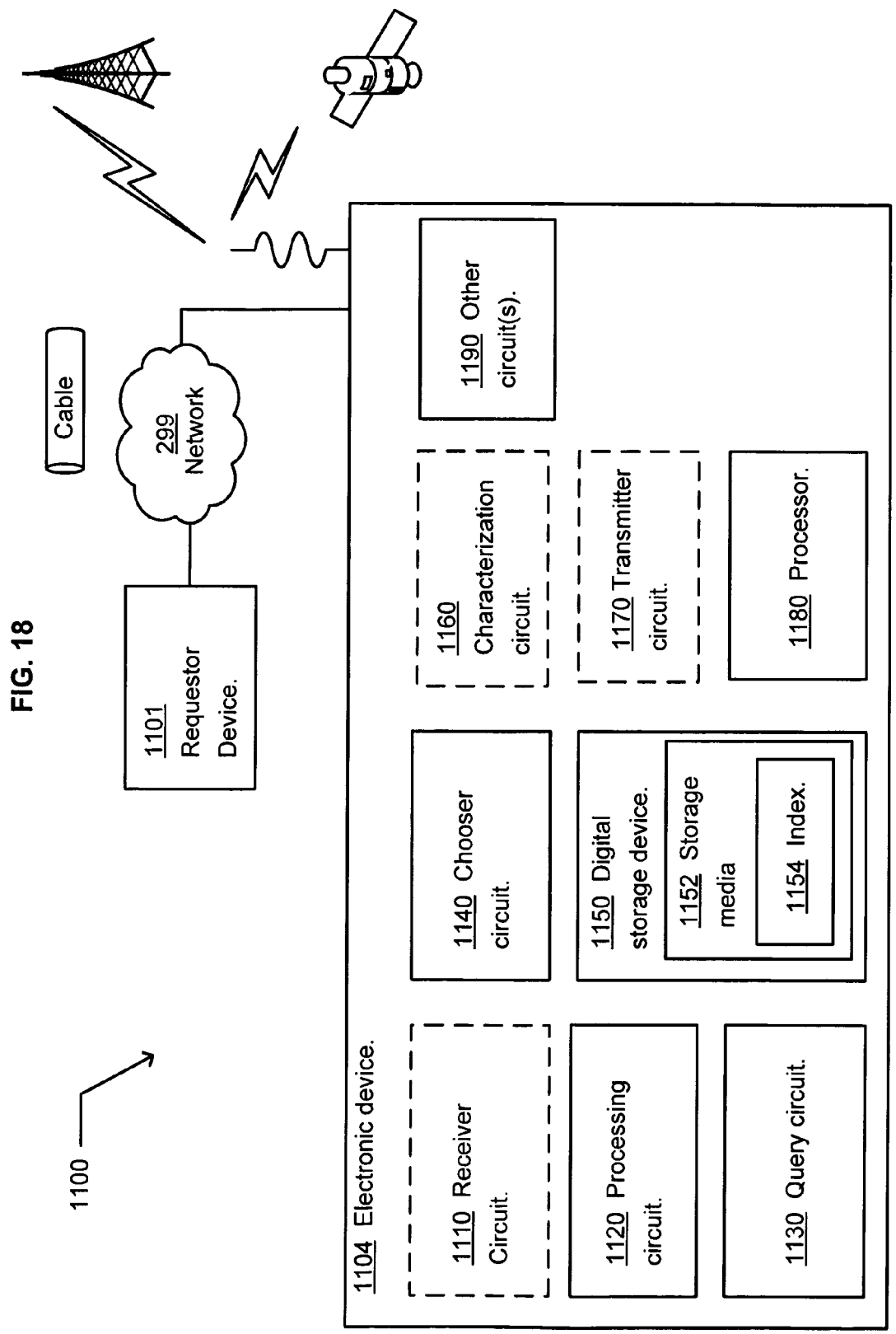
FIG. 18 illustrates an example system.

FIG. 18 illustrates an example system 1100. The example system includes an electronic device 1104 operable to exchange communications with a requester device 1101 using the network 299, via for example, a wireless link, a satellite link, and/or a wired link. The electronic device includes a processing circuit 1120, a query circuit 1130, a chooser circuit 1140, and a digital storage device 1150. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machinery of the electronic device may be implemented in hardware, software, and/or firmware.

The processing circuit 1120 includes a processing circuit operable to analyze received sensor data for an indication of an expression by a person corresponding to a first displayed electronic content. For example, the received sensor data may include sensor data acquired by the response sensing apparatus 206 described in conjunction with FIG. 3. The query circuit 1130 includes a query circuit operable to cause a search for a second electronic content based on the indication of expression and on an attribute of the displayed first electronic content. In an alternative embodiment, the query circuit may include a query circuit operable to cause a search of an index for a second electronic content based on the indication of expression and on an attribute of the displayed first electronic content. In an embodiment, the search for a second electronic content may include a search of an index 1154 saved on the digital storage device. In another embodiment, the search for a second electronic content may include a search of at least one of a Web database, Web index, directory index, file index, content of a directory, or content of a file.

The chooser circuit 1140 includes a chooser circuit operable to select the second electronic content from a result of the search for a second electronic content. The digital storage device 1150 includes a storage device operable to save an indication of the selected second electronic content. For example, the indication of the selected second electronic content may be saved in a storage media 1152.

In an alternative embodiment, the electronic device 1104 may include a characterization circuit 1160 operable to determine the attribute of the displayed first electronic content. In another embodiment, the electronic device may include a transmitter circuit 1170 operable to send an indication of the selected second electronic content addressed to the requester. In a further embodiment, the electronic device may include a receiver circuit 1110 operable to receive from a requestor sensor data acquired from a person and indicative of a response by the person to a display of a first electronic content. The receiver circuit may further include a receiver circuit operable to receive from a requestor sensor data acquired from the person and indicative of a response by the person to a display of a first electronic content, and to receive data that is indicative of the displayed first electronic content.

FIG. 19 illustrates an example computer program product. The computer program product includes a computer-readable medium 1210 bearing the program instructions. The computer program product also includes program instructions 1220 operable to perform a process in a computing device. The process includes receive sensor data from a requestor indicative of a response by a person to a viewed first content. The process also includes analyze the received sensor data for an indication of an expression by the person corresponding to the viewed first content. The process further includes facilitate a search of an index for a second content using a search parameter corresponding to the indicated expression and to a content attribute of the viewed first content. The process also includes return to the requestor an indication of the second content.

In an alternative embodiment, the process further includes select the second content from a result of the search for a second content 1222. In another embodiment, the process further includes save data indicative of the selected second content 1224. In another embodiment, the computer-readable medium includes a computer storage medium.

FIG. 20 illustrates an example system 1300 that includes an electronic device 1305. The electronic device includes means 1310 for receiving data from a requester indicative of a sensed response by a person to a first content displayed to the person. The electronic device also includes means 1320 for analyzing the received data for an indication of an expression by the person corresponding to the first content. The electronic device further includes means 1330 for facilitating a search for a second content using a search parameter corresponding to the indication of an expression by the person and to a content attribute of the displayed first content. The electronic device also includes means 1340 for returning to the requestor an indication of the second content. In alternative embodiments, the electronic device may include means 1350 for receiving an indication of a content attribute of the displayed first content. The electronic device may include means 1360 for determining a content attribute of the displayed first content.

Figure 21:
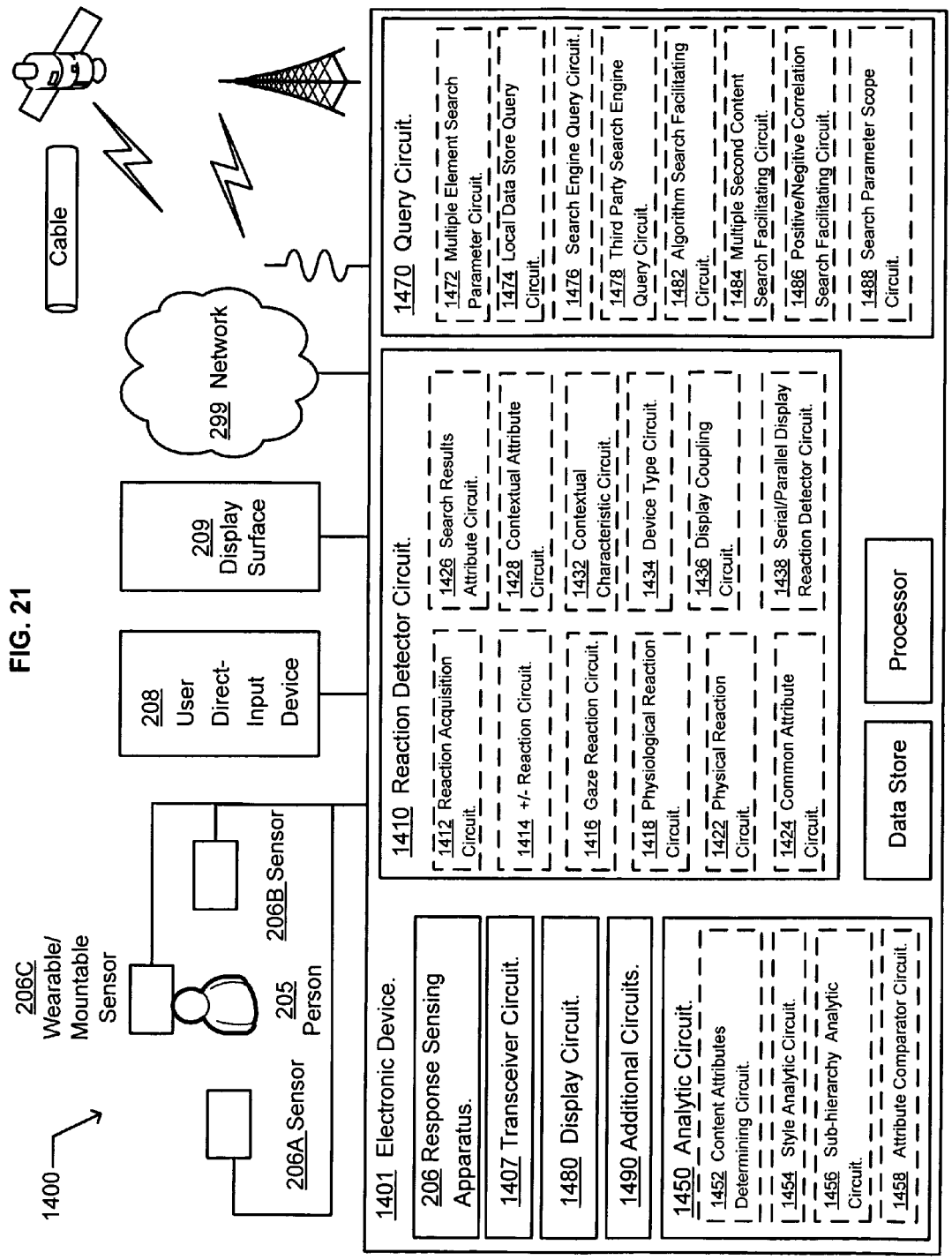
FIG. 21 illustrates an example environment in which embodiments may be implemented.

FIG. 21 illustrates an example environment 1400 in which embodiments may be implemented. The example environment includes an electronic device 1401, a response sensing apparatus 206, a transceiver circuit 1407, a user direct-input device 208, and a display surface 209. In some embodiments, one or more of the response sensing apparatus, the transceiver circuit, the user direct-input interface, and the display surface may be structurally distinct from the remaining circuits or the electronic device. The display surface may be physically incorporated with the electronic device, or may be physically separate from the electronic device and electronically coupled with the device.

The electronic device 1401 may include a wired or wireless access to digital content using the transceiver 1407, such as via a network 299. In an alternative embodiment, the electronic device may be coupled to the network via a wireless link, a satellite link, and/or a wired link.

In an embodiment, the electronic device 1401 includes a reaction detector circuit 1410, an analytic circuit 1450, a query circuit 1470, and a display circuit 1480. In some embodiments, one or more of the reaction detector circuit, the analytic determining circuit, the query circuit, and/or the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 1401 using the user direct-input device 208.

The electronic device 1401 may include at least one additional circuit. The at least one additional circuit may include additional circuits 1490. In addition, the electronic device may include a processor (not illustrated), such as the processing unit 21 described in conjunction with FIG. 1, and/or the processor 120 described in conjunction with FIG. 2. In further addition, the electronic device may include a computer storage media illustrated as a data store. In an embodiment, the electronic device may include a mobile electronic device.

In an embodiment, the reaction detector circuit 1410 may include at least one additional circuit. The at least one additional circuit may include at least one of a reaction acquisition circuit 1412, positive/negative reaction circuit 1414, a gaze reaction circuit 1416, a physiological reaction circuit 1418, a physical reaction circuit 1422, a common attribute circuit 1424, a search results attribute circuit 1426, a contextual attribute circuit 1428, a content characteristic circuit 1432, a device type circuit 1434, a display coupling circuit 1436, and/or a serial/parallel display reaction detector circuit 1438.

In another embodiment, the analytic circuit 1450 may include at least one additional circuit. The at least one additional circuit may include at least one of a content attributes determining circuit 1452, a style analytic circuit 1454, a sub-hierarchy analytic circuit 1458, or an attribute comparator circuit 1458.

In a further embodiment, the query circuit 1470 may include at least one additional circuit. The at least one additional circuit may include at least one of a multiple element search parameter circuit 1472, a local data store query circuit 1474, a search engine query circuit 1476, a third party search engine query circuit 1478, an algorithm search facilitating circuit 1482, a multiple second content search facilitating circuit 1484, a positive/negative correlation search facilitating circuit 1486, or a search parameter scope circuit 1488.

Figure 22:
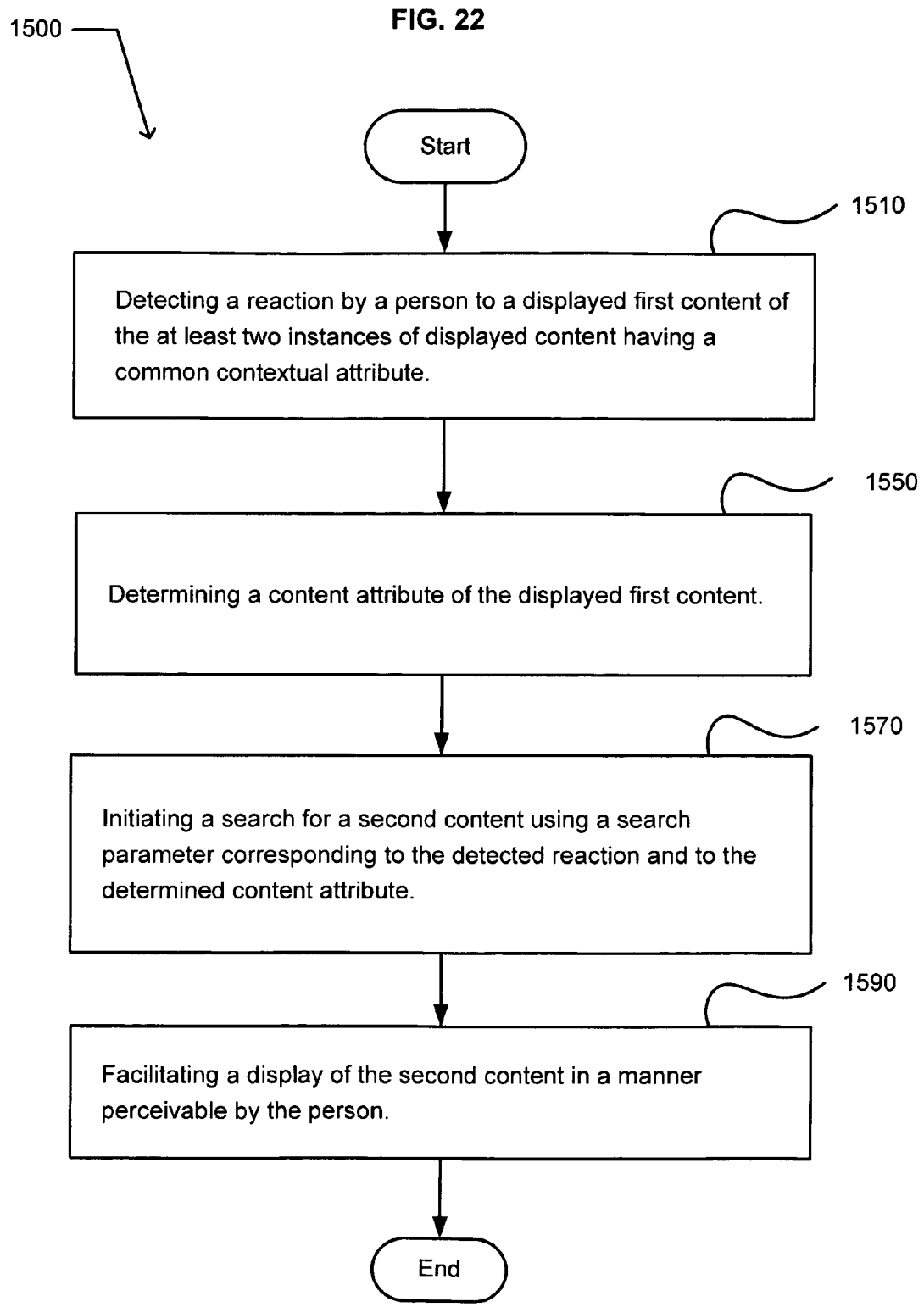
FIG. 22 illustrates an example operational flow implemented in an environment that includes a person viewing at least two instances of content having a common contextual attribute and displayed by an electronic device.

FIG. 22 illustrates an example operational flow 1500 implemented in an environment that includes a person viewing at least two instances of content having a common contextual attribute and displayed by an electronic device. In an alternative embodiment, the environment further includes an environment that includes a person directly interacting with the electronic device using a user direct-input device and viewing at least two instances of content displayed having a common contextual attribute and by an electronic device. FIG. 22 and several following figures may include various examples of operational flows, discussions, and explanations with respect to the above-described environment 1400 of FIG. 21, and/or with respect to other examples and contexts. However, it should be understood that the operational flows may be executed in a number of other environments and contexts, and/or in modified versions of FIG. 21. Also, although the various operational flows are illustrated in a sequence(s), it should be understood that the various operations may be performed in other orders than those which are illustrated, and/or may be performed concurrently.

After a start operation, the operational flow 400 includes an observation operation 1510. The observation operation includes detecting a reaction by a person to a displayed first content of the at least two instances of displayed content having a common contextual attribute. The observation operation may be implemented using the reaction detector circuit 1410 of FIG. 21, and/or the response sensing apparatus 206 of FIG. 3. In an alternative embodiment, the reaction detector circuit 1410 is at least substantially similar to the reaction detector circuit 210 of FIG. 3.

An analytical operation 1550 includes determining a content attribute of the displayed first content. The analytical operation may be implemented using the analytic circuit 1550. A query operation 1570 includes initiating a search for a second content using a search parameter corresponding to the detected reaction and to the determined content attribute. The query operation may be implemented using the query circuit 1470. A broadcast operation 1590 includes facilitating a display of the second content in a manner perceivable by the person. The broadcast operation may be implemented using the display circuit 1480. The operational flow 400 then proceeds to an end operation.

Figure 23:
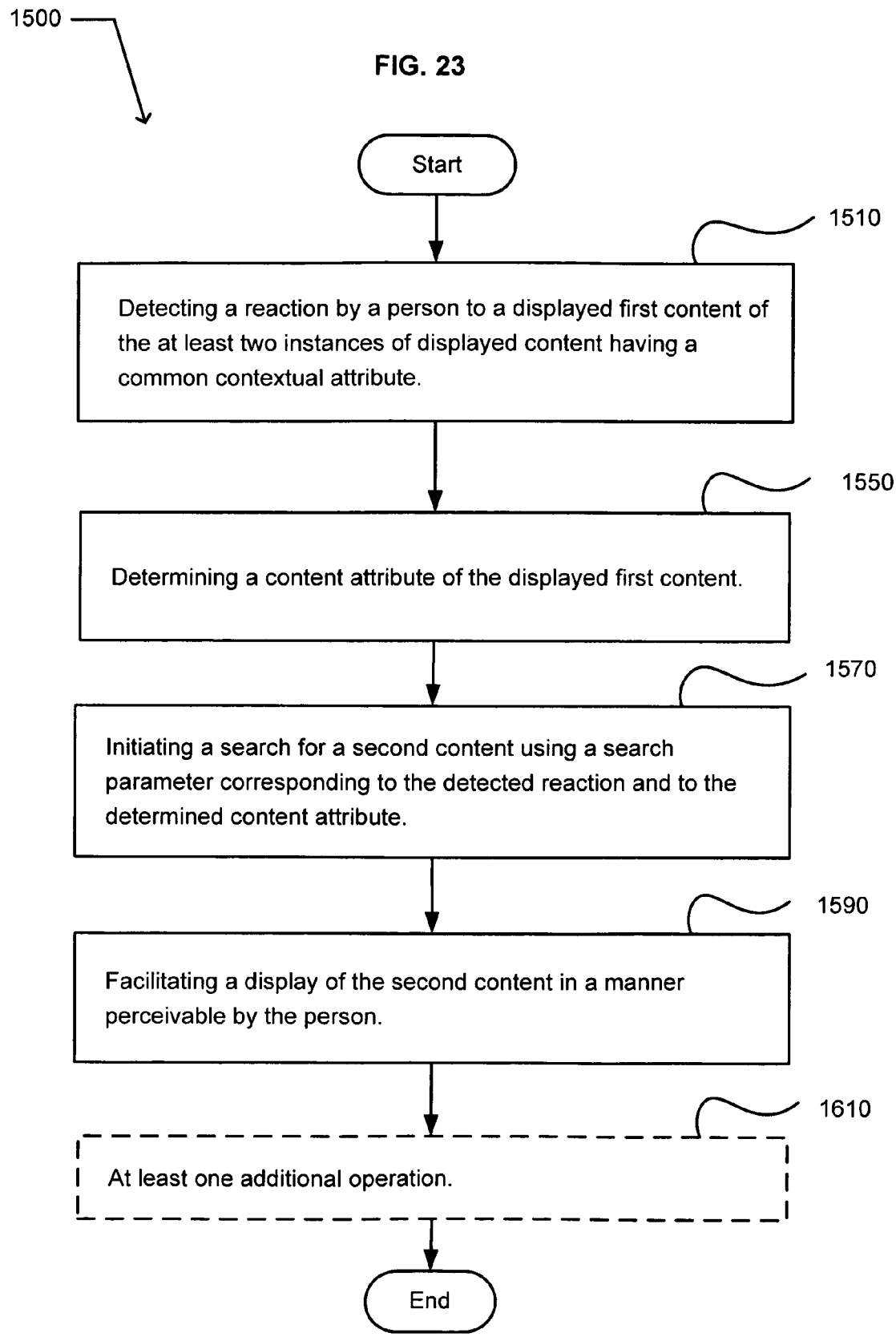
FIGS. 23 and 24 illustrate an alternative embodiment of the operational flow of FIG. 22.
Figure 24:
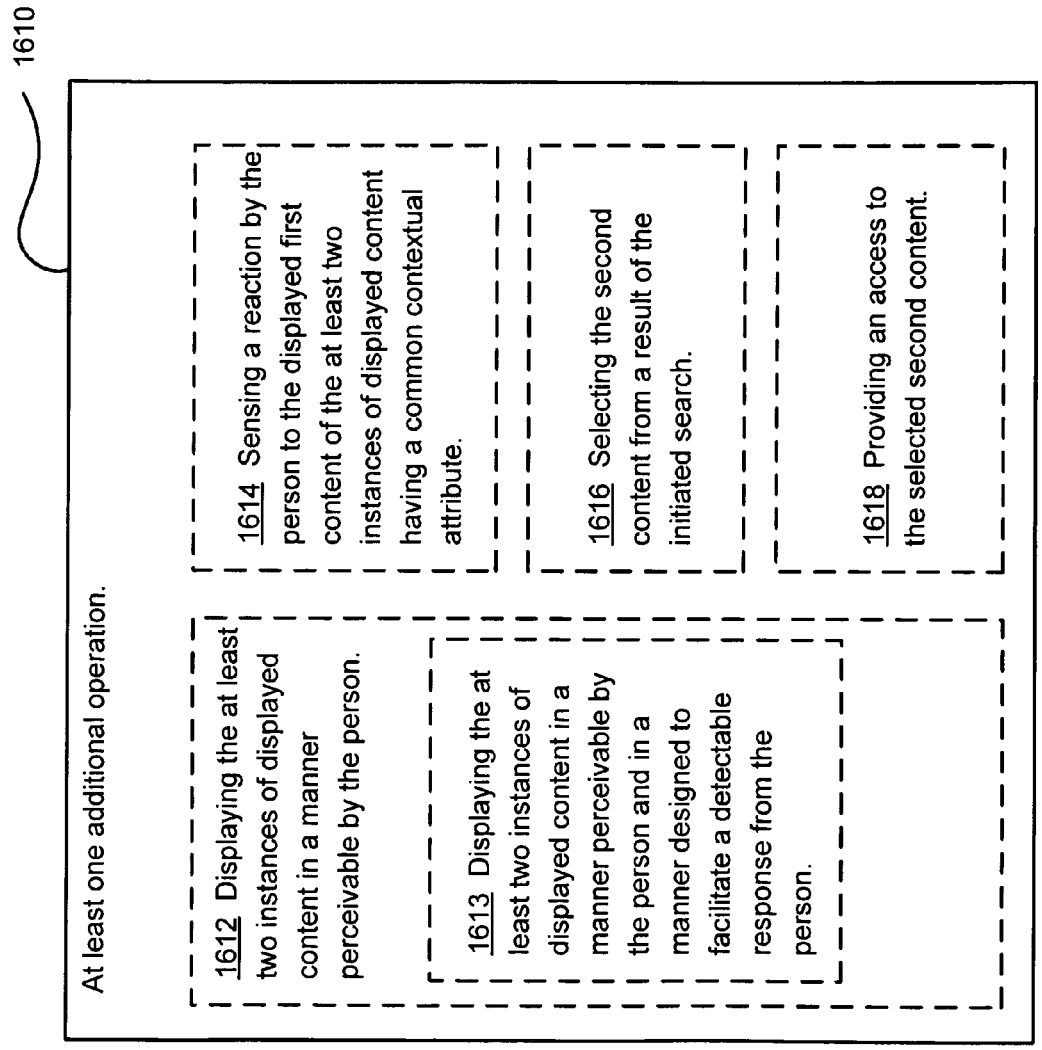

FIGS. 23 and 24 illustrate an alternative embodiment of the operational flow 1400 of FIG. 22. The operational flow may include at least one additional operation, illustrated as an operation 1610. The operation 1610 may include at least one of an operation 1612, an operation 1614, an operation 1616, or an operation 1618. The operation 1612 includes displaying the at least two instances of displayed content in a manner perceivable by the person. In an alternative embodiment, the operation 1612 may include at least one additional embodiment such as the operation 1613. The operation 1613 includes displaying the at least two instances of displayed content in a manner perceivable by the person and in a manner designed to facilitate a detectable response from the person. The operation 1612 and/or operation 1613 may be implemented using the display circuit 1480 and/or the display device 1409 of FIG. 21. The operation 1614 includes sensing a reaction by the person to the displayed first content of the at least two instances of displayed content having a common contextual attribute. The operation 1614 may be implemented using the response sensing apparatus 206 and its associated sensors 206A, 206B, and/or 206C. The operation 1616 includes selecting the second content from a result of the initiated search. The operation 1616 may be implemented using a circuit of the additional circuits 1490. The operation 1618 includes providing an access to the selected second content. The operation 1618 may be implemented using a circuit of the additional circuits 1490.

FIG. 25 illustrates an alternative embodiment of the operational flow 1400 of FIG. 22. The observation operation 1510 may include at least one additional operation. The at least one additional operation may include an operation 1512, an operation 1514, an operation 1516, an operation 1518, an operation 1522, or an operation 1524. The operation 1512 includes at least one of sensing, identifying, or recognizing a reaction by a person to a displayed first content of the at least two instances of displayed content having a common contextual attribute. The operation 1512 may be implemented using the reaction acquisition circuit 1412. The operation 1514 includes detecting at least one of a positive or negative reaction by a person to a displayed first content of the at least two instances of displayed content having a common contextual attribute. The operation 1514 may be implemented using the positive/negative reaction circuit 1414. The operation 1516 includes sensing a gaze by a person at a displayed first content of the at least two instances of displayed content and detecting a reaction by a person to the displayed first content. In an embodiment for example, the person 205 may gaze across a result displayed on the display surface 1409 from a search of the Internet, the displayed result including at least two instances of search results. Each of the at least two instances of displayed search results may be displayed textually on separate lines, or the at least two instances of displayed search results may be representatively and pictorially displayed by figures or pictures. For example, a result of a search of the word "Caesar" may be pictorially displayed by a picture of a statue of the Emperor Caesar, a picture of a Caesar salad, and a picture of Caesar's Italian restaurant. The operation 1516 in this example would include sensing the person's gaze across a first displayed picture of these pictorially represented search results, and detect a reaction by the person to the first picture of the three displayed pictures. For example, the operation 1516 may sense person's gaze on the picture of Caesar's Italian restaurant and detect a reaction. A positive reaction may be detected from the person to the picture of Caesar's Italian restaurant because the person is hungry and looking for a nearby Italian restaurant. The operation 1516 may be implemented using the gaze reaction circuit 1416.

The operation 1518 includes detecting a physiological reaction by a person to a displayed first content of the at least two instances of displayed content having a common contextual attribute. The operation 1518 may be implemented using the physiological reaction circuit 1418. The operation 1522 includes detecting a physiological response by a person to a displayed first content of the at least two instances of displayed content having a common contextual attribute. The operation 1522 may be implemented using the physical reaction circuit 1422. The operation 1524 includes detecting a reaction by a person to a displayed first content of the at least two instances of displayed content having a common contextual attribute. The common contextual attribute including the at least two instances of displayed content having been returned in response to a search request. The operation 1524 may be implemented using the common attribute circuit 1424.

Figure 26:
FIG. 26 illustrates a further alternative embodiment of the operational flow of FIG. 22.

FIG. 26 illustrates a further alternative embodiment of the operational flow 1500 of FIG. 22. The observation operation 1510 may include at least one additional operation. The at least one additional operation may include an operation 1526, an operation 1528, an operation 1532, an operation 1534, an operation 1536, or an operation 1538. The operation 1526 includes detecting a reaction by a person to a displayed first content of the at least two instances of displayed content having a common contextual attribute. The common contextual attribute including being at least one of a displayed search result, an Internet search result, a sports result, a query result, a program list, a music list, a file list, or a directory search result. The operation 1526 may be implemented using the search results attribute circuit 1426. The operation 1528 includes detecting a reaction by a person to a displayed first content of the at least two instances of displayed content having a common contextual attribute. The at least two instances of displayed content including at least one of displayed images, avatars, icons, names, titles, or descriptors. The operation 1528 may be implemented using the contextual attribute detector circuit 1428. The operation 1532 includes detecting a reaction by a person to a displayed first content of the at least two instances of displayed content having a common contextual attribute. The common contextual attribute of at least two instances of displayed content include at least one of a displayed visual-based, image-based, text-based, or sound-based contextual attribute. The operation 1532 may be implemented using the contextual characteristic circuit 1432. The operation 1534 includes detecting a reaction by a person to a displayed first content of the at least two instances of displayed content having a common contextual attribute. The at least two instances of displayed content including content displayed by at least one of a mobile communications device, handheld communications device, desktop computing device, limited resources computing device, thin computing device, or portable computing device. The operation 1534 may be implemented using the device type circuit 1434. The operation 1536 includes detecting a reaction by a person to a displayed first content of the at least two instances of displayed content having a common contextual attribute. The displayed at least two instances of content including at least two instances of content displayed on a surface coupled with a computing device, or displayed on a surface separate from the computing device. The operation 1536 may be implemented using the display coupling circuit 1436. The operation 1538 includes detecting a reaction by a person to a displayed first content of the at least two instances of displayed content. The at least two instances of displayed content includes content displayed in at least one of a consecutive manner, or a simultaneous manner. The operation 1538 may be implemented using the serial/parallel display reaction detector circuit 1438.

Figure 27:
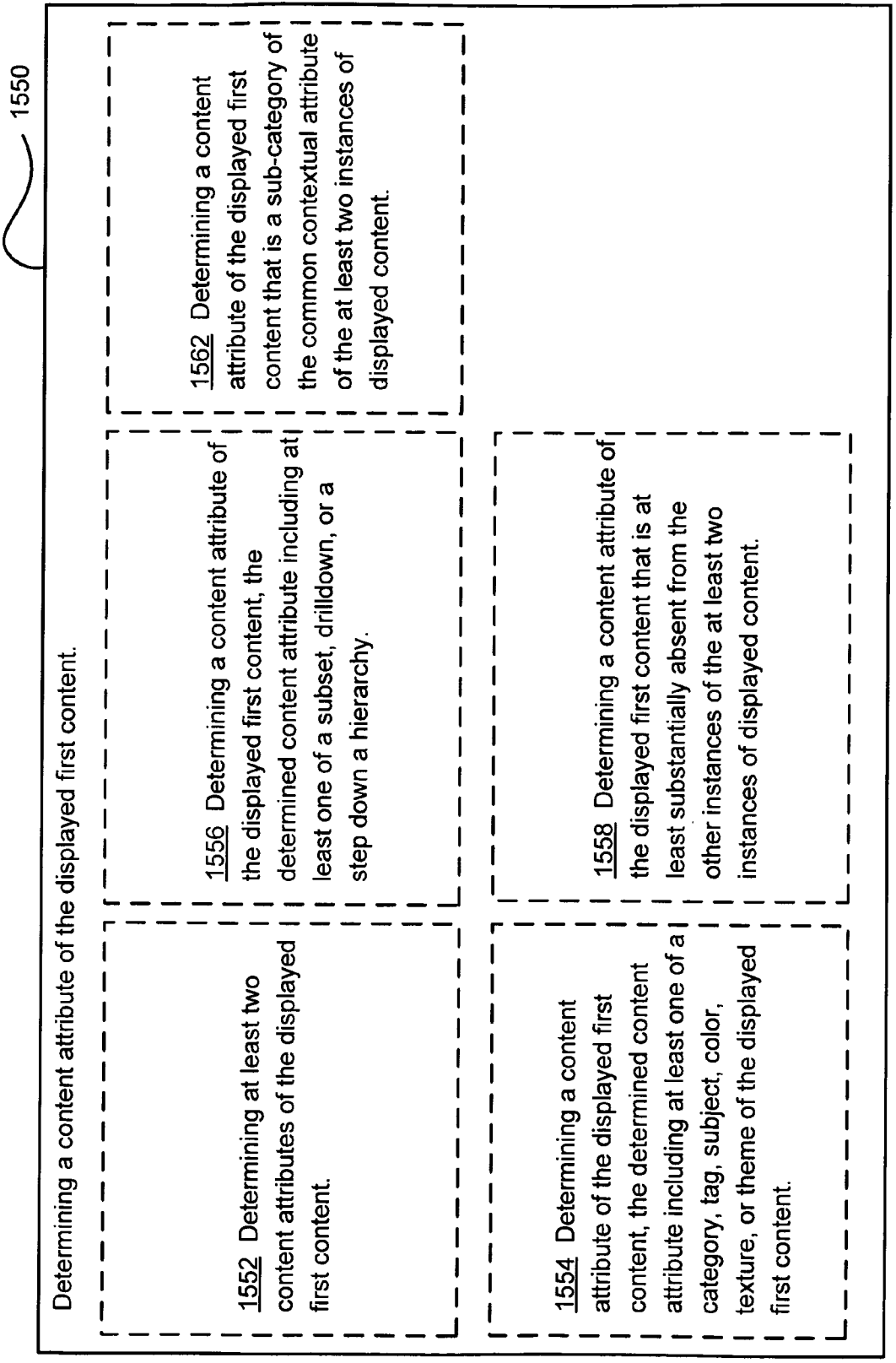
FIG. 27 illustrates an alternative embodiment of the operational flow of FIG. 22.

FIG. 27 illustrates an alternative embodiment of the operational flow 1500 of FIG. 22. The analytical operation 1550 may include at least one additional operation. The at least one additional operation may include an operation 1552, an operation 1554, an operation 1556, an operation 1558, or an operation 1562. The operation 1552 includes determining at least two content attributes of the displayed first content. The operation 1552 may be implemented using the content attributes determining circuit 1452. The operation 1554 includes determining a content attribute of the displayed first content. The determined content attribute including at least one of a category, tag, subject, color, texture, or theme of the displayed first content. For example, a theme may include sunsets, famous athletes, convicts, dogs, cats, horses, cars, airplanes, flowers, people, inventors, or entertainers. The operation 1554 may be implemented using the style analytic circuit 1454. The operation 1556 includes determining a content attribute of the displayed first content, the determined content attribute including at least one of a subset, drilldown, or a step down a hierarchy. The operation 1556 may be implemented using the sub-hierarchy analytic circuit 1456. The operation 1558 includes determining a content attribute of the displayed first content that is at least substantially absent from the other instances of the at least two instances of displayed content. The operation 1562 includes determining a content attribute of the displayed first content that is a sub-category of the common contextual attribute of the at least two instances of displayed content. The operations 1558 and/or 1562 may be implemented using the attribute comparator circuit 1458.

Figure 28:
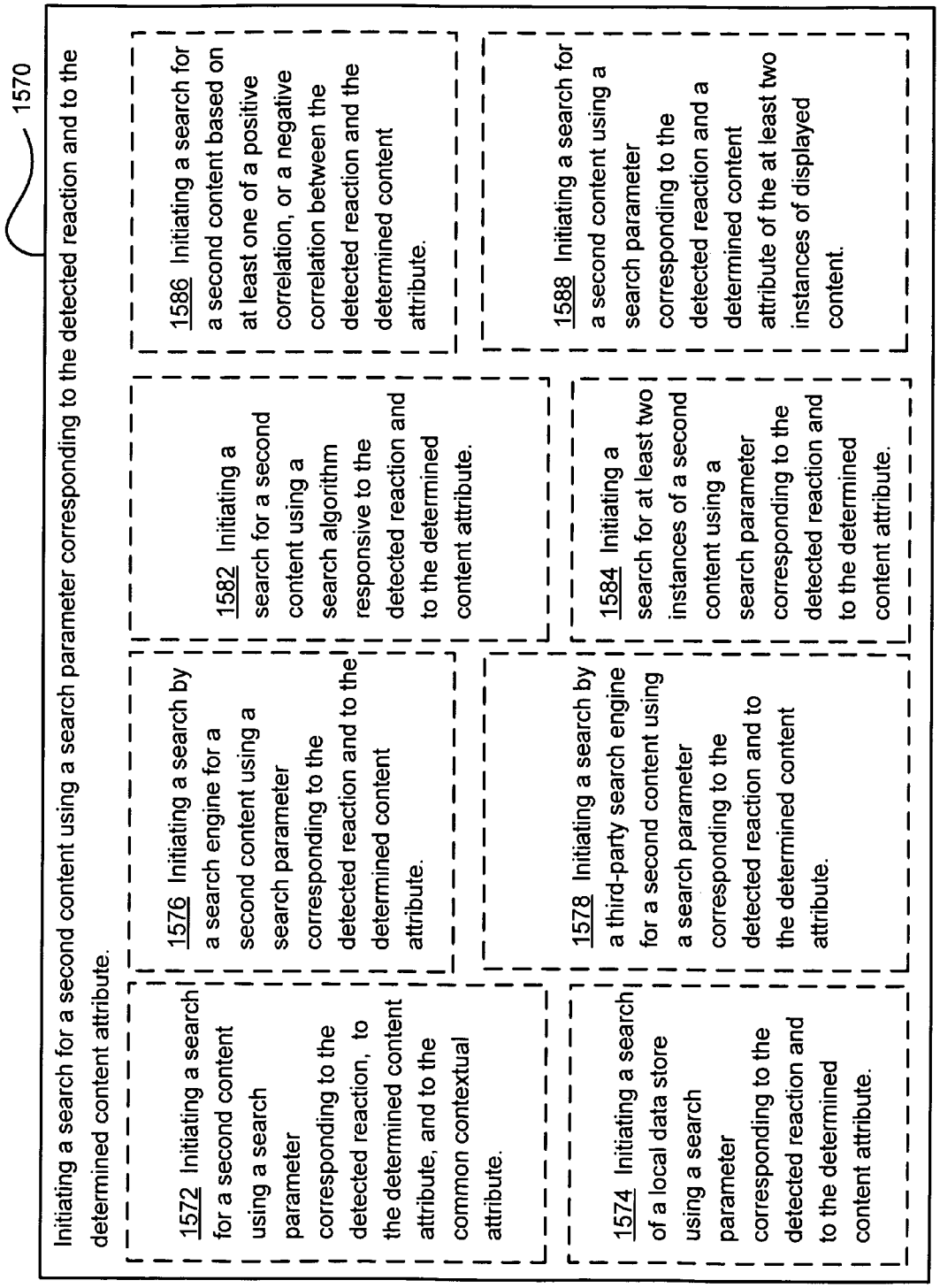
FIG. 28 illustrates another alternative embodiment of the operational flow of FIG. 22.

FIG. 28 illustrates another alternative embodiment of the operational flow 1500 of FIG. 22. The query operation 1570 may include at least one additional operation. The at least one additional operation may include an operation 1572, an operation 1574, an operation 1576, an operation 1578, an operation 1582, an operation 1584, an operation 1586, or an operation 1588. The operation 1572 includes initiating a search for a second content using a search parameter corresponding to the detected reaction, to the determined content attribute, and to the common contextual attribute. The operation 1572 may be implemented using the multiple element search parameter circuit 1572. The operation 1574 includes initiating a search of a local data store using a search parameter corresponding to the detected reaction and to the determined content attribute. The operation 1574 may be implemented using the local data store query circuit 1474. The operation 1576 includes initiating a search by a search engine for a second content using a search parameter corresponding to the detected reaction and to the determined content attribute. The operation 1576 may be implemented using the search engine query circuit 1476. The operation 1578 includes initiating a search by a third-party search engine for a second content using a search parameter corresponding to the detected reaction and to the determined content attribute. The operation 1578 may be implemented using the third party search engine query circuit 1478. The operation 1582 includes initiating a search for a second content using a search algorithm responsive to the detected reaction and to the determined content attribute. The operation 1582 may be implemented using the algorithm search facilitating circuit 1482. The operation 1584 includes initiating a search for at least two instances of a second content using a search parameter corresponding to the detected reaction and to the determined content attribute. The operation 1584 may be implemented using the multiple second content search facilitating circuit 1484. The operation 1586 includes initiating a search for a second content based on at least one of a positive correlation, or a negative correlation between the detected reaction and on the determined content attribute. The operation 1586 may be implemented using the positive/negative correlation search facilitating circuit 1486. The operation 1588 includes initiating a search for a second content using a search parameter corresponding to the detected reaction and to a determined content attribute of the at least two instances of displayed content. The operation 1588 may be implemented using the search parameter scope circuit 1488.

FIG. 29 illustrates an example environment 1700. The environment includes an electronic apparatus 1701 that is coupleable to the network 299, and which may be used by the person 205. The electronic apparatus may be coupled to the network via a wired link, illustrated as a cable link, and/or a wireless link, illustrated as a satellite link or a cellular network link. In an embodiment, the electronic apparatus may include a portable electronic apparatus, or a mobile electronic apparatus. In another embodiment, the electronic apparatus may include a wireless electronic apparatus. The electronic apparatus includes the user direct-input device 208, the display surface 209, a response sensor apparatus 1720, a target-content selector circuit 1730, a characterization circuit 1740, a query circuit 1750, and a chooser circuit 1760.

The display surface 209 includes a display surface operable to display at least two instances of electronic content in a manner perceivable by a person, such as by the person 205. The response sensor apparatus 1720 includes a sensor data acquisition module 1724, and at least one the sensor 206A, the sensor 206B, the wearable/mountable sensor 206C. The response sensor apparatus includes a sensor apparatus operable to acquire data indicative of a response by the person 205 to at least two instances electronic content displayed by the surface 209.

The response sensor apparatus 1720 includes a response sensor apparatus operable to acquire data respectively indicative of respective responses by the person 205 to a first electronic content and a response to a second electronic content of at least two instances of electronic content displayed on the display surface 209 and having a common contextual attribute. In an alternative embodiment, the response sensor apparatus further includes a response sensor apparatus operable to acquire data respectively indicative of respective responses by the person to a first electronic content and a response to a second electronic content of at least two instances of electronic content having a common contextual attribute and concurrently displayed on the surface. In another alternative embodiment, the response sensor apparatus further includes a response sensor apparatus operable to acquire data respectively indicative of respective responses by the person to a first electronic content and a response to a second electronic content of at least two instances of electronic content having a common contextual attribute and serially displayed on the surface The target content selector circuit 1730 includes a target-content selector circuit operable to select the first electronic content as an electronic content of interest over the second electronic content based at least in part on the data indicative of the response to the person to the first electronic content and to the second electronic content. In an alternative embodiment, the target-content selector circuit includes a target-content selector circuit operable to select the first electronic content as an electronic content of interest over the second electronic content by application of a target-selection algorithm that is responsive to the data indicative of the response to the person to the first electronic content and to the second electronic content. For example, the target-selection algorithm may be structured to select a target electronic content in response to a longest duration of the person's gaze with respect to the first electronic content and to the second electronic content. In another example, the target-selection algorithm may be structured to select a target electronic content in response to a plurality of parameters, such as duration of the person's gaze and the person 205's P-300 electrical brain wave response with respect to the first electronic content and with respect to the second electronic content.

The characterization circuit 1740 includes a characterization circuit operable to determine an attribute of the displayed first electronic content. The query circuit 1750 includes a query circuit operable to cause a search for a third electronic content based on the determined attribute of the first electronic content. The chooser circuit 1760 includes a chooser circuit operable to select the third electronic content from a result of the initiated search.

In an alternative electronic embodiment, the electronic apparatus 1701 may include a digital storage device 1790 operable to save the selected third electronic content. In another alternative embodiment, the electronic apparatus may include a receiver circuit operable to receive a result of the initiated search, illustrated as the transceiver circuit 1780. In an alternative embodiment, the electronic apparatus may include a broadcast circuit 1775 operable to facilitate a display of electronic content using the display surface 209, and/or another display surface, such as a wall or tabletop. In another alternative embodiment, the electronic apparatus may include a broadcast circuit 1775 operable to facilitate a display of electronic content.

In an alternative embodiment, the electronic apparatus 1701 may include a manifestation-analyzer circuit 1785. The manifestation-analyzer circuit includes a circuit operable to determine an indication of an expression by the person related to the first electronic content, the determination in response to the data indicative of a response to the first electronic content. In this alternative embodiment, the query circuit 1750 includes a query circuit operable to cause a search for the third electronic content based on the indication of expression and the attribute of the first electronic content.

FIG. 30 illustrates an example computer program product 1800. The computer program product includes a computer-readable medium 1810 bearing program instructions 1820. The program instructions are operable to perform a process in a computing device. The process includes receive data indicative of respective responses by the person to at least two instances of electronic content being displayed on a surface and having a common contextual attribute. The process also includes select a first electronic content as an electronic content of interest over the remaining instances of electronic content based at least in part on the received data. The process further includes determine a reaction by the person to the first electronic content and a content attribute of the first electronic content. The process also includes initiate a search for a second electronic content based on the determined reaction by the person to the first electronic content and the determined content attribute of the first electronic content. The process includes select the second electronic content from a result of the initiated search. The process also includes facilitate a display of the selected second electronic content in a manner perceivable by the person. In an alternative embodiment, the process may include save data indicative of the selected second electronic content 1822.

In another alternative embodiment, the computer-readable medium includes a computer readable storage medium 1812. In a further alternative embodiment, the computer-readable medium includes a computer readable communication medium 1814.

Figure 31:
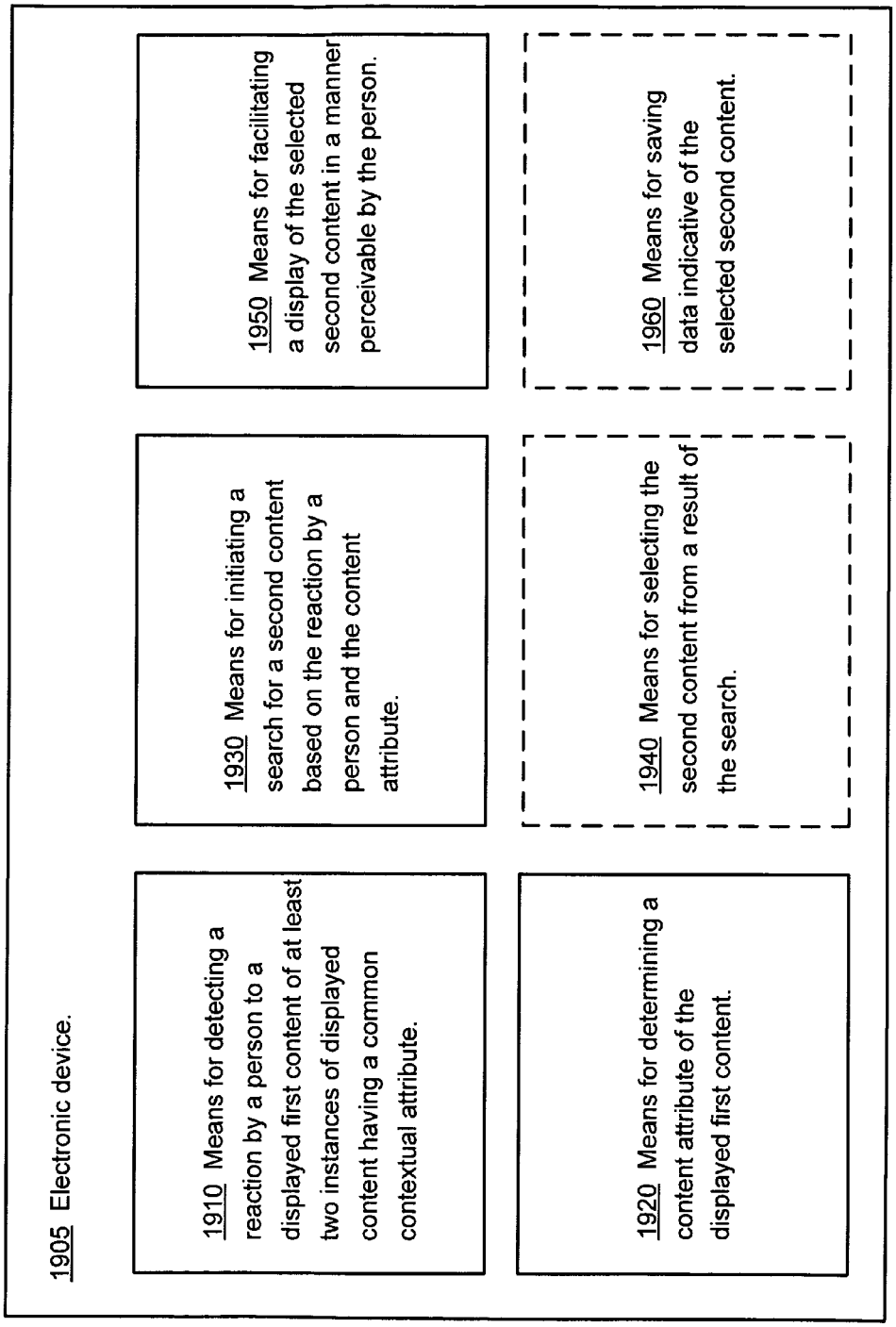
FIG. 31 illustrates an example electronic device.

FIG. 31 illustrates an example electronic device 1905. The electronic device includes means 1910 for detecting a reaction by a person to a displayed first content of at least two instances of displayed content having a common contextual attribute. The electronic device also includes means 1920 for determining a content attribute of the displayed first content. The electronic device further includes means 1930 for initiating a search for a second content based on the reaction by a person and the content attribute. The electronic device also includes means 1950 for facilitating a display of the selected second content in a manner perceivable by the person. In an alternative embodiment, the electronic device may include means 1940 for selecting the second content from a result of the search. In another alternative embodiment, the electronic device may include means 1960 for saving data indicative of the selected second content.

Figure 32:
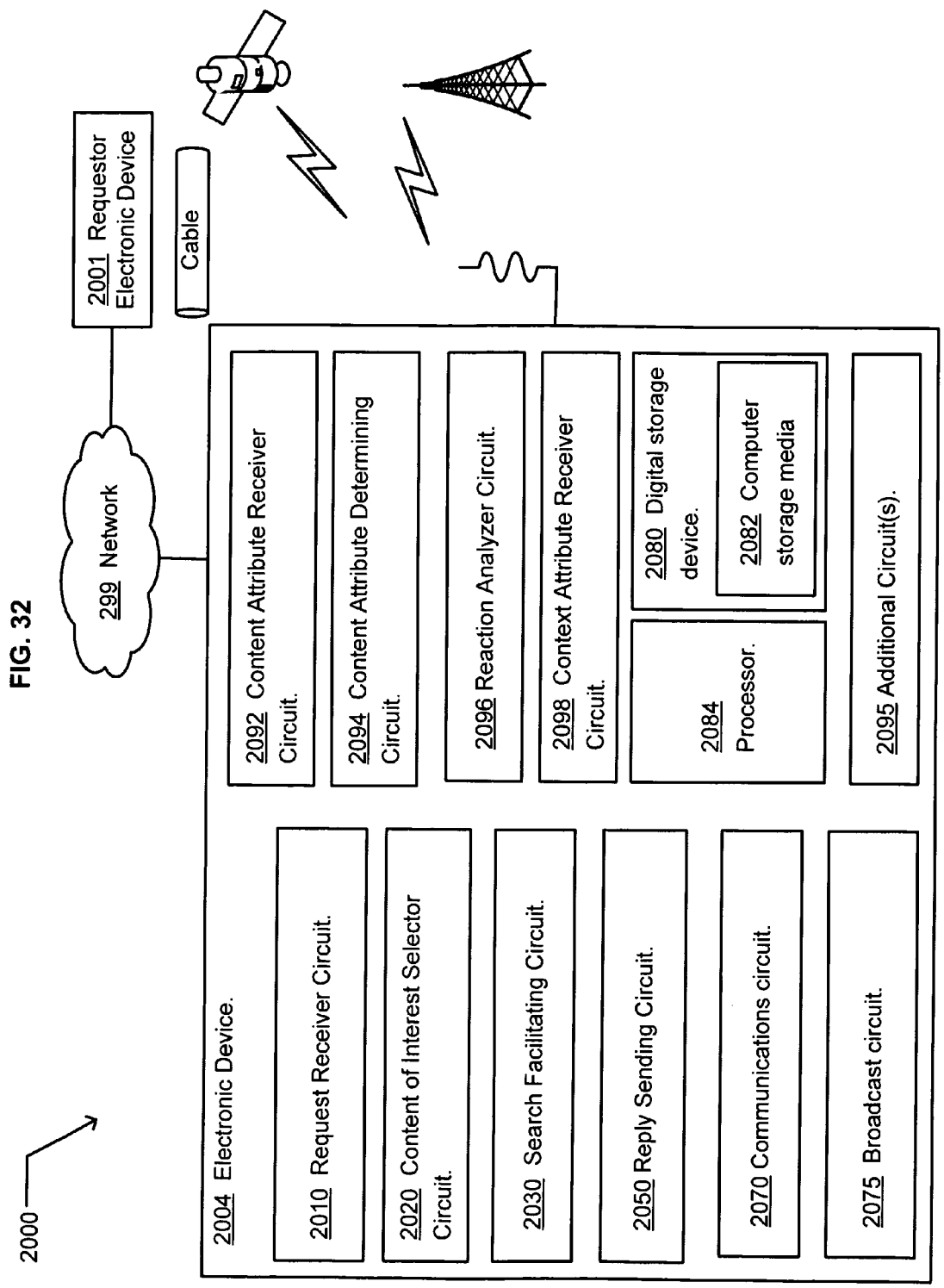
FIG. 32 illustrates an example environment.

FIG. 32 illustrates an example environment 2000. The example environment includes an electronic device 2004. The electronic device 2004 may include a wired or wireless access to other electronic devices, such as for example, a computing device, a requestor device 2001, or a server, using a communications circuit 2070, via the network 299. In an alternative embodiment, the electronic device may be coupled to the network via a wireless link, a satellite link, and/or a cellular network link.

In an embodiment, the electronic device 2004 includes a request receiver circuit 2010, a content of interest selector circuit 2020, a search facilitating circuit 2030, and a reply sending circuit 2050. In an alternative embodiment, the electronic device may include at least one of the communications circuit 2070, a broadcast circuit 2075, a content attribute receiver circuit 2092, a content attribute determining circuit 2094, a reaction analyzer circuit 2096, a context attribute receiver circuit 2098, a processor 2084, a digital storage device 2080, or additional circuit(s) 2095. In some embodiments, one or more of the request receiver circuit, the content of interest selector circuit, the search facilitating circuit, the reply sending circuit, the communications circuit, the broadcast circuit, the content attribute receiver circuit, the content attribute determining circuit, the reaction analyzing circuit, the context attribute receiver circuit, the processor, the digital storage device, or the additional circuit(s) may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The processor may be implemented using a processor such as the processing unit 21 described in conjunction with FIG. 1, and/or the processor 120 described in conjunction with FIG. 2. In an embodiment, the electronic device may include a mobile electronic device.

Figure 33:
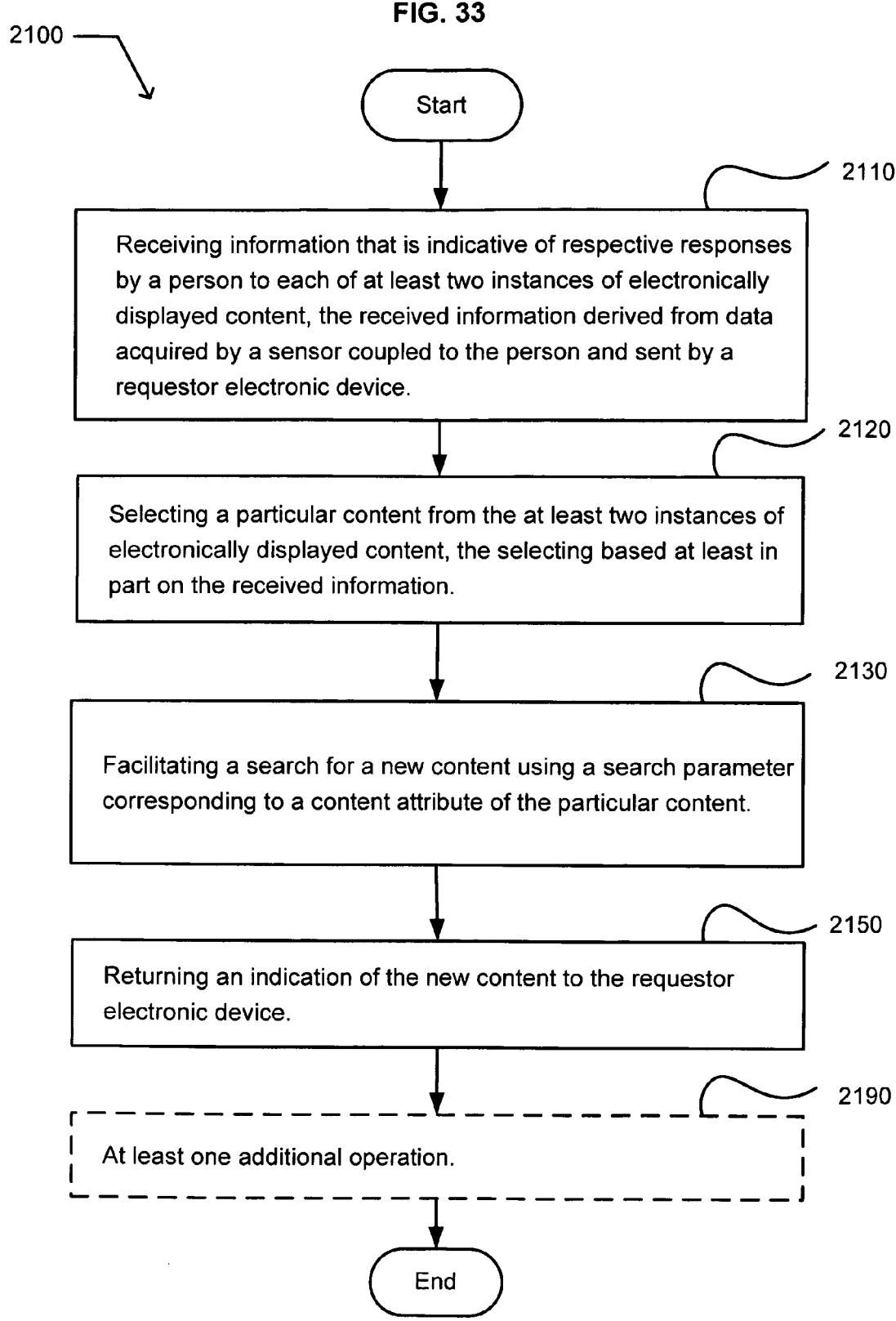
FIG. 33 illustrates an example operational flow.

FIG. 33 illustrates an example operational flow 2100. FIG. 33 and several following figures may include various examples of operational flows, discussions, and explanations with respect to the above-described environment 2000 of FIG. 32, and/or with respect to other examples and contexts. However, it should be understood that the operational flows may be executed in a number of other environments and contexts, and/or in modified versions of FIG. 32. Also, although the various operational flows are illustrated in a sequence(s), it should be understood that the various operations may be performed in other orders than those which are illustrated, and/or may be performed concurrently.

After a start operation, the operational flow 2100 includes reception operation 2110. The reception operation includes receiving information that is indicative of respective responses by a person to each of at least two instances of electronically displayed content. The received information is derived from data acquired by a sensor coupled to the person and sent by a requestor electronic device. For example, in an embodiment, the data may include data acquired by at least one of the sensors 206A-206C and the response sensing apparatus 206 of a response by the person 205 viewing the at least two instances of content electronically displayed by the display surface 209 of FIG. 3, or as described in conjunction with FIG. 10. The reception operation may be implemented using the request receiver circuit 2010 of FIG. 32. A choosing operation 2120 includes selecting a particular content from the at least two instances of electronically displayed content. The selecting based at least in part on the received information. The choosing operation may be implemented using the content of interest selector circuit 2020. A focusing operation 2130 includes facilitating a search for a new content using a search parameter corresponding to a content attribute of the particular content. The focusing operation may be implemented using the search facilitation circuit 2030. A reply operation 2150 includes returning an indication of the new content to the requestor electronic device. The reply operation may be implemented using the reply sending circuit 2050. The operational flow then moves to an end operation. In an alternative embodiment, the operational flow may include at least one additional operation, illustrated as an additional operation 2190.

Figure 34:
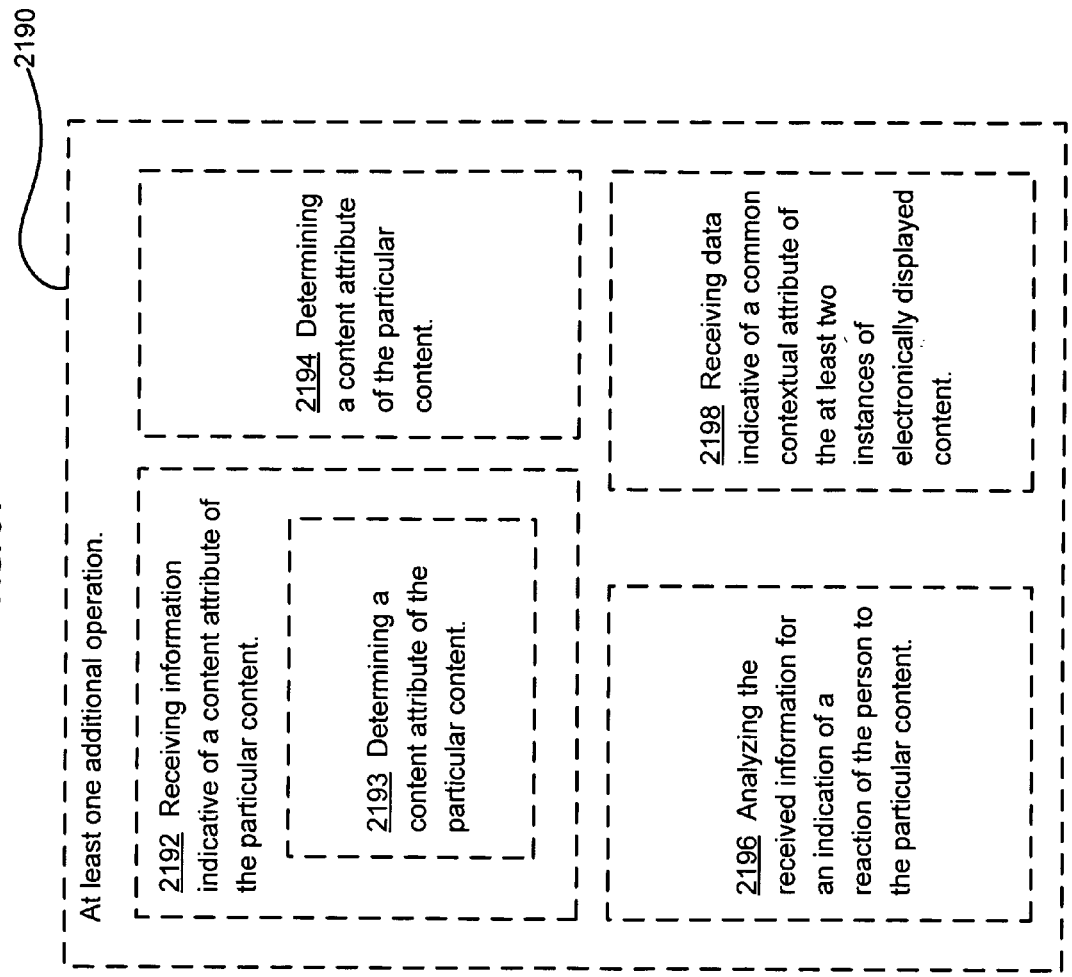
FIG. 34 illustrates an alternative embodiment of the operational flow of FIG. 33.

FIG. 34 illustrates an alternative embodiment of the operational flow 2100 of FIG. 33. The additional operation 2190 may include at least one of an operation 2192, an operation 2194, an operation 2196, or an operation 2198. The operation 2192 includes receiving information indicative of a content attribute of the particular content. The operation 2192 may be implemented using the content attribute receiver circuit 2092. In an alternative embodiment, the operation 2192 may include at least one operation, such as the operation 2193. The operation 2193 includes determining a content attribute of the particular content. The operation 2194 includes determining a content attribute of the particular content. The operation 2194 may be implemented using the content attribute determining circuit 2094. The operation 2196 includes analyzing the received information for an indication of a reaction of the person to the particular content. The operation 2196 may be implemented using the reaction analyzer circuit 2096. The operation 2198 includes receiving data indicative of a common contextual attribute of the at least two instances of electronically displayed content. The operation 2198 may be implemented using the context attribute receiver circuit 2098.

Figure 35:
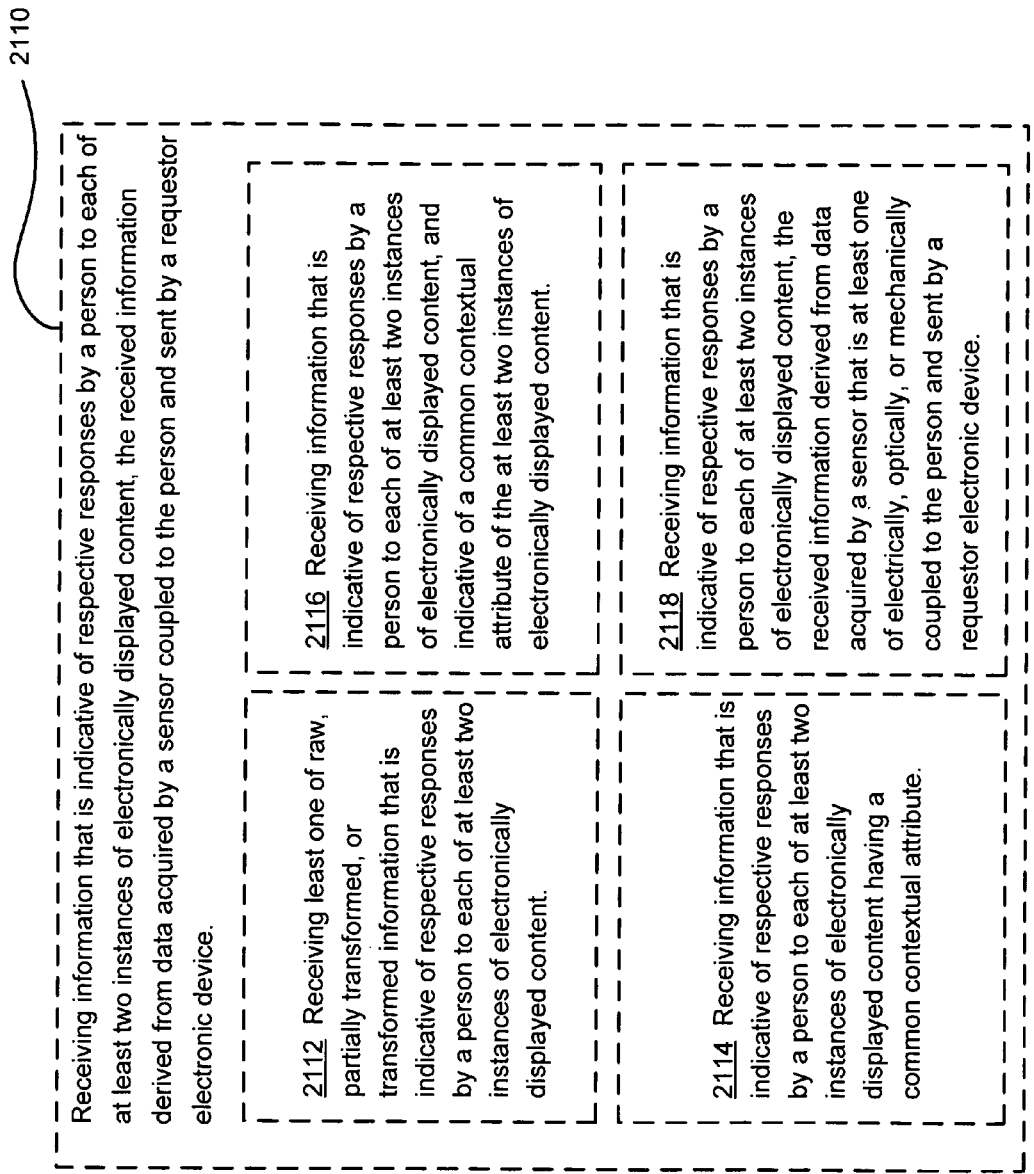
FIG. 35 illustrates another alternative embodiment of the operational flow of FIG. 33.

FIG. 35 illustrates another alternative embodiment of the operational flow 2100 of FIG. 33. The reception operation 2110 may include at least one additional operation. The at least one additional operation may include an operation 2112, an operation 2114, an operation 2116, or an operation 2118. The operation 2112 includes receiving least one of raw, partially transformed, or transformed information that is indicative of respective responses by a person to each of at least two instances of electronically displayed content. The operation 2114 includes receiving information that is indicative of respective responses by a person to each of at least two instances of electronically displayed content having a common contextual attribute. The operation 2116 includes receiving information that is indicative of respective responses by a person to each of at least two instances of electronically displayed content, and indicative of a common contextual attribute of the at least two instances of electronically displayed content. The operation 2118 includes receiving information that is indicative of respective responses by a person to each of at least two instances of electronically displayed content. The received information is derived from data acquired by a sensor that is at least one of electrically, optically, or mechanically coupled to the person and sent by a requestor electronic device.

Figure 36:
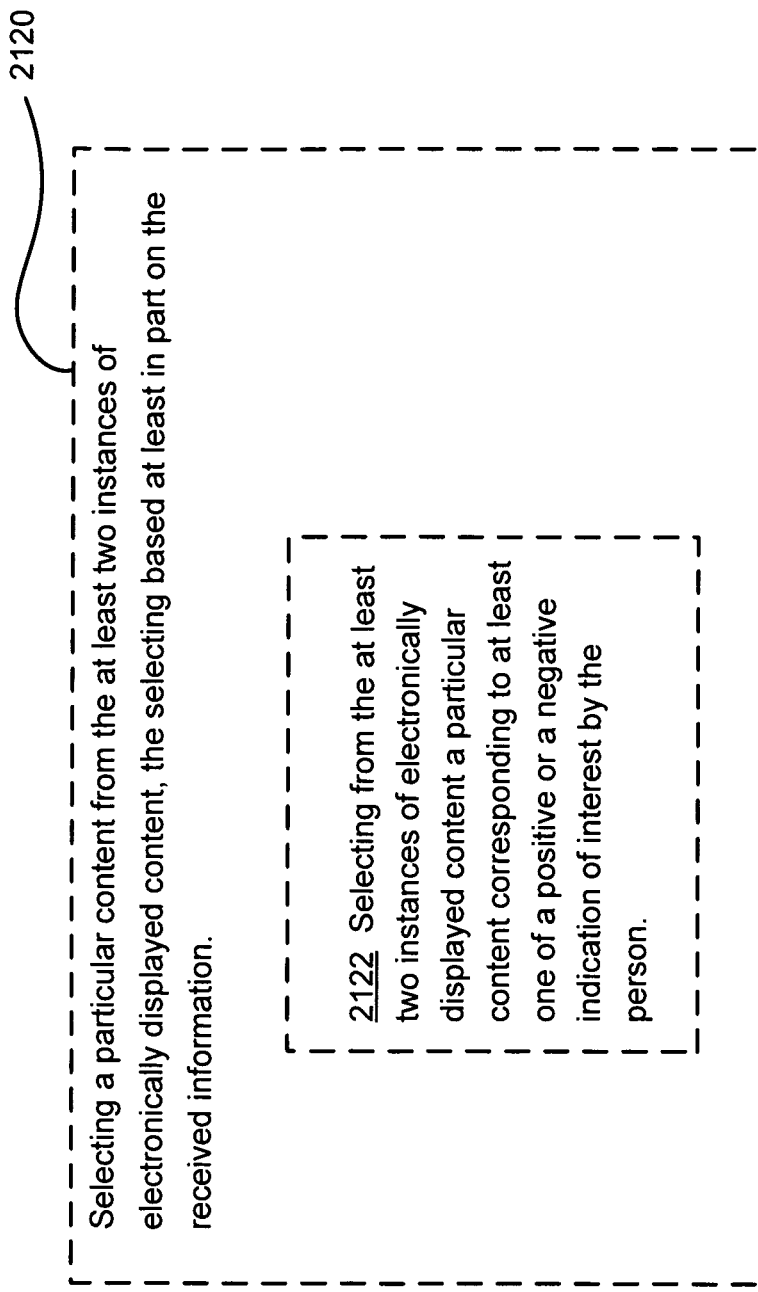
FIG. 36 illustrates a further alternative embodiment of the operational flow of FIG. 33.

FIG. 36 illustrates a further alternative embodiment of the operational flow 2100 of FIG. 33. The choosing operation 2120 may include at least one additional operation, such as the operation 2122. The operation 2122 includes selecting from the at least two instances of electronically displayed content a particular content corresponding to at least one of a positive or a negative indication of interest by the person.

Figure 37:
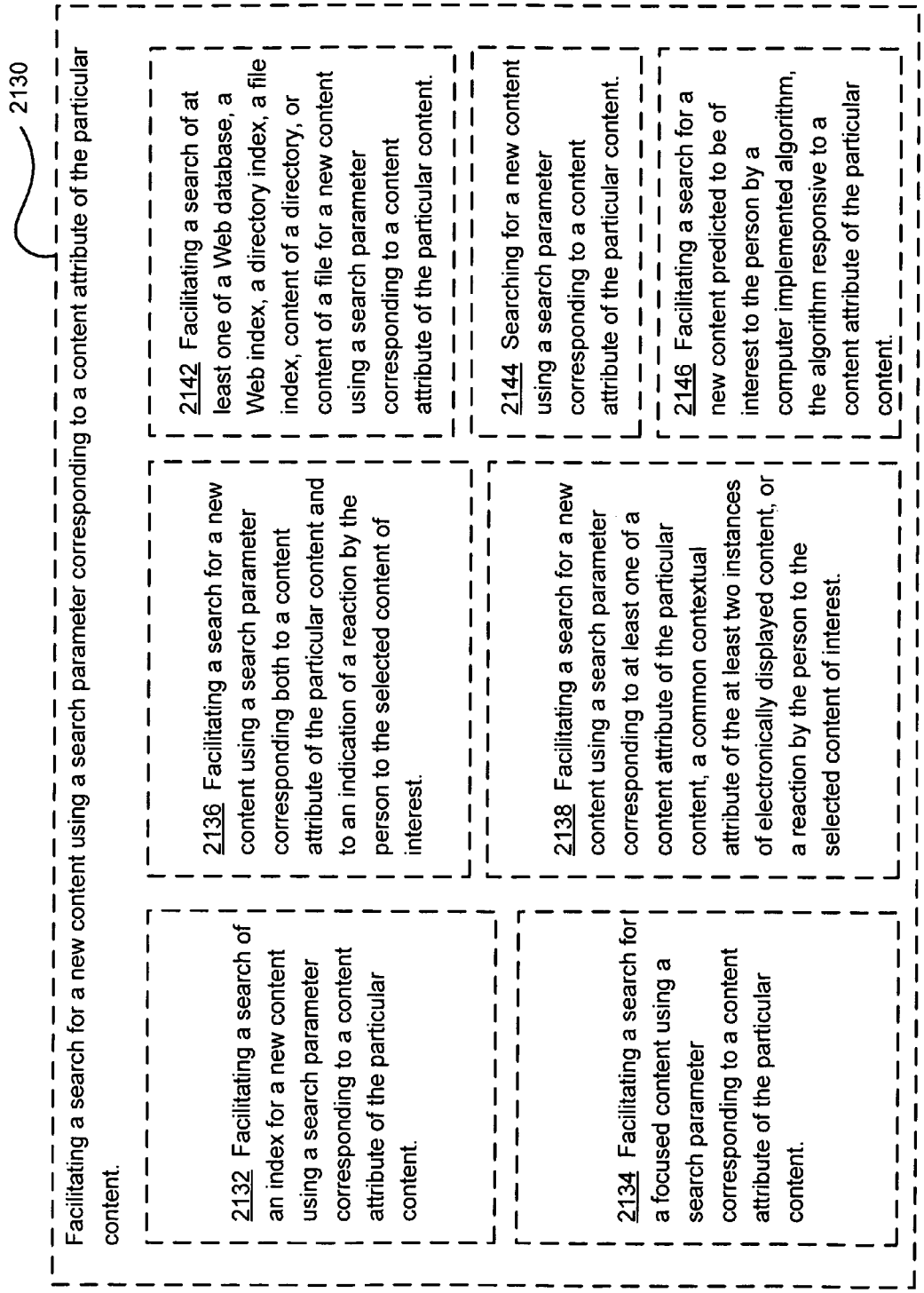
FIG. 37 illustrates an alternative embodiment of the operational flow of FIG. 33.

FIG. 37 illustrates an alternative embodiment of the operational flow 2100 of FIG. 33. The focusing operation 2130 may include at least one additional operation. The at least one additional operation may include an operation 2132, an operation 2134, an operation 2136, an operation 2138, an operation 2142, an operation 2144, or an operation 2146. The operation 2132 includes facilitating a search of an index for a new content using a search parameter corresponding to a content attribute of the particular content. The operation 2134 includes facilitating a search for a focused content using a search parameter corresponding to a content attribute of the particular content. The operation 2136 includes facilitating a search for a new content using a search parameter corresponding both to a content attribute of the particular content and to an indication of a reaction by the person to the selected content of interest. The operation 2138 includes facilitating a search for a new content using a search parameter corresponding to at least one of a content attribute of the particular content, a common contextual attribute of the at least two instances of electronically displayed content, or a reaction by the person to the selected content of interest. The operation 2142 includes facilitating a search of at least one of a Web database, a Web index, a directory index, a file index, content of a directory, or content of a file for a new content using a search parameter corresponding to a content attribute of the particular content. The operation 2144 includes searching for a new content using a search parameter corresponding to a content attribute of the particular content. The operation 2146 includes facilitating a search for a new content predicted to be of interest to the person by a computer implemented algorithm, the algorithm responsive to a content attribute of the particular content.

Figure 38:
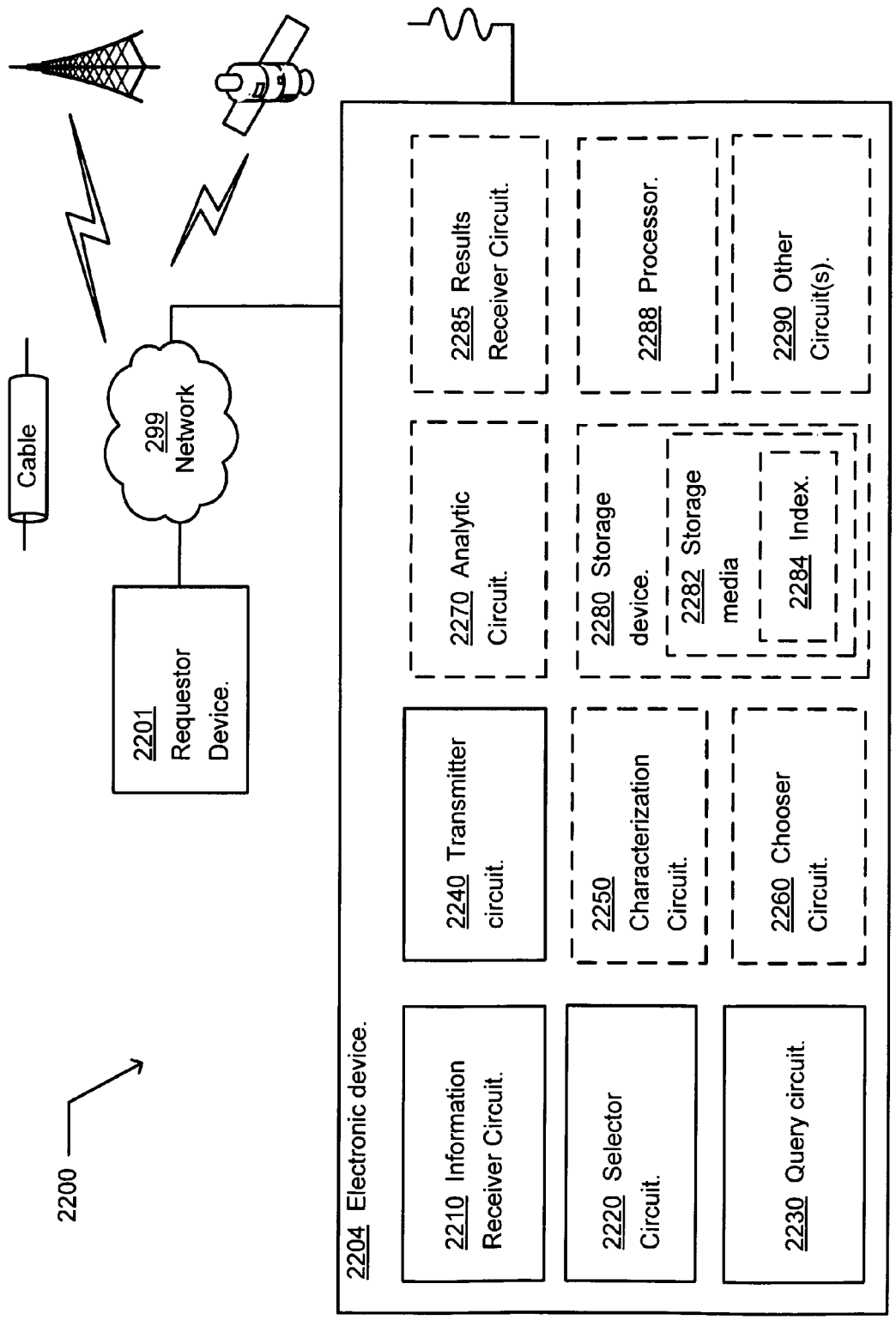
FIG. 38 illustrates an example environment.

FIG. 38 illustrates an example environment 2200. The example environment includes an electronic device 2204 operable to communicate with a requestor device 2201 using the network 299, via for example, a wireless link, a satellite link, and/or a wired link. In an embodiment, the requestor device may include the electronic device 1401 described in conjunction with FIG. 21, and/or the electronic apparatus 1701 described in conjunction with FIG. 29. The electronic device includes an information receiver circuit 2210, a selector circuit 2220, a query circuit 2230, and a content of possible interest (CPI) transmitter circuit 2240. In an alternative embodiment, the electronic device may include at least one of a characterization circuit 2250, a chooser circuit 2260, an analytic circuit 2270, a storage device 2280, a results receiver 2285, a processor 2285, or other circuit(s) 2290. In an embodiment, the electronic device or a portion of the electronic device may be implemented in whole or in part using the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machinery of the electronic device may be implemented in hardware, software, and/or firmware.

The information receiver circuit 2210 includes an information receiver circuit operable to receive information that is indicative of respective responses by a person to each of at least two instances of electronically displayed content. The received information is derived from data acquired by a sensor coupled to the person and sent by a requestor electronic device. For example, in an embodiment, the data may include data acquired by at least one of the sensors 206A-206C and the response sensing apparatus 206 sensing respective responses to the person 205 viewing the at least two instance of content electronically displayed by the display surface 209 of FIG. 3, or as described in conjunction with FIG. 10. The selector circuit 2220 includes a selector circuit operable to choose a particular content from the at least two instances of electronically displayed content, the selecting based at least in part on the received information. The query circuit 2230 includes a query circuit operable to facilitate a search for a new content using a search parameter corresponding to a content attribute of the particular content. The CPI transmitter circuit 2240 includes a transmitter circuit operable to send information that is indicative of the new content to the requestor electronic device.

The characterization circuit 2250 includes a characterization circuit operable to determine the content attribute of the particular content. The chooser circuit 2260 includes a chooser circuit operable to select the new content from a result of the facilitated search. The analytic circuit 2270 includes an analytic circuit operable to analyze the received information for a respective indication of a reaction by the person corresponding to each of the at least two instances of electronically displayed content. The storage device 2280 includes a storage device operable to save data indicative of the new content. The results receiver circuit 2285 includes a receiver circuit operable to receive a result of the search for a new content.

FIG. 39 illustrates an example computer program product 2300. The computer program product includes a computer-readable medium 2310 bearing program instructions 2320 operable to perform a process in a computing device. For example, the computing device may be implemented in whole or in part using the thin computing device 20 described in conjunction with FIG. 1, and/or the computing device 110 described in conjunction with FIG. 2. The process includes receiving information that is indicative of respective responses by a person to each of at least two instances of electronically displayed content. The received information is derived from data acquired by a sensor coupled to the person and sent by a requestor electronic device. The process also includes selecting a particular content from the at least two instances of electronically displayed content, the selecting based at least in part on the received information. The process further includes facilitating a search for a new content using a search parameter corresponding to a content attribute of the particular content. The process also includes returning an indication of the new content to the requestor electronic device.

In an alternative embodiment, the process further includes receiving information indicative of a content attribute of the particular content 2322. In another alternative embodiment, the process further includes determining a content attribute of the particular content 2324. In a further embodiment, the process further includes analyzing the received information for an indication of a reaction of the person to the particular content 2326. In another alternative embodiment, the process further includes receiving information indicative of a common contextual attribute of the at least two instances of electronically displayed content 2328. In a further alternative embodiment, the process further includes saving data indicative of the new content 2332. In another alternative embodiment, the computer-readable medium includes computer storage medium 2312.

FIG. 40 illustrates an example electronic device 2405. The electronic apparatus includes means 2410 for receiving information that is indicative of respective responses by a person to each of at least two instances of electronically displayed content. The received information is derived from data acquired by a sensor coupled to the person and sent by a requester electronic device. The electronic apparatus also includes means 2420 for selecting a particular content from the at least two instances of electronically displayed content, the selecting based at least in part on the received information. The electronic device further includes means 2430 for facilitating a search for a new content using a search parameter corresponding to a content attribute of the particular content. The electronic device includes means 2440 for returning an indication of the new content to the requester electronic device.

In an alternative embodiment, the electronic apparatus may include means 2450 for receiving information indicative of a content attribute of the particular content. In another embodiment, the electronic apparatus may include means 2460 for determining a content attribute of the particular content. In a further alternative embodiment, the electronic apparatus may include means 2670 for receiving data indicative of a common contextual attribute of the at least two instances of electronically displayed content.

Figure 41:
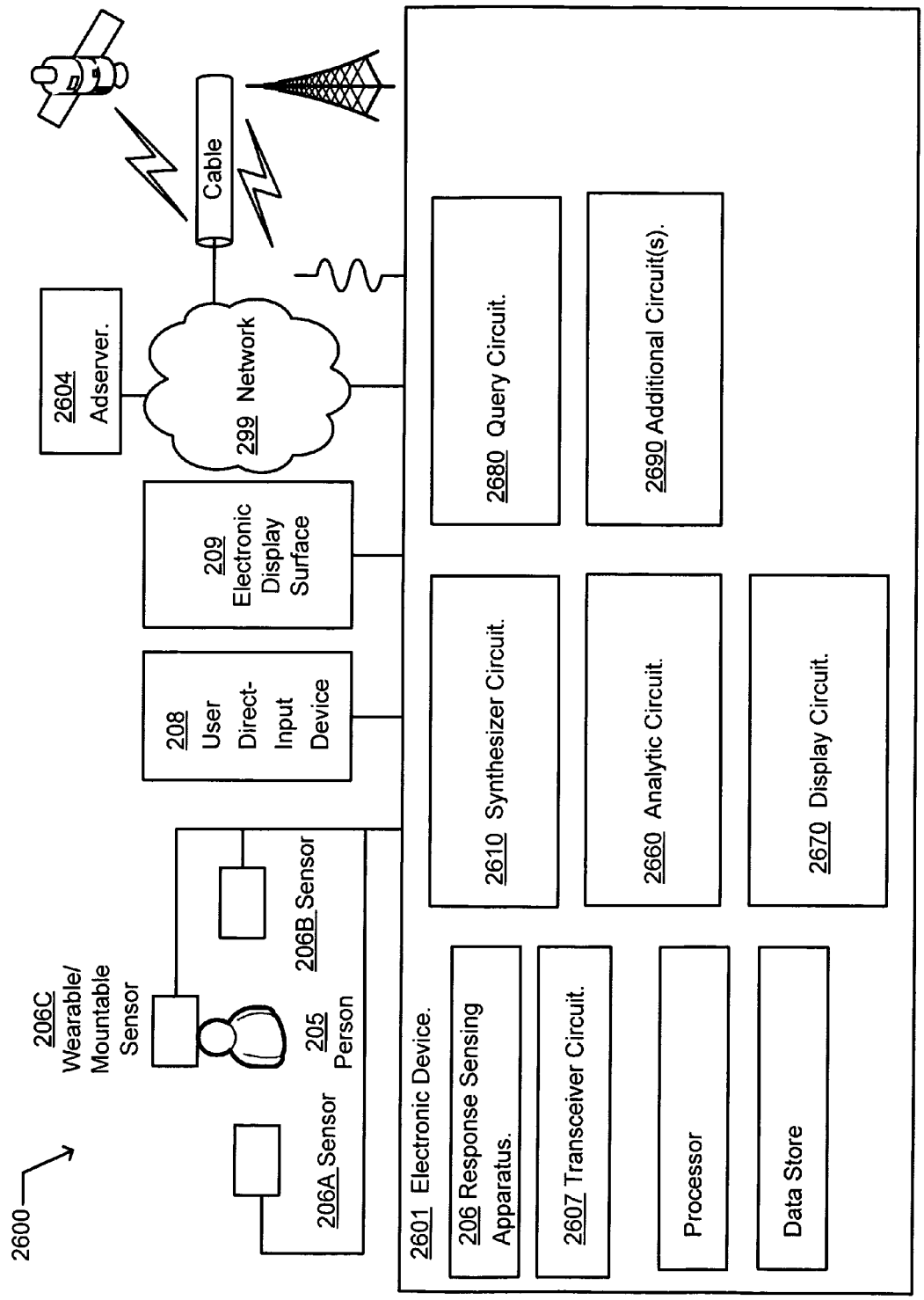
FIG. 41 illustrates an example environment.

FIG. 41 illustrates an example environment 2600. The example environment includes an electronic device 2601. The electronic device includes a response sensing apparatus 206, a transceiver circuit 2607, and the electronic display surface 209. In an alternative embodiment, the electronic device may include a user direct-input device 208. In some embodiments, one or more of the response sensing apparatus, the transceiver circuit, the user direct-input interface, and the display surface may be structurally distinct from the remaining circuits or the electronic device. The display surface may be physically incorporated with the electronic device, or may be physically separate from the electronic device and electronically coupled with the device. In another embodiment, the display surface is structurally and electrically distinct from the electronic device, and displays a content projected by a projector display engine (not shown) of the electronic device. The electronic device 2601 may include a wired or wireless access to digital content using the transceiver 2607, such as via a network 299. In an alternative embodiment, the electronic device may be coupled to the network via a wireless link, a satellite link, and/or a wired link.

In an embodiment, the electronic device 2601 includes a synthesizer circuit 2610, an analytic circuit 2660, a query circuit 2680, and a display circuit 2670. In some embodiments, one or more of the synthesizer circuit, the analytic circuit, the query circuit, and the display circuit may be structurally distinct from the remaining circuits. In an embodiment, the electronic device or a portion of the electronic device may be implemented in whole or in part using the thin computing device 20 described in conjunction with FIG. 1, and/or the computing device 110 described in conjunction with FIG. 2. In another embodiment, the electronic device or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 2601 using the user direct-input device 208.

The electronic device 2601 may include at least one additional circuit. The at least one additional circuit may include additional circuit(s) 2690. In addition, the electronic device may include a processor, such as the processing unit 21 described in conjunction with FIG. 1, and/or the processor 120 described in conjunction with FIG. 2. In further addition, the electronic device may include a computer storage media illustrated as a data store. In an embodiment, the electronic device may include a mobile electronic device.

Figure 42:
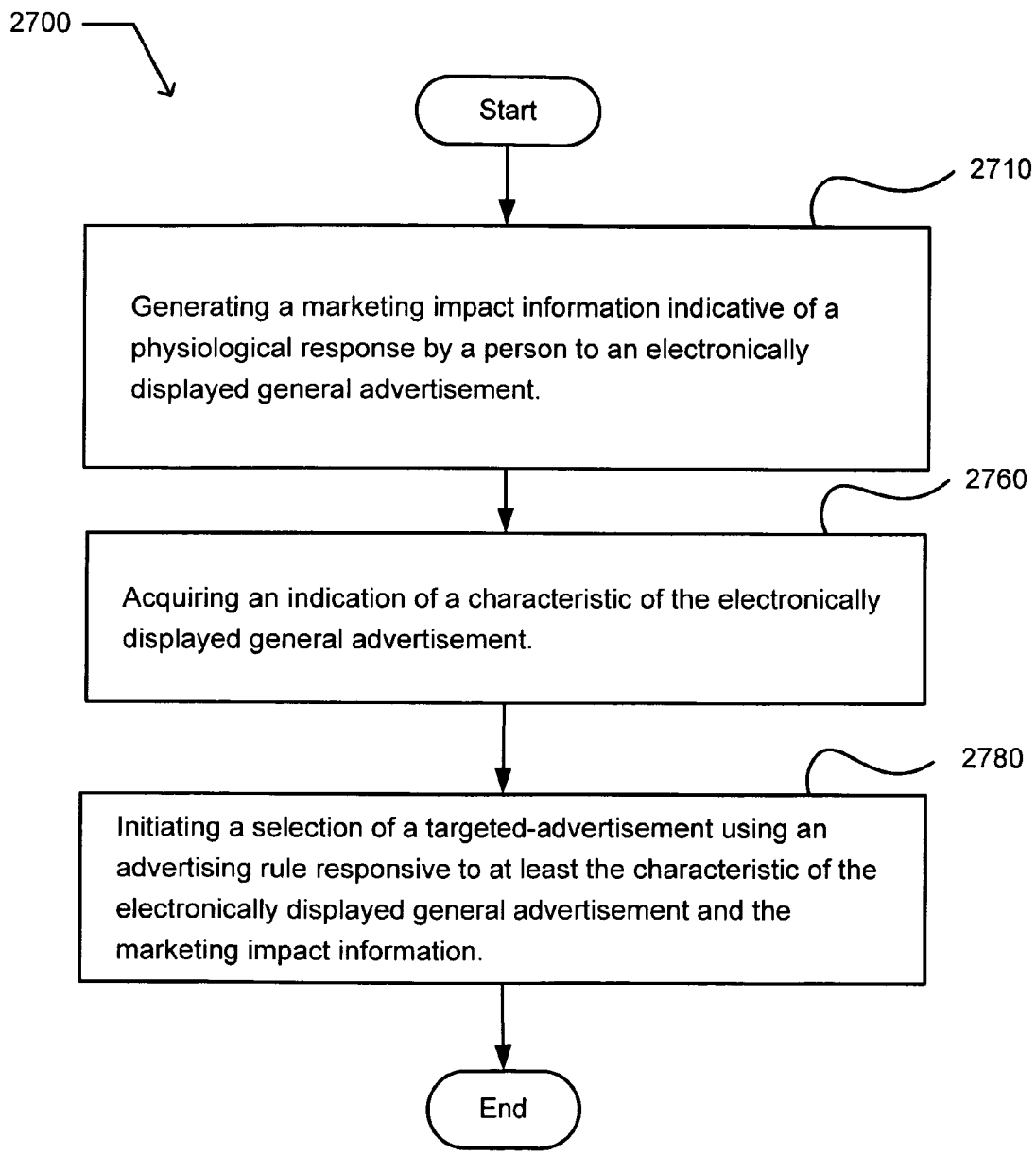
FIG. 42 illustrates an example operational flow.

FIG. 42 illustrates an example operational flow 2700. In an embodiment, the operational flow may be implemented in an environment that includes a person viewing a general advertisement displayed by an electronic device and having a characteristic. In an alternative embodiment, the operational flow may be implemented in an environment that includes a person directly interacting with the electronic device using a user direct-input device and viewing a general advertisement having a characteristic. In another alternative embodiment, the operational flow may be implemented in an environment that includes a person viewing a general advertisement having a characteristic. FIG. 42 and several following figures may include various examples of operational flows, discussions, and explanations with respect to the above-described environment 2600 of FIG. 41, and/or with respect to other examples and contexts. However, it should be understood that the operational flows may be executed in a number of other environments and contexts, and/or in modified versions of FIG. 41. Also, although the various operational flows are illustrated in a sequence(s), it should be understood that the various operations may be performed in other orders than those which are illustrated, and/or may be performed concurrently.

After a start operation, the operational flow 2700 moves to a synthesize operation 2710. The synthesize operation includes generating a marketing impact information indicative of a physiological response by a person to an electronically displayed general advertisement. In an embodiment, a general advertisement includes an advertisement that is not specific or personalized to the person. In another embodiment, a general advertisement includes an advertisement that is not specialized for the person. For example, a general advertisement may include an advertisement selected using revealed or entered profile information of the person, or an advertisement selected based upon a content displayed to the person, such as by using Google AdSense. In a further embodiment, a general advertisement includes an advertisement for which the person's physiologic response is not previously known. In another embodiment, a general advertisement includes a targeted-advertisement for which the person's physiologic response is not previously known. In a further embodiment, a general advertisement includes a previously selected targeted-advertisement for which the person's physiologic response is known when a more focused targeted-advertisement is sought. The synthesize operation may be implemented using the synthesizer circuit 2710 of FIG. 41. Data corresponding to the physiological response by the person to the electronically displayed general advertisement may be acquired using the response sensing apparatus 206 of FIG. 3. In an alternative embodiment, data corresponding to the physiological response by the person to the electronically displayed general advertisement may be acquired using a reaction detector circuit (not shown), such as by the reaction detector circuit 1410 of FIG. 21, and/or the reaction detector circuit 210 of FIG. 3, in conjunction with the response sensing apparatus 206 of FIG. 3.

An attribute operation 2760 includes acquiring an indication of a characteristic of the electronically displayed general advertisement. In an embodiment, a characteristic of the electronically displayed general advertisement may include at least one of a category, tag, subject, color, texture, or theme. For example, a subject characteristic may include a nature, athletic, criminal, animal, car, airplane, boat, flower, people, or entertainer. The attribute operation may be implemented using the analytic circuit 2660 of FIG. 41. A choice operation 2780 includes initiating a selection of a targeted-advertisement using an advertising rule responsive to at least the characteristic of the electronically displayed general advertisement and the marketing impact information. The choice operation may be implemented using the query circuit 2680 of FIG. 41. The operational flow then moves to an end operation.

Figure 43:
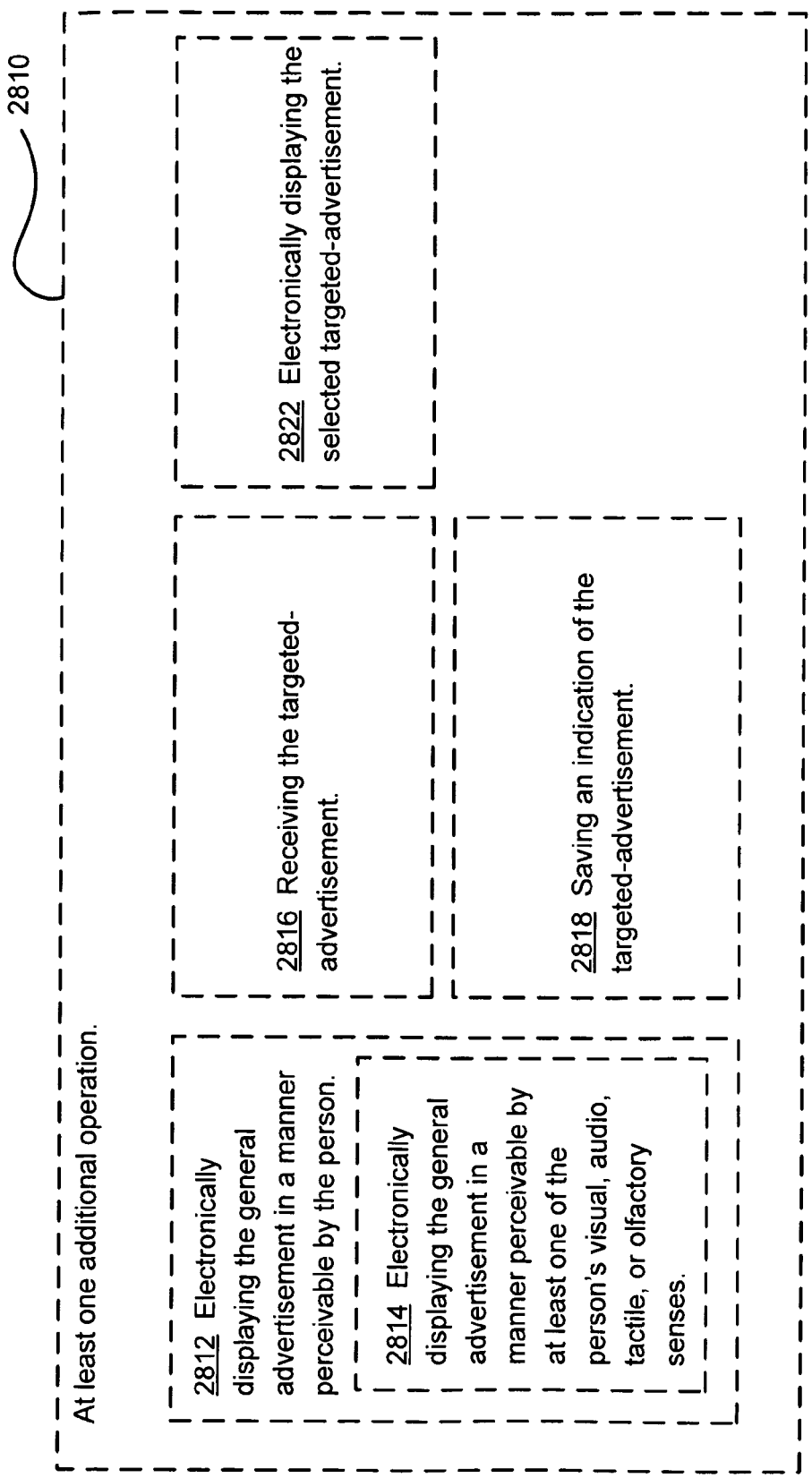
FIG. 43 illustrates an alternative embodiment of the operational flow of FIG. 42.

FIG. 43 illustrates an alternative embodiment of the operational flow 2700 of FIG. 42. The operational flow may include at least one additional operation 2810. The at least one additional operation may include an operation 2812, an operation 2816, an operation 2818, or an operation 2822. The operation 2812 includes electronically displaying the general advertisement in a manner perceivable by the person. The operation 2812 may be implemented using the display circuit 2670 of FIG. 41. In an embodiment, the display circuit may facilitate a display of the general advertisement using the electronic display surface 209. In another embodiment, the display circuit may facilitate a display of the general advertisement using a projector circuit operable to display the general advertisement on another surface, such as a wall, screen, or article of clothing. In an embodiment, the operation 2812 may include at least one additional operation, such as an operation 2814. The operation 2814 includes electronically displaying the general advertisement in a manner perceivable by at least one of the person's visual, audio, tactile, or olfactory senses. The operation 2816 includes receiving the targeted-advertisement. For example, the targeted-advertisement may be received from an adserver 2604. The operation 2816 may be implemented using a receiver circuit, such as a receiver element of the transceiver circuit 2607. The operation 2818 includes saving an indication of the targeted-advertisement. The operation 2818 may be implemented using the data store of FIG. 41. The operation 2822 includes electronically displaying the selected targeted-advertisement. The operation 2822 may be implemented using the display circuit 2670 of FIG. 41. In an embodiment, the display circuit may facilitate a display of the selected targeted-advertisement using the electronic display surface 209. In another embodiment, the display circuit may facilitate a display of the selected targeted-advertisement using a projector circuit operable to display the selected targeted-advertisement on another surface, such as a wall, screen, or article of clothing. In an alternative embodiment, the operation 2822 includes electronically displaying the selected targeted-advertisement in a manner perceivable by the person. The operation 2822 may be implemented using a display, such as the electronic display 209.

Figure 44:
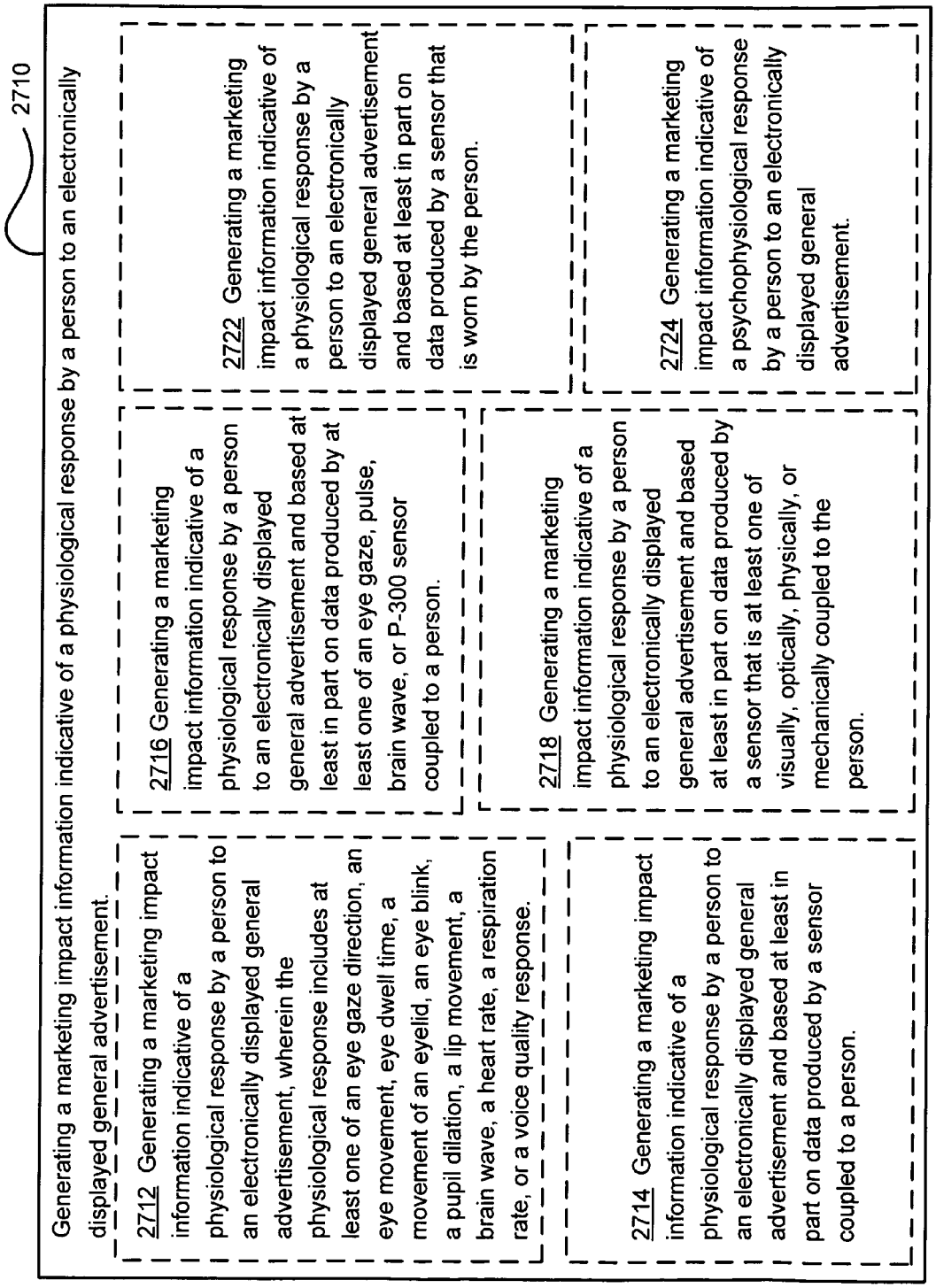
FIG. 44 illustrates another alternative embodiment of the operational flow of FIG. 42.

FIG. 44 illustrates another alternative embodiment of the operational flow 2700 of FIG. 42. The synthesize operation 2710 may include at least one additional operation. The at least one additional operation may include an operation 2712, an operation 2714, an operation 2716, an operation 2718, an operation 2722, or an operation 2724. The operation 2712 includes generating a marketing impact information indicative of a physiological response by a person to an electronically displayed general advertisement. In an embodiment, the physiological response includes at least one of an eye gaze direction, an eye movement, eye dwell time, a movement of an eyelid, an eye blink, a pupil dilation, a lip movement, a brain wave, a heart rate, a respiration rate, or a voice quality response. The operation 2714 includes generating a marketing impact information indicative of a physiological response by a person to an electronically displayed general advertisement and based at least in part on data produced by a sensor coupled to the person. The operation 2716 includes generating a marketing impact information that is indicative of a physiological response by a person to an electronically displayed general advertisement and that is based at least in part on data produced by at least one of an eye gaze, pulse, brain wave, or P-300 sensor coupled to a person. The operation 2718 includes generating a marketing impact information indicative of a physiological response by a person to an electronically displayed general advertisement, and based at least in part on data produced by a sensor that is at least one of visually, optically, physically, or mechanically coupled to the person. The operation 2722 includes generating a marketing impact information indicative of a physiological response by a person to an electronically displayed general advertisement, and based at least in part on data produced by a sensor that is worn by the person. The operation 2724 includes generating a marketing impact information indicative of a psychophysiological response by a person to an electronically displayed general advertisement.

FIG. 45 illustrates another alternative embodiment of the operational flow 2700 of FIG. 42. The synthesize operation 2710 may include at least one additional operation. The at least one additional operation may include an operation 2726, an operation 2728, an operation 2732, an operation 2734, an operation 2736, or an operation 2738. The operation 2726 includes generating a marketing impact information indicative of a response by a person to an electronically displayed general advertisement. The general advertisement is electronically displayed using at least one of a screen, a display surface, a projector, or a sound. The operation 2728 includes generating a marketing impact information indicative of a response by a person to an electronically displayed general advertisement. The general advertisement includes at least one of a promotional content, an offer of a product and/or service, a public service announcement, or a product placement. The operation 2732 includes generating a marketing impact information indicative of a response by a person to an electronically displayed general advertisement. The general advertisement includes a form of communication designed to persuade the person to take some action, now or in the future. The operation 2734 includes generating a marketing impact information indicative of a response by a person to an electronically displayed general advertisement. The general advertisement includes a communication designed to encourage or stimulate patronization of a specific seller or purchase of a particular product. The operation 2736 includes generating a marketing impact information indicative of a response by a person to an electronically displayed general advertisement. The general advertisement is received from an advertising server via a network. The operation 2738 includes generating a marketing impact information indicative of a response by a person to an electronically displayed general advertisement. The general advertisement is received from an advertising server via a network in conjunction with another content configurable for electronic display. In an embodiment, the advertising server may include the Adserver 2604 illustrated in conjunction with FIG. 41.

FIG. 46 illustrates an alternative embodiment of the operational flow 2700 of FIG. 42. The synthesize operation 2710 may include at least one additional operation. The at least one additional operation may include an operation 2742, an operation 2744, an operation 2746, or an operation 2748. The operation 2742 includes generating a marketing impact evaluation indicative of a response by a person to an electronically displayed general advertisement. The operation 2744 includes generating a marketing impact information indicative of a determined reaction by a person to the electronically displayed general advertisement. The determined reaction based at least in part on sensor-acquired data indicative of a physiological response. The operation 2746 includes generating a marketing impact information indicative of a physiological response by a person to an electronically displayed paid content. The operation 2748 includes generating a marketing impact information indicative of a physiological response by a person to an electronically displayed general advertisement. In an embodiment, the electronically displayed general advertisement includes at least one of an electronically displayed text, logo, photograph, picture, classified ad, graphic information, static image, dynamic image, streaming ad, interactive, audio, video, banner, rich media banner, placement ad, search advertising, contextual advertising, commercial message, interactive ad, interstitial ad, floating ad, wallpaper ad, pop-up, pop-under, or map ad.

Figure 47:
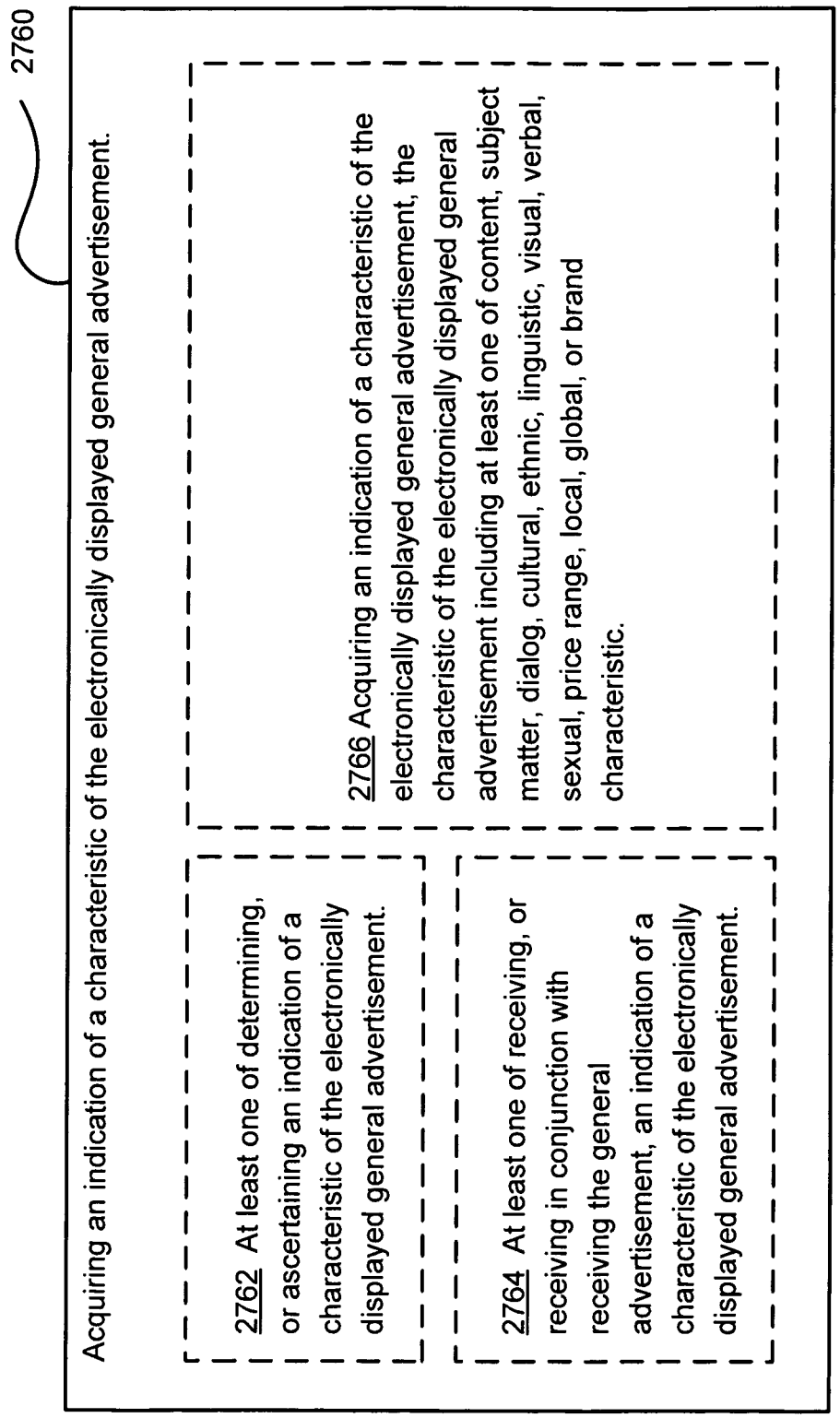
FIG. 47 illustrates a further alternative embodiment of the operational flow of FIG. 42.

FIG. 47 illustrates a further alternative embodiment of the operational flow 2700 of FIG. 42. The attribute operation 2760 may include at least one additional operation. The at least one additional operation may include an operation 2762, an operation 2764, or an operation 2768. The operation 2762 includes at least one of determining, or ascertaining an indication of a characteristic of the electronically displayed general advertisement. The operation 2764 includes at least one of receiving, or receiving in conjunction with receiving the general advertisement, an indication of a characteristic of the electronically displayed general advertisement. The operation 2766 includes acquiring an indication of a characteristic of the electronically displayed general advertisement. In an embodiment, the characteristic of the electronically displayed general advertisement includes at least one of content, subject matter, dialog, cultural, ethnic, linguistic, visual, verbal, sexual, price range, local, global, or brand characteristic.

Figure 48:
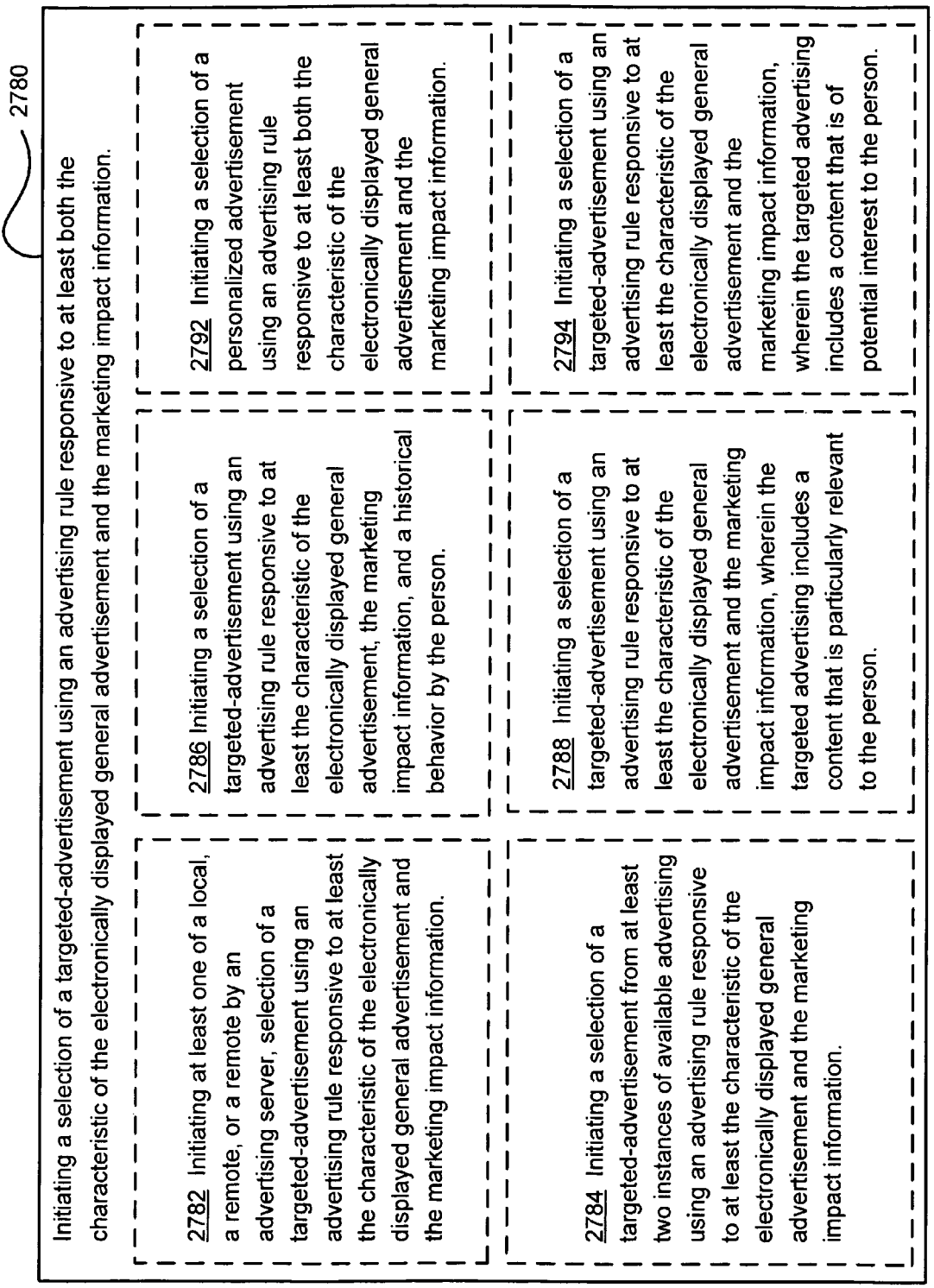
FIG. 48 illustrates an alternative embodiment of the operational flow of FIG. 42.

FIG. 48 illustrates an alternative embodiment of the operational flow 2700 of FIG. 42. The choice operation 2780 may include at least one additional operation. The at least one additional operation may include an operation 2782, an operation 2784, an operation 2786, an operation 2788, an operation 2792, or an operation 2794. The operation 2782 includes initiating at least one of a local, a remote, or remote from an advertising server, selection of a targeted-advertisement using an advertising rule responsive at least to both the characteristic of the electronically displayed general advertisement and the marketing impact information. The operation 2784 includes initiating a selection of a targeted-advertisement from at least two instances of available advertising using an advertising rule responsive to at least the characteristic of the electronically displayed general advertisement and the marketing impact information. The operation 2786 includes initiating a selection of a targeted-advertisement using an advertising rule responsive to at least the characteristic of the electronically displayed general advertisement, the marketing impact information, and a historical behavior by the person. In an embodiment, the historical behavior by the person may include a historical Internet related behavior. In another embodiment, the historical behavior by the person may include a profile of the person. The operation 2788 includes initiating a selection of a targeted-advertisement using an advertising rule responsive at least to both the characteristic of the electronically displayed general advertisement and the marketing impact information. The targeted-advertisement includes a content that is particularly relevant to the person. The operation 2792 includes initiating a selection of a personalized advertisement using an advertising rule responsive at least to both the characteristic of the electronically displayed general advertisement and the marketing impact information. The operation 2794 includes initiating a selection of a targeted-advertisement using an advertising rule responsive at least to both the characteristic of the electronically displayed general advertisement and the marketing impact information. The targeted-advertisement includes a content that is of potential interest to the person.

Figure 49:
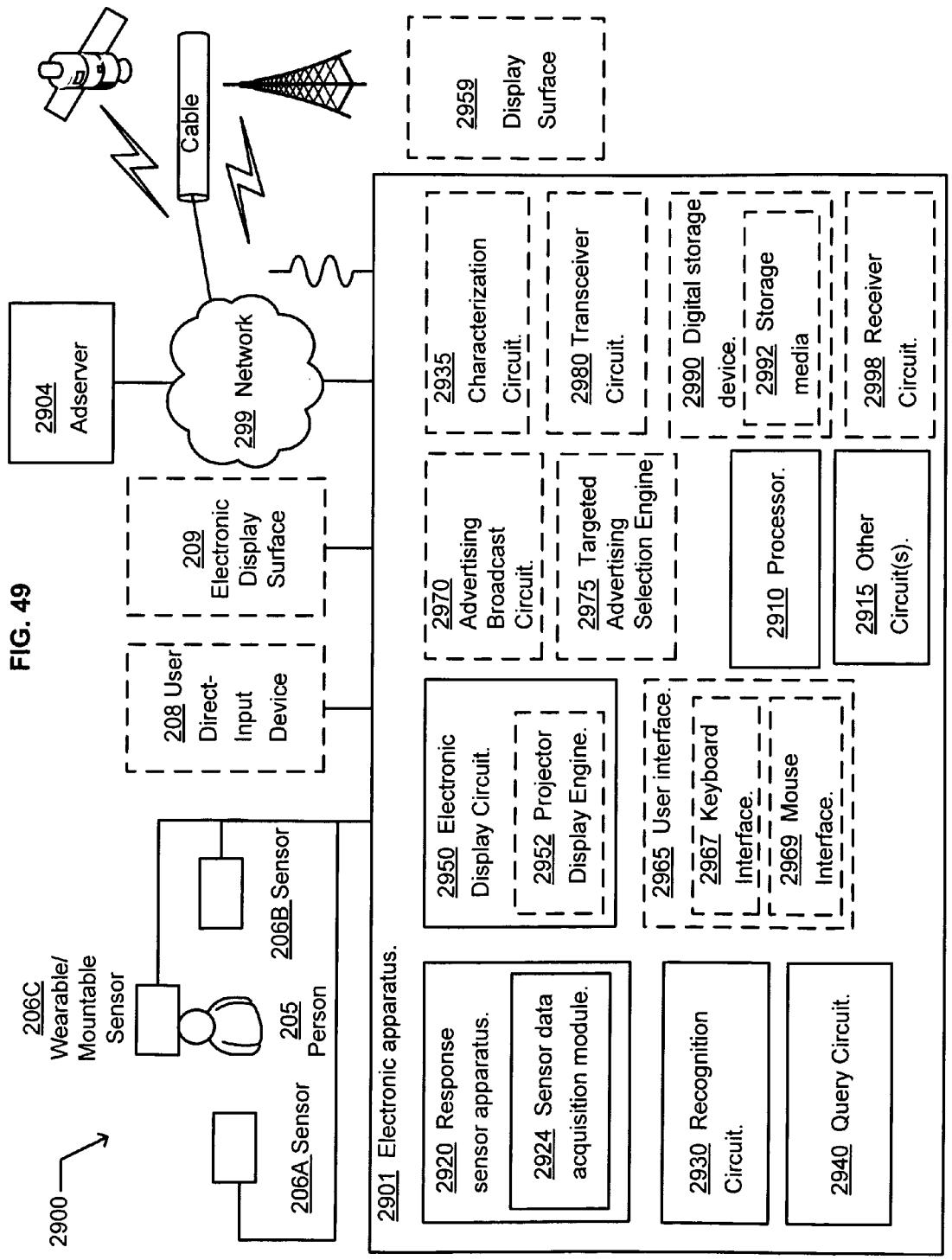
FIG. 49 illustrates an example electronic system.

FIG. 49 illustrates an example electronic system 2900. The system includes an electronic apparatus 2901 that is coupleable to a network 299, and which may be used by a person 205. The electronic apparatus may be coupled to the network via a wired link, illustrated as a cable link, and/or a wireless link illustrated as a satellite link. The system includes a response sensor apparatus 2920, a recognition circuit 2930, a query circuit 2940, and an electronic display circuit 2950. In an embodiment, the response sensor apparatus, the recognition circuit, the query circuit, and the electronic display circuit are included in the electronic apparatus. In another embodiment, the electronic apparatus may include the user direct-input device 208. In some embodiments, one or more of the response sensor apparatus, the recognition circuit, the query circuit, and the electronic display circuit may be structurally distinct from the remaining circuits or the electronic apparatus. In an alternative embodiment, the electronic apparatus includes at least one of a portable electronic device, or a mobile electronic device.

The response sensor apparatus 2920 includes a response sensor apparatus operable to acquire data indicative of a physiological response by the person 205 to a general advertisement. The response sensor apparatus includes a sensor data acquisition module 2924 and at least one user sensor operable to acquire data indicative of the response by the person to the general advertisement displayed by or on a display surface. The at least one user sensor is illustrated as a sensor 206A, a sensor 206B, and/or a wearable/mountable sensor 206C. The at least one user sensor may be physically incorporated with the electronic device, or may be physically separate from the electronic device and electronically coupled with the device. The general advertisement may include at least one of a static advertisement, such as a billboard or a poster, an advertisement displayed on the electronic display surface 209, or an advertisement projected on the display surface 2959. In an embodiment, the response sensor apparatus is at least substantially similar to the response sensor apparatus 520 described in conjunction with FIG. 10.

The recognition circuit 2930 includes a recognition circuit operable to generate a marketing impact information about the general advertisement based at least in part on the acquired data indicative of a physiological response. The query circuit 2940 includes a query circuit operable to initiate a selection of a targeted-advertisement by a targeted-advertising selection engine responsive to at least a characteristic of the general advertisement and the marketing impact information. In an embodiment, the targeted-advertising selection engine includes a local targeted-advertising selection engine 2975. In another embodiment, the targeted-advertising selection engine includes a targeted-advertising selection engine included in an adserver 2904. In an alternative embodiment, the query circuit is operable to initiate at least one of a local, or a remote selection of a targeted-advertisement. For example, the remote selection of a targeted-advertisement may be performed by a remote advertising server, illustrated as an adserver 2904. In another alternative embodiment, the targeted-advertisement may be selected from at least two instances of available marketing content.

The electronic display circuit 2950 includes an electronic display circuit operable to present the targeted-advertisement in a manner perceivable by a person. In an embodiment, the electronic display circuit is operable to drive an electronic display surface. For example, the electronic display circuit may drive the electronic display surface 209. In another embodiment, the electronic display circuit includes projector display engine 2952 operable to project the general advertisement on a display surface 2959.

In an alternative embodiment, the recognition circuit 2930 includes a feature extraction circuit operable to compute a response information based at least in part on the acquired data indicative of a physiological response. In another embodiment, the recognition circuit includes a classification circuit operable to classify a reaction by the person to the general advertisement based at least in part on the response information.

In a further embodiment, the electronic display circuit 2950 includes an electronic display circuit operable to present the general advertisement and the targeted-advertisement in a manner perceivable by a person. In an embodiment, the electronic display circuit includes an electronic display operable to present electronic content in a manner perceivable by the person and in a manner designed to facilitate sensing a response by the person. In another embodiment, the electronic display circuit further includes an electronic display operable to present the targeted-advertisement in a manner perceivable by at least one of the person's visual, audio, tactile, or olfactory senses.

In an embodiment, the electronic system 2900 includes a characterization circuit 2935. The characterization circuit includes a characterization circuit operable to acquire an indication of a characteristic of the general advertisement. The characterization circuit may further include a characterization circuit operable to at least one of receive, or determine an indication of a characteristic of the general advertisement. In another embodiment, the electronic system includes a digital storage device 2990 operable to save an indication of the selected targeted-advertisement. In a further embodiment, the electronic system includes an advertising broadcast circuit 2970 operable to facilitate a display of the selected targeted-advertisement by the electronic display. In a further embodiment, the electronic system includes a receiver circuit 2998 operable to receive an indication of the selected targeted-advertisement.

FIG. 50 illustrates an example computer program product 3000. The computer program product includes a computer-readable medium 3010 bearing program instructions 3020, and the program instructions. The program instructions are operable to perform a process in a computing device. The process includes instructions generating a marketing impact information indicative of a physiological response by a person to an electronically displayed general advertisement 3030. The process also includes instructions acquiring an indication of a characteristic of the electronically displayed general advertisement 3040. The process further includes instructions initiating a selection of a targeted-advertisement using an advertising rule responsive to at least the characteristic of the electronically displayed general advertisement and the marketing impact information 3050.

In an alternative embodiment, the process of the program instructions 3020 may include additional instruction(s) 3090. The additional instructions may include instructions initiating an electronic display of the general advertisement 3092. The additional instructions may include instructions receiving an indication of the targeted-advertisement 3094. The additional instructions may instructions saving an indication of the targeted-advertisement 3096.

In another alternative embodiment, the instructions initiating 3050 further include instructions sending a request to an advertising server for a selection of a targeted-advertisement using an advertising rule responsive to at least the characteristic of the electronically displayed general advertisement and the marketing impact information 3052. In a further alternative embodiment, the instructions initiating further include instructions receiving a selected targeted-advertisement from an advertising server. The targeted-advertisement is selected using an advertising rule responsive to at least the characteristic of the electronically displayed general advertisement and the marketing impact information 3054.

In a further embodiment, the computer readable medium 3010 includes a computer readable storage medium 3012. In another embodiment, the computer readable includes a computer readable communications medium 3014.

Figure 51:
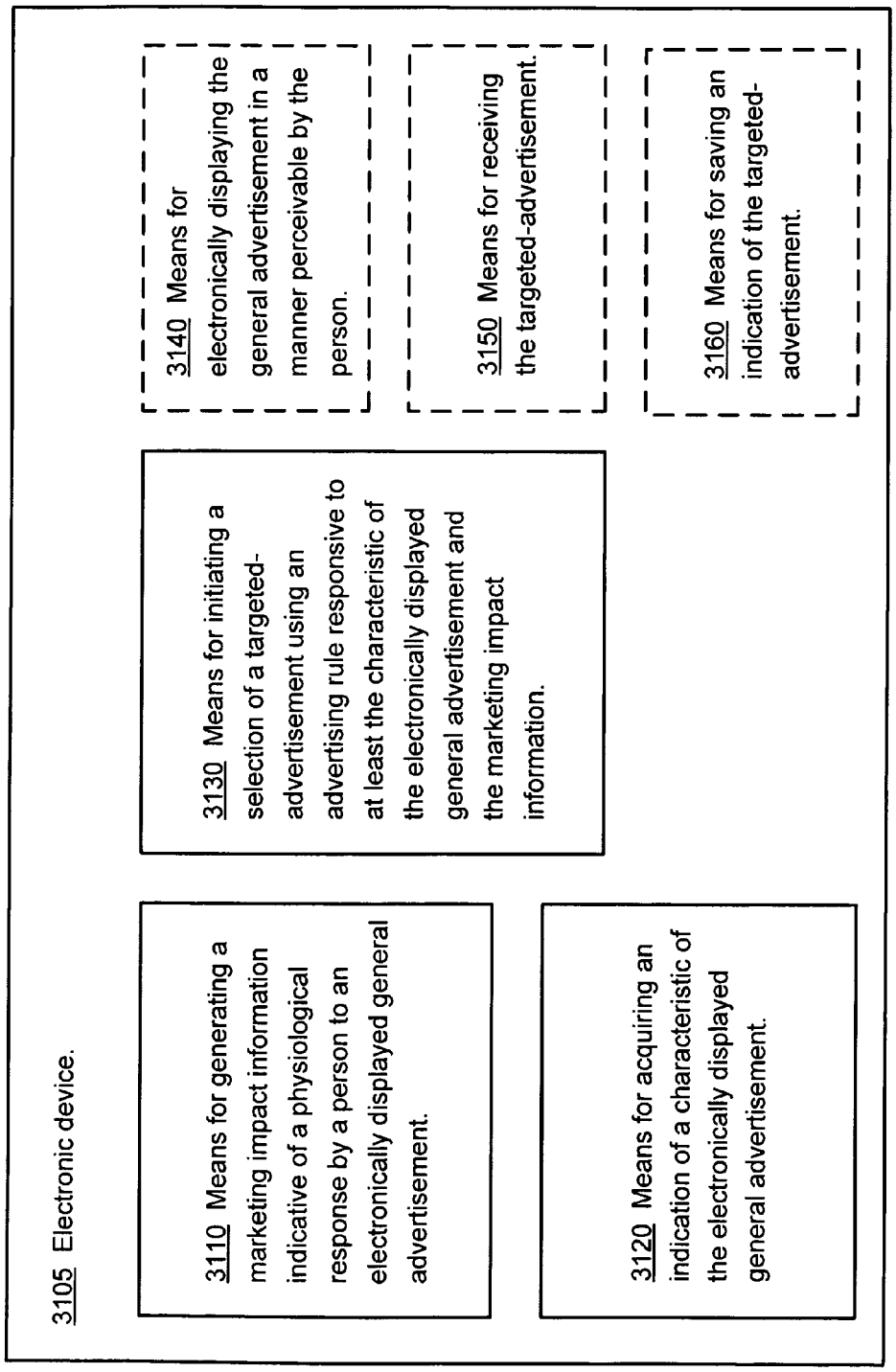
FIG. 51 illustrates an example system that includes an electronic device.

FIG. 51 illustrates an example system 3100 that includes an electronic device 3105. The electronic device includes means 3110 for generating a marketing impact information indicative of a physiological response by a person to an electronically displayed general advertisement. The electronic device also includes means 3120 for acquiring an indication of a characteristic of the electronically displayed general advertisement. The electronic device further includes means 3130 for initiating a selection of a targeted-advertisement using an advertising rule responsive to at least the characteristic of the electronically displayed general advertisement and the marketing impact information.

In an alternative embodiment, the electronic device may include at least one additional means. The at least one additional means may include means 3140, means 3150, or means 3160. Means 3140 includes means for electronically displaying the general advertisement in a manner perceivable by the person. Means 3150 includes means for receiving the targeted-advertisement. Means 3160 includes means for saving an indication of the targeted-advertisement.

Figure 52:
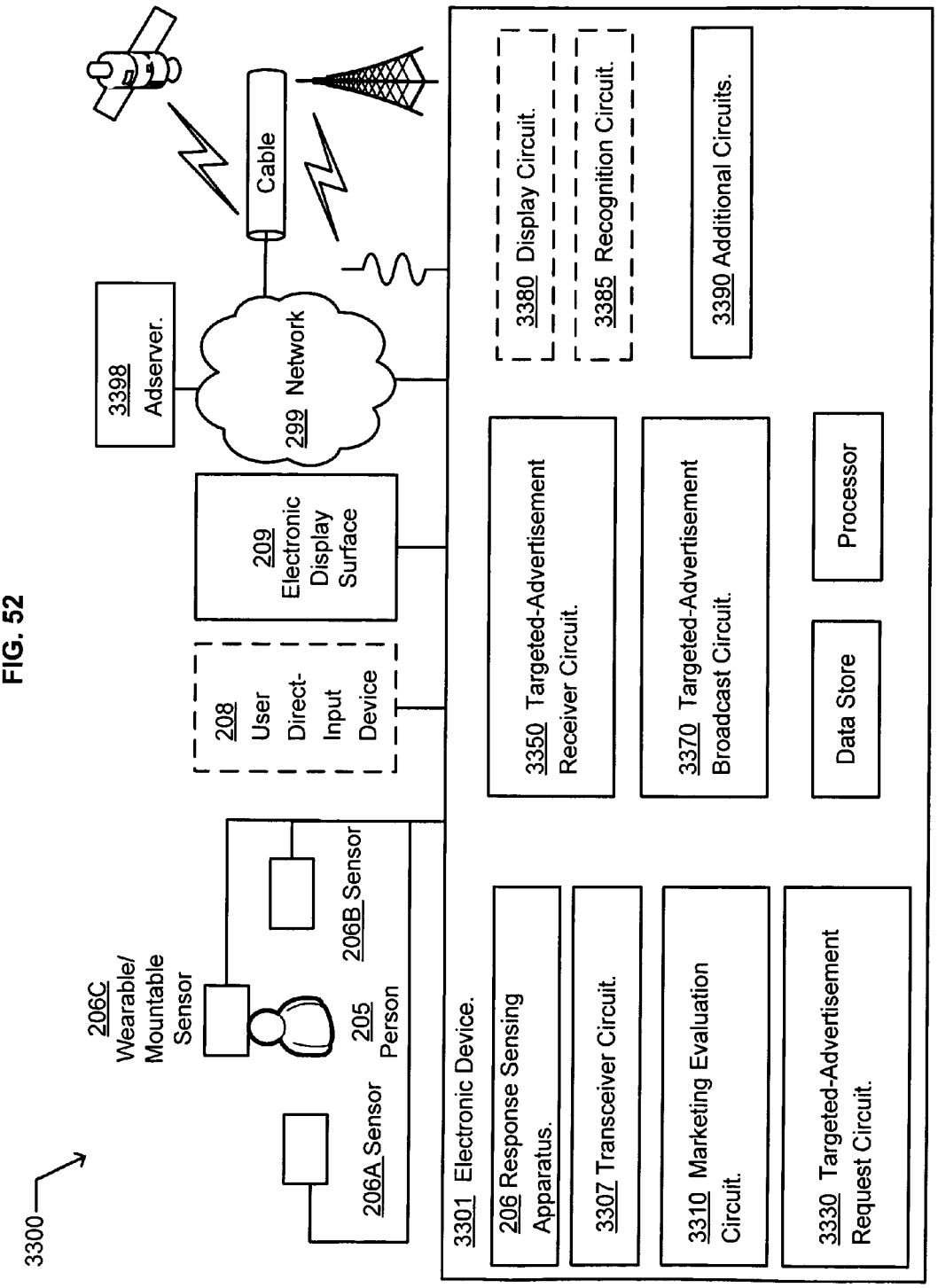
FIG. 52 illustrates an example environment.

FIG. 52 illustrates an example environment 3300. The example environment includes an electronic device 3301. The electronic device includes a response sensing apparatus 206, a transceiver circuit 3307, and a display surface 209. In an alternative embodiment, the electronic device may include a user direct-input device 208. In some embodiments, one or more of the response sensing apparatus, the transceiver circuit, the user direct-input interface, and the display surface may be structurally distinct from the remaining circuits or the electronic device. The environment also includes a marketing evaluation circuit 3310, a targeted-advertising request circuit 3330, a targeted-advertising receiver circuit 3350, and a targeted-advertising broadcast circuit 3370. In an embodiment, one of more of the marketing evaluation circuit, the targeted-advertising request circuit, the targeted-advertising receiver circuit, and the targeted-advertising broadcast circuit are included in the electronic device. The display surface may be physically incorporated with the electronic device, or may be physically separate from the electronic device and electronically coupled with the device. In another embodiment, the display surface is structurally and electrically distinct from the electronic device, and is operable to display a content projected by a projector display engine (not shown) of the electronic device.

The electronic device 3301 may include a wired or wireless access via a network 299 to advertising, other digital content, and/or to servers using the transceiver 3307. In an alternative embodiment, the electronic device may be coupled to the network via a wireless link, a satellite link, and/or a wired link. In another embodiment, the circuits, or the electronic device, or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. The person 205 may input commands and information to the electronic device 3301 using the user direct-input device 208.

The electronic device 3301 may include at least one additional circuit. The at least one additional circuit may include additional circuit(s) 3390. In addition, the electronic device may include a processor, such as the processing unit 21 described in conjunction with FIG. 1, and/or the processor 120 described in conjunction with FIG. 2. In further addition, the electronic device may include a computer storage media illustrated as a data store. In an embodiment, the electronic device may include a mobile electronic device.

FIG. 53 illustrates an example operational flow 3400. The operational flow may be implemented in an environment that includes a person viewing a general advertisement displayed by an electronic device and having a characteristic. In an alternative embodiment, the operational flow may be implemented in an environment that includes a person directly interacting with the electronic device using a user direct-input device and viewing a general advertisement having a characteristic. In another alternative embodiment, the operational flow may be implemented in an environment that includes a person viewing a general advertisement having a characteristic. FIG. 53 and several following figures may include various examples of operational flows, discussions, and explanations with respect to the above-described environment 3300 of FIG. 52, and/or with respect to other examples and contexts. However, it should be understood that the operational flows may be executed in a number of other environments and contexts, and/or in modified versions of FIG. 52. Also, although the various operational flows are illustrated in a sequence(s), it should be understood that the various operations may be performed in other orders than those which are illustrated, and/or may be performed concurrently.

After a start operation, the operational flow 3400 moves to an assessment operation 3410. The assessment operation includes generating a marketing impact information indicative of a physiological response by a person to an electronically displayed general advertisement. The assessment operation may be implemented using the marketing evaluation circuit 3310 of FIG. 52. A call operation 3430 includes sending the marketing impact information to an advertising-selector server. The call operation may be implemented using the targeted-advertisement request circuit 3330. A return operation 3450 includes receiving an indication of a targeted-advertisement chosen using an advertising rule responsive to at least a characteristic of the electronically displayed general advertisement and the marketing impact information. The return operation may be implemented using the targeted-advertisement reception circuit 3350. A broadcast operation 3470 includes facilitating an electronic display of the targeted-advertisement. The broadcast operation may be implemented using the targeted-advertisement broadcast circuit 3370. The operational flow then moves to an end operation.

FIG. 54 illustrates an alternative embodiment of the operational flow 3400 of FIG. 53. The operational flow may include at least one additional operation 3490. The at least one additional operation may include an operation 3492, an operation 3494, an operation 3496, or an operation 3498. The operation 3492 includes electronically displaying the targeted-advertisement. The operation 3492 may be implemented using the display circuit 3380 of FIG. 52. The operation 3494 includes saving the indication of a targeted-advertisement. The operation 3494 may be implemented using the data store of FIG. 52. The operation 3496 includes determining a characteristic of the electronically displayed general advertisement. The operation 3496 may be implemented using a recognition circuit 3385 of FIG. 52. The operation 3498 includes receiving the selected targeted-advertisement. The operation 3498 may be implemented using a receiver portion of the transceiver circuit 3307. The operation 3498 may include at least one additional operation, such as an operation 3499. The operation 3499 includes receiving the selected targeted-advertisement from an advertising-content server.

Figure 55:
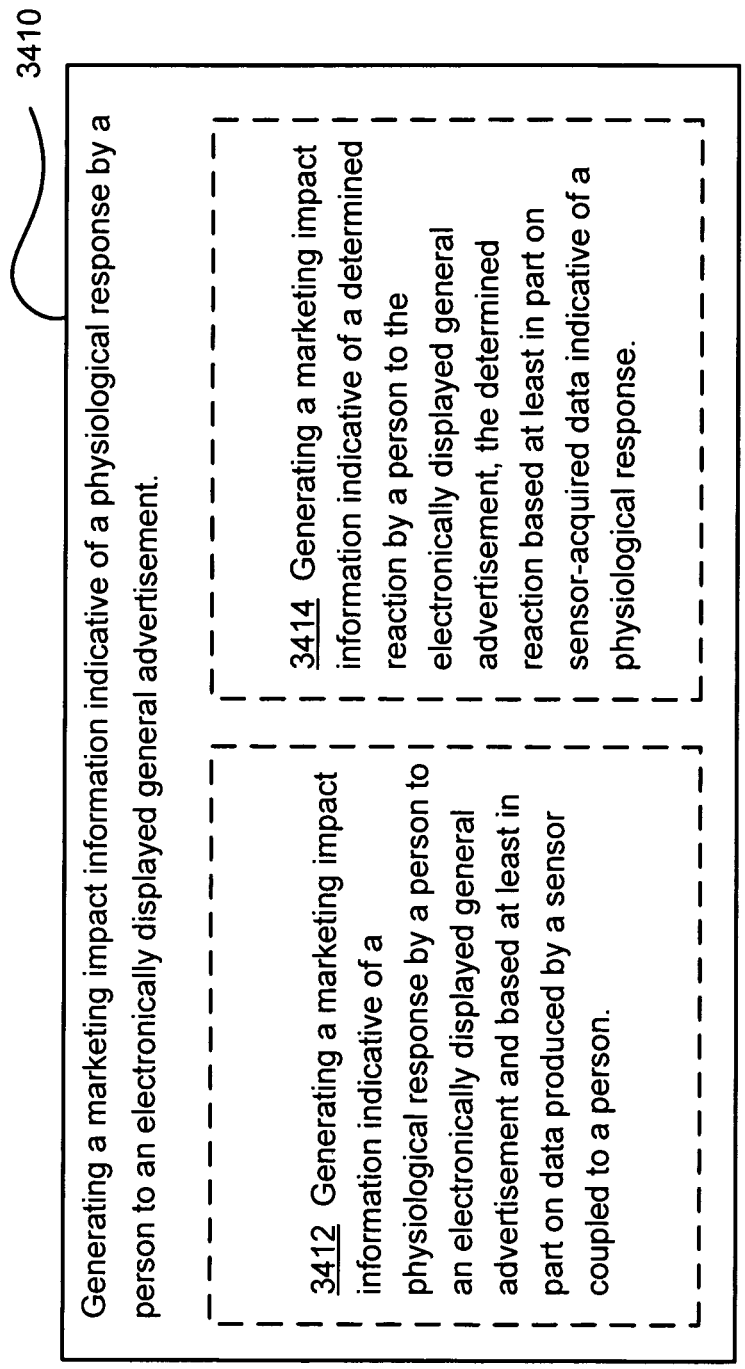
FIG. 55 illustrates another alternative embodiment of the operational flow of FIG. 53.

FIG. 55 illustrates another alternative embodiment of the operational flow 3400 of FIG. 53. The assessment operation 3410 may include at least one additional operation. The at least one additional operation may include an operation 3412, or an operation 3414. The operation 3412 includes generating a marketing impact information indicative of a physiological response by a person to an electronically displayed general advertisement and based at least in part on data produced by a sensor coupled to a person. The operation 3414 includes generating a marketing impact information indicative of a determined reaction by a person to the electronically displayed general advertisement. The determined reaction is based at least in part on sensor-acquired data indicative of a physiological response.

FIG. 56 illustrates a further alternative embodiment of the operational flow 3400 of FIG. 53. The call operation 3430 may include at least one additional operation. The at least one additional operation may include an operation 3432, an operation 3434, or an operation 3436. The operation 3432 includes sending the marketing impact information and a determined characteristic of the electronically displayed general advertisement to an advertising-selector server. The advertising-selector server may include an advertising-selector server 3498. The operation 3434 includes sending the marketing impact information and a received characteristic of the electronically displayed general advertisement to an advertising-selector server. The operation 3436 includes sending the marketing impact information and a request for a targeted-advertisement to an advertising-selector server.

Figure 57:
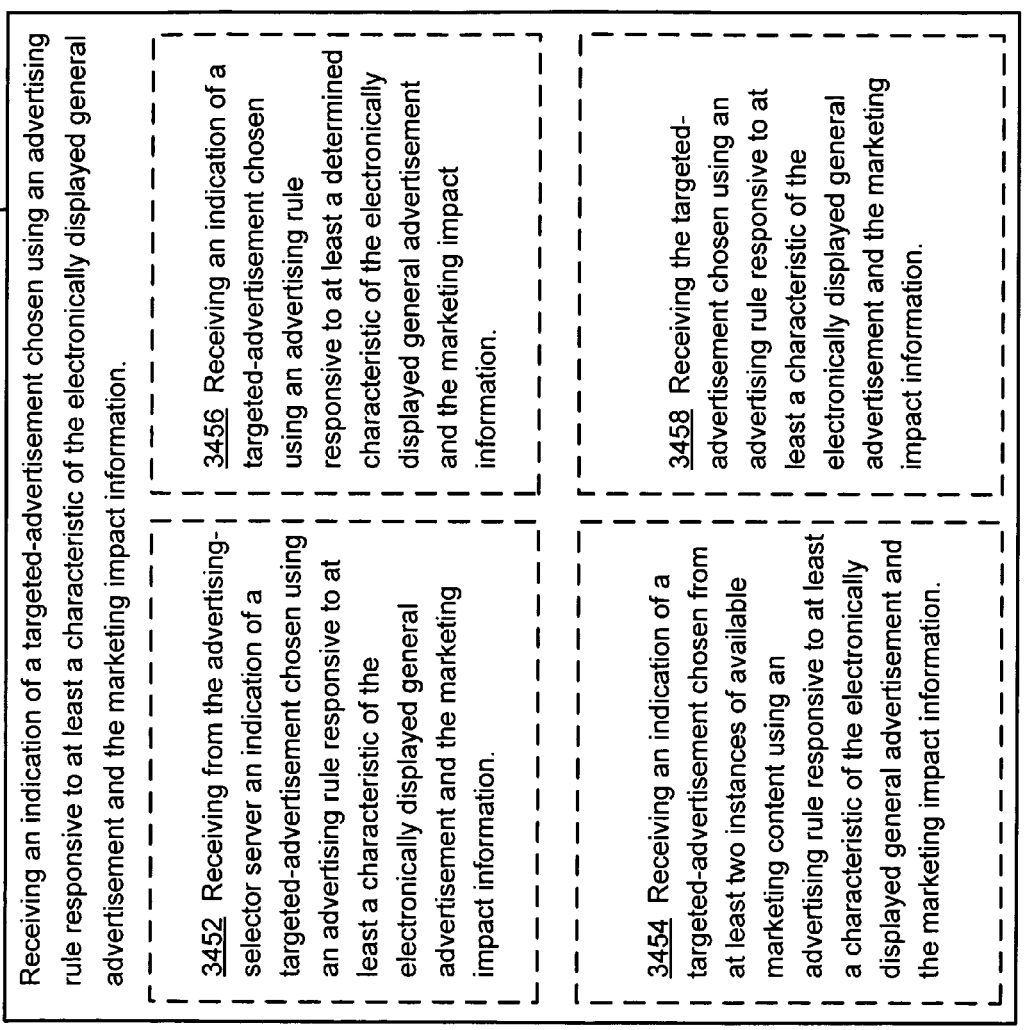
FIG. 57 illustrates an alternative embodiment of the operational flow of FIG. 53.

FIG. 57 illustrates an alternative embodiment of the operational flow 3400 of FIG. 53. The return operation 3450 may include at least one additional operation. The at least one additional operation may include an operation 3452, an operation 3454, an operation 3456, or an operation 3458. The operation 3452 includes receiving from the advertising-selector server an indication of a targeted-advertisement chosen using an advertising rule responsive to at least a characteristic of the electronically displayed general advertisement and the marketing impact information. The operation 3454 includes receiving an indication of a targeted-advertisement chosen from at least two instances of available marketing content using an advertising rule responsive to at least a characteristic of the electronically displayed general advertisement and the marketing impact information. The operation 3456 includes receiving an indication of a targeted-advertisement chosen using an advertising rule responsive to at least a determined characteristic of the electronically displayed general advertisement and the marketing impact information. The operation 3458 includes receiving the targeted-advertisement chosen using an advertising rule responsive to at least a characteristic of the electronically displayed general advertisement and the marketing impact information. In an alternative embodiment, the operation 3458 may include at least one additional operation, such as an operation 3459 (not shown). The operation 3459 includes electronically displaying the targeted-advertisement.

Figure 58:
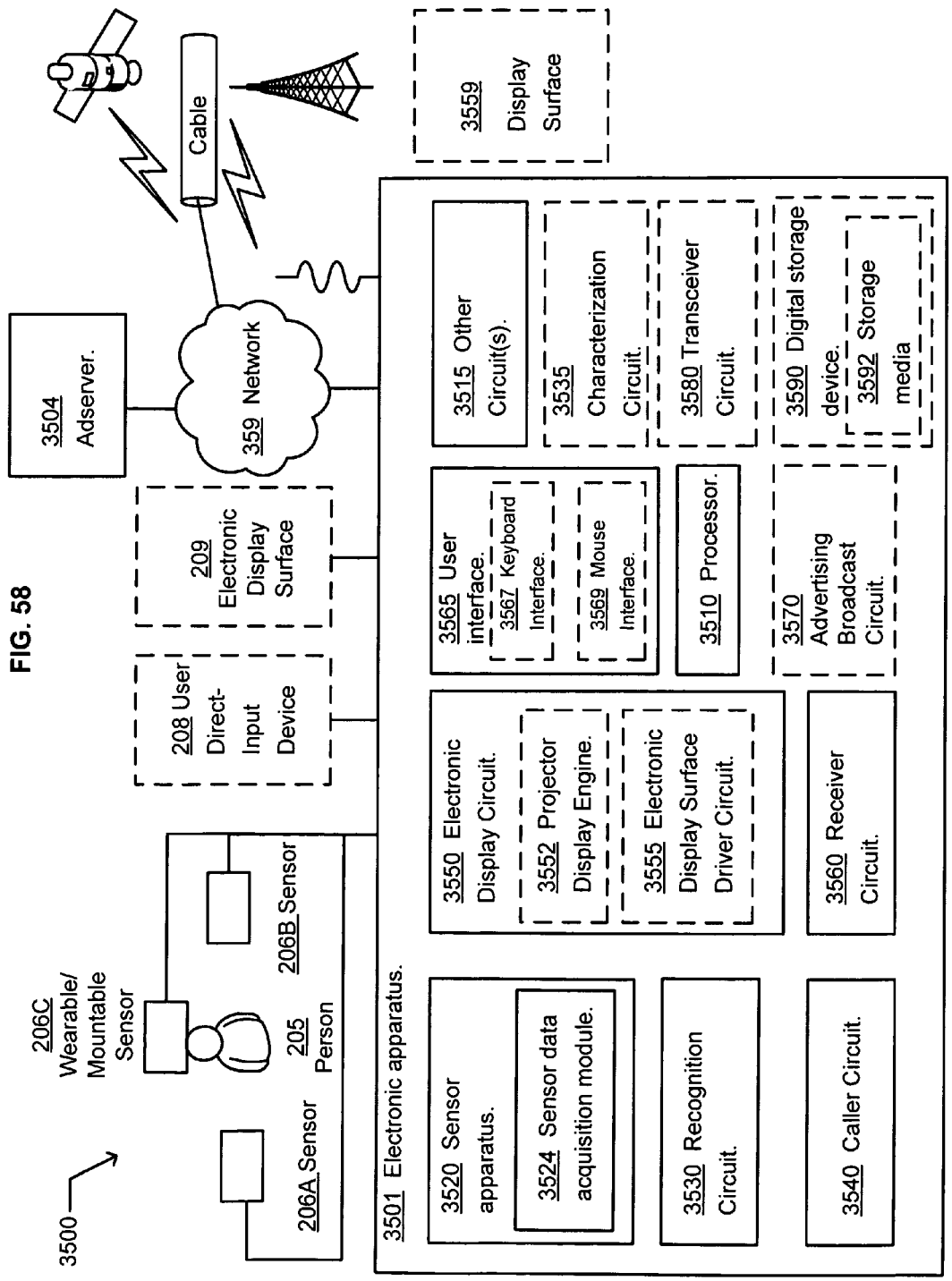
FIG. 58 illustrates an example system.

FIG. 58 illustrates an example system 3500. The system includes an electronic apparatus 3501 that is coupleable to a network 299, and which may be used by a person 205. The electronic apparatus may be coupled to the network via a wired link, illustrated as a cable link, and/or a wireless link illustrated as a satellite link. The system includes a sensor apparatus 3520, a recognition circuit 3530, a caller circuit 3540, an electronic display circuit 3550, and a receiver circuit 3560. In an embodiment, at least one of the sensor apparatus, the recognition circuit, the caller circuit, the electronic display circuit, and the receiver circuit are included in the electronic apparatus. In an embodiment, the electronic apparatus may include the user direct-input device 208. In an alternative embodiment, the electronic apparatus includes at least one of a portable electronic device, or a mobile electronic device.

The sensor apparatus 3520 includes a sensor apparatus operable to acquire data indicative of a physiological response by the person 205 to a general advertisement. The sensor apparatus includes a sensor data acquisition module 3524 and at least one user sensor operable to acquire data indicative of a response by a person to the general advertisement displayed by or on a display surface. The at least one user sensor is illustrated as a sensor 206A, a sensor 206B, and/or a wearable/mountable sensor 206C. The at least one user sensor may be physically incorporated with the electronic device, or may be physically separate from the electronic device and electronically coupled with the device. The general advertisement may include at least one of a static advertisement, such as a billboard, an advertisement displayed on the electronic display surface 209, or an advertisement projected on a display surface 3559. In an embodiment, the sensor apparatus is at least substantially similar to the response sensor apparatus 520 described in conjunction with FIG. 10.

The recognition circuit 3530 includes a recognition circuit operable to generate a marketing impact information about the general advertisement based at least in part on the acquired data indicative of a physiological response by the person to the general advertisement. The caller circuit 3540 includes a caller circuit operable to send a request for a targeted-advertisement. The receiver circuit 3560 includes a receiver circuit operable to receive an indication of a targeted-advertisement selected from at least two instances of available marketing content by a selection engine responsive at least to a characteristic of the general advertisement and the marketing impact information. The electronic display circuit 3550 includes an electronic display circuit operable to present the targeted-advertisement in a manner perceivable by the person.

In an embodiment, the recognition circuit 3530 further includes a feature extraction circuit operable to compute response information based at least in part on the acquired data indicative of a physiological response by the person to the general advertisement. In another embodiment, the recognition circuit further includes a classification circuit operable to classify a reaction by the person to the general advertisement based at least in part on the response information.

In a further embodiment, the caller circuit 3540 includes a caller circuit operable to send a request for a targeted-advertisement to an advertisement server. In another embodiment, the caller circuit includes a caller circuit operable to send a request for a targeted-advertisement and an indication of the characteristic of the general advertisement. In another embodiment, the receiver circuit 3560 includes a receiver circuit operable to receive from an advertising server an indication of a targeted-advertisement selected from at least two instances of available marketing content by a selection engine responsive at least to a characteristic of the general advertisement and the marketing impact information.

In an embodiment, the electronic display circuit 3550 includes an electronic display circuit operable to present the general advertisement and the targeted-advertisement in a manner perceivable by a person. In another embodiment, the electronic display circuit includes an electronic display circuit operable to present electronic content in a manner perceivable by the person and in a manner facilitating sensing a response by the person. In a further embodiment, the electronic display circuit includes an electronic display circuit operable to present the targeted-advertisement in a manner perceivable by at least one of the person's visual, audio, tactile, or olfactory senses.

In another embodiment, the system 3500 includes a characterization circuit 3535 operable to acquire an indication of a characteristic of the general advertisement. The characterization circuit may further include a characterization circuit operable to at least one of receive, or determine an indication of a characteristic of the general advertisement. In a further embodiment, the system includes a digital storage device 3590 operable to save an indication of the selected targeted-advertisement. In an alternative embodiment, the system includes an advertising broadcast circuit 3570 operable to facilitate a display of the selected targeted-advertisement by the electronic display circuit.

FIG. 59 illustrates an example computer program product 3600. The computer program product includes a computer-readable medium 3610 bearing program instructions 3620. The program instructions are operable to perform a process in a computing device. The process includes generating a marketing impact information indicative of a physiological response by a person to an electronically displayed general advertisement and based at least in part on data produced by a sensor coupled to a person 3630. The process also includes sending the marketing impact information to an advertising-selector server 3640. The process further includes receiving an indication of a targeted-advertisement chosen by an advertising rule responsive to at least a characteristic of the electronically displayed general advertisement and the marketing impact information 3650. The process also includes facilitating an electronic display of the targeted-advertisement 3660.

In an alternative embodiment, the process of the program instructions includes facilitating an electronic display of the general advertisement 3692. In another alternative embodiment, the process of the program instructions includes saving an indication of the targeted-advertisement 3694.

In an embodiment, the indication receiving process 3650 of the program instructions includes receiving a targeted-advertisement chosen by an advertising rule responsive to at least a characteristic of the electronically displayed general advertisement and the marketing impact information 3652. In another embodiment, the indication receiving process of the program instructions includes receiving from the advertising-selector server an indication of a targeted-advertisement chosen by an advertising rule responsive to at least a characteristic of the electronically displayed general advertisement and the marketing impact information.

In another embodiment, the computer-readable medium 3610 includes a computer storage medium 3612. In a further embodiment, the computer-readable medium includes a communications medium 3614.

FIG. 60 illustrates an example electronic device 3701. The electronic device includes means 3710 for generating a marketing impact information indicative of a physiological response by a person to an electronically displayed general advertisement and based at least in part on data produced by a sensor coupled to a person. The electronic device also includes means 3720 for sending the marketing impact information to an advertising-selector server. The electronic device further includes means 3730 for receiving an indication of a targeted-advertisement chosen by an advertising rule responsive to at least a characteristic of the electronically displayed general advertisement and the marketing impact information. The electronic device also includes means 3740 for facilitating an electronic display of the targeted-advertisement.

In an alternative embodiment, the electronic device may include at least one additional means. The at least one additional means may include means 3750, means 3760, means 3770, or means 3780. The means 3750 includes means for electronically displaying the targeted-advertisement. The means 3760 includes means for saving the indication of a targeted-advertisement. The means 3770 includes means for determining a characteristic of the electronically displayed general advertisement. The means 3780 includes means for receiving the indication of a targeted-advertisement.

Figure 61:
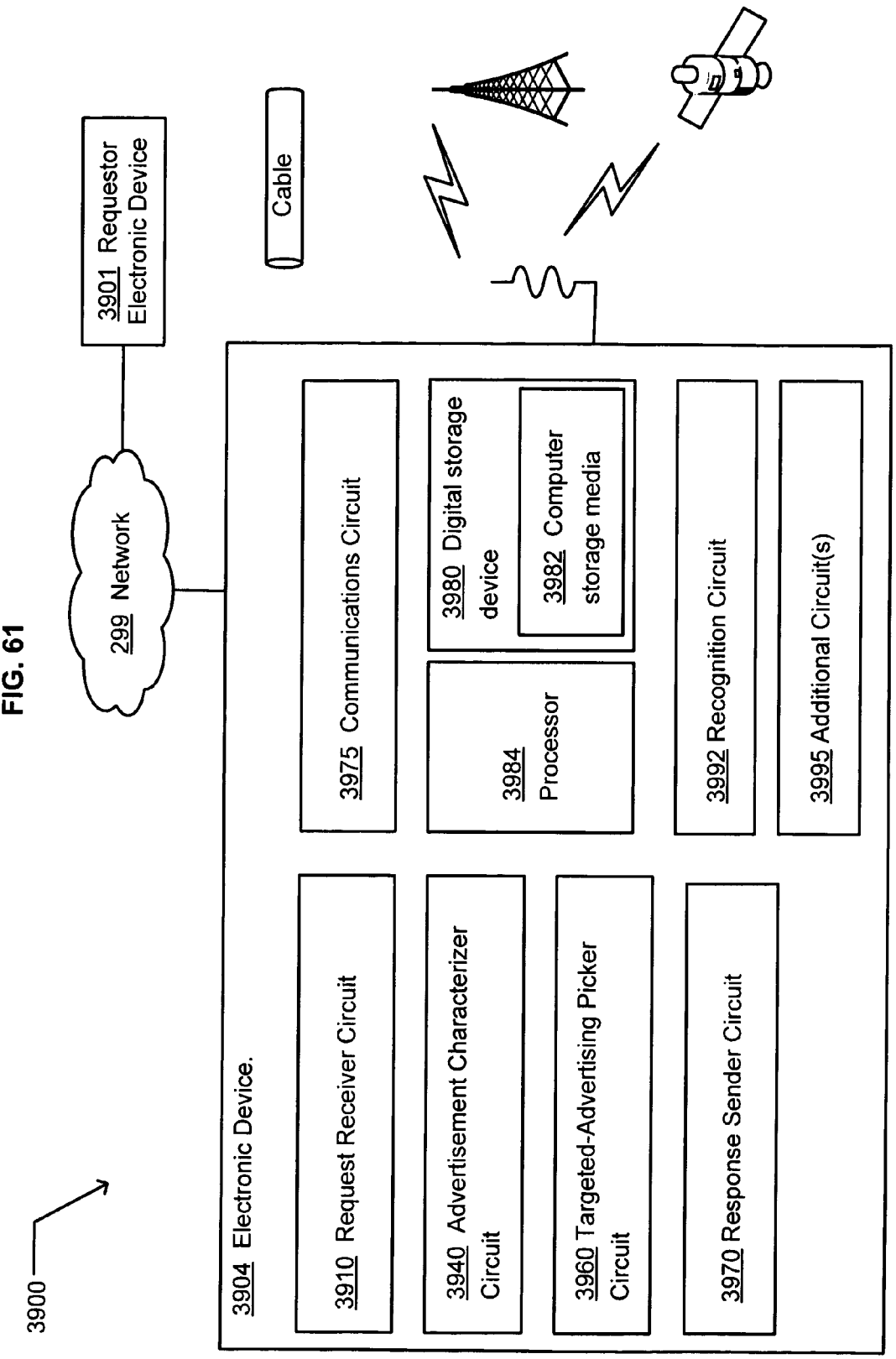
FIG. 61 illustrates an example environment.

FIG. 61 illustrates an example environment 3900. The example environment includes an electronic device 3904. In an embodiment, the electronic device 3904 may include a network server electronic device, or a group of network server electronic devices. In another embodiment, the electronic device may include an advertising server, such as the adserver 3398 of FIG. 52, and/or the adserver 3504 of FIG. 58. The electronic device includes a request receiver circuit 3910, an advertisement characterizer circuit 3940, a targeted-advertising picker circuit 3960, and a response sender circuit 3970.

In an alternative embodiment, the electronic device 3904 may include at least one additional circuit. The at least one additional circuit may include a communications circuit 3975, a recognition circuit 3992, and/or an additional circuit(s) 3995. In addition, the electronic device may include a processor 3984, which may be at least substantially similar to the processing unit 21 described in conjunction with FIG. 1, and/or the processor 120 described in conjunction with FIG. 2. In addition, the electronic device may include a computer storage media illustrated as a digital storage device 3980.

In another embodiment, one or more of the circuits, or the electronic device, or a portion of the electronic device may be implemented using Application Specific Integrated Circuits (ASICs), Field Programmable Gate Arrays (FPGAs), digital signal processors (DSPs), or other integrated formats. In a further embodiment, one or more of the circuits and/or the electronic device may be implemented in hardware, software, and/or firmware.

In an alternative embodiment, the electronic device 3904 may be coupled to the network 299 via a wireless link, a satellite link, and/or a wired link. In another embodiment, the electronic device is operable using the communications circuit 3975 to communicate with other networked electronic devices, such as a server operable to serve advertising and/or other digital content. In a further embodiment, the electronic device is operable to communicate with a requestor electronic device 3901. In an embodiment, the requestor electronic device is operable to acquire information indicative of a physiological response by a person to a general advertisement, such as the electronic device 3301 of FIG. 52, and/or the electronic apparatus 3501 of FIG. 58.

Figure 62:
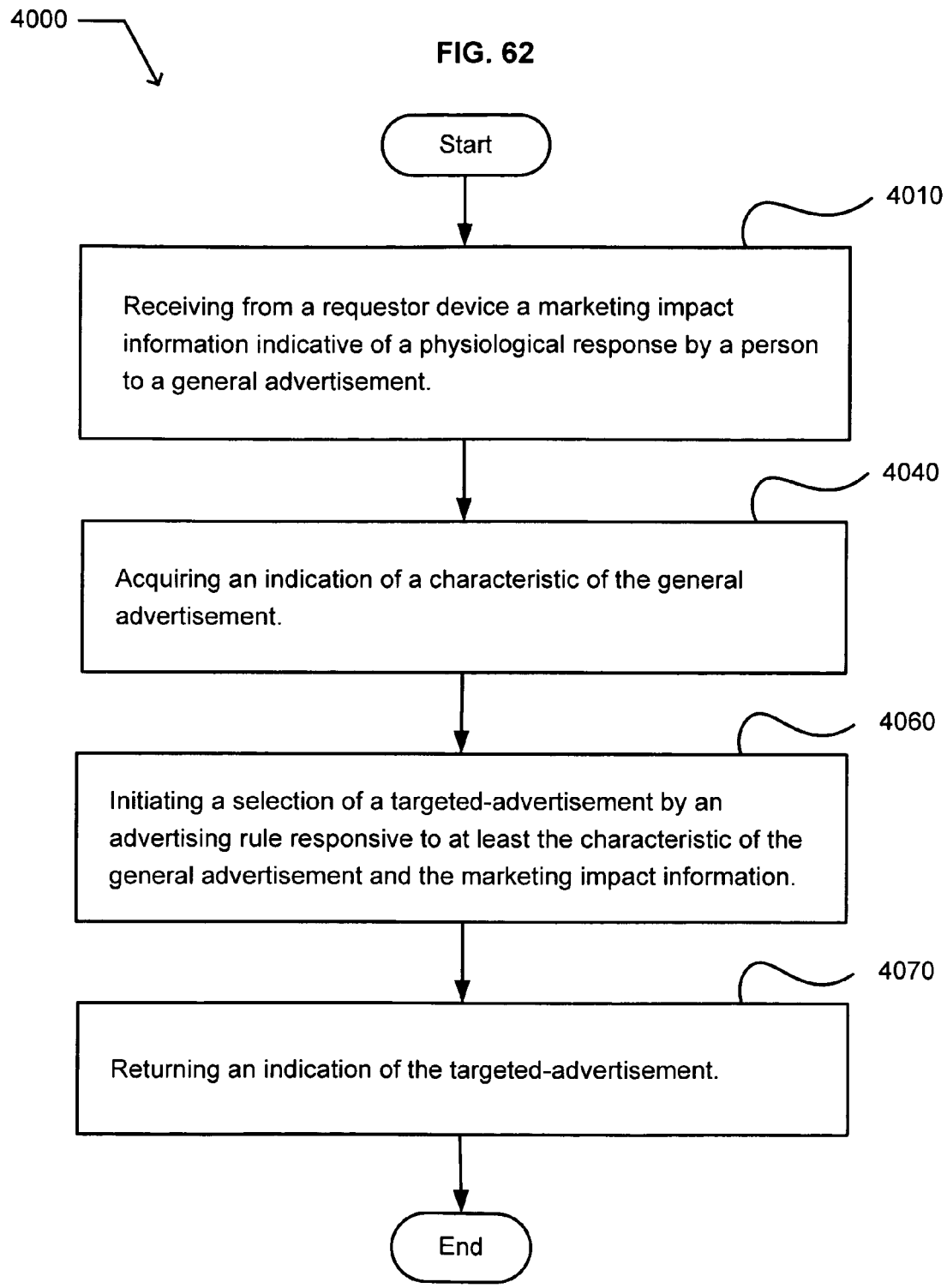
FIG. 62 illustrates an example operational flow.

FIG. 62 illustrates an example operational flow 4000. FIG. 62 and several following figures may include various examples of operational flows, discussions, and explanations with respect to the above-described environment 3900 of FIG. 61, and/or with respect to other examples and contexts. However, it should be understood that the operational flows may be executed in a number of other environments and contexts, and/or in modified versions of FIG. 61. Also, although the various operational flows are illustrated in a sequence(s), it should be understood that the various operations may be performed in other orders than those which are illustrated, and/or may be performed concurrently.

After a start operation, the operation flow 4000 includes an incoming operation 4010. The incoming operation includes receiving from a requestor device a marketing impact information indicative of a physiological response by a person to a general advertisement. The incoming operation may be implemented using the request receiver circuit 3910 of FIG. 61. In an embodiment, the marketing impact information is originated by a requestor electronic device 3901. For example, the requester electronic device may include the electronic device 3301 of FIG. 52, and/or the electronic apparatus 3501 of FIG. 58. A classification operation 4040 includes acquiring an indication of a characteristic of the general advertisement. The classification operation may be implemented using the advertisement characterizer circuit 3940. A choosing operation 4060 includes initiating a selection of a targeted-advertisement by an advertising rule responsive to at least the characteristic of the general advertisement and the marketing impact information. The choosing operation may be implemented using the targeted-advertisement picker circuit 3960. A reply operation 4070 includes returning an indication of the targeted-advertisement. The reply operation may be implemented using the response sender circuit 3970. The operational flow then includes an end operation.

Figure 63:
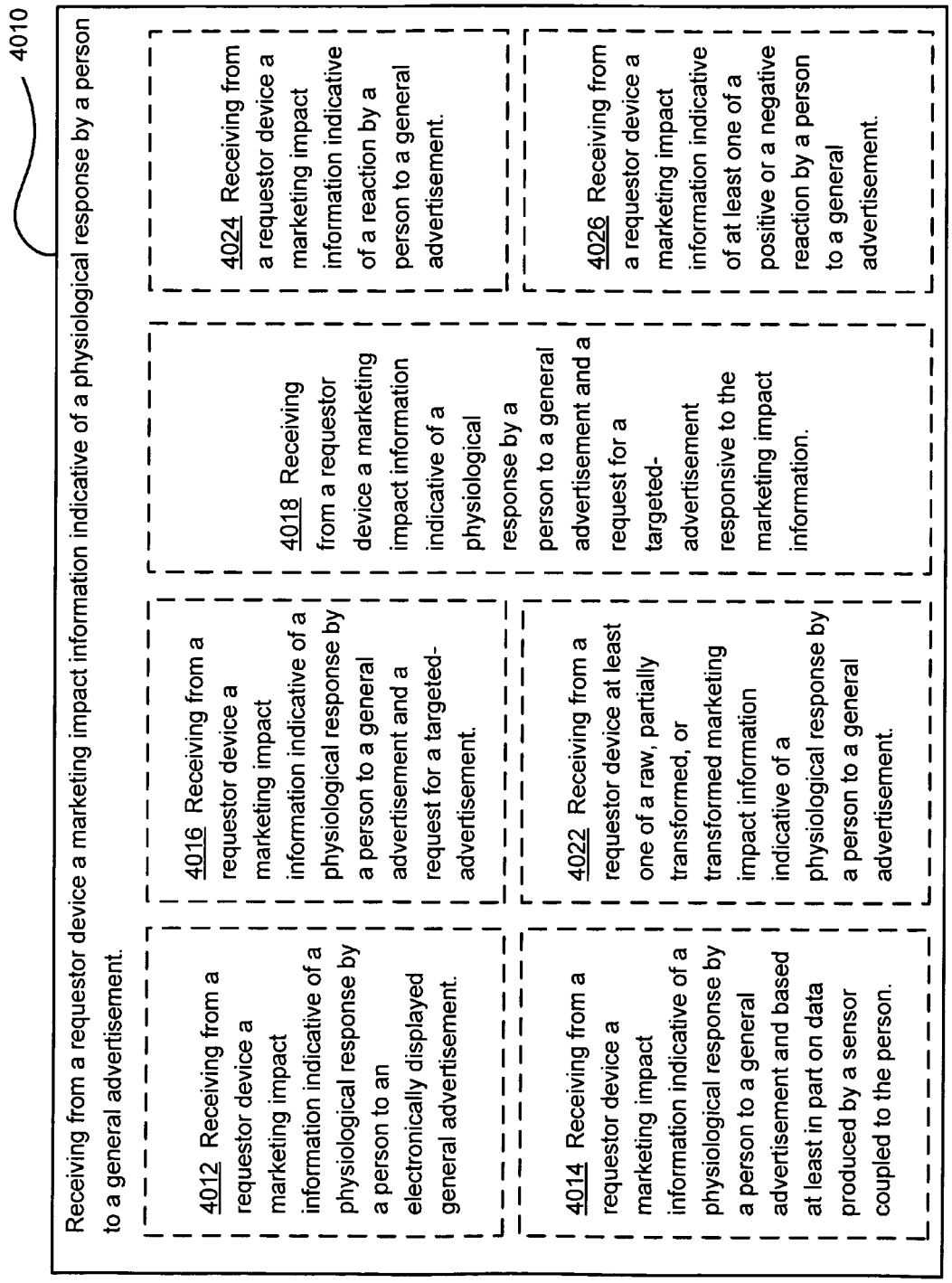
FIG. 63 illustrates an alternative embodiment of the operational flow of FIG. 62.

FIG. 63 illustrates an alternative embodiment of the operational flow 4000 of FIG. 62. The incoming operation 4010 may include at least one additional operation. The at least one additional operation may include an operation 4012, an operation 4014, an operation 4016, an operation 4018, an operation 4022, an operation 4024, or an operation 4026. The operation 4012 includes receiving from a requester device a marketing impact information indicative of a physiological response by a person to an electronically displayed general advertisement. The operation 4014 includes receiving from a requestor device a marketing impact information indicative of a physiological response by a person to a general advertisement and based at least in part on data produced by a sensor coupled to the person. The operation 4016 includes receiving from a requestor device a marketing impact information indicative of a physiological response by a person to a general advertisement and a request for a targeted-advertisement. The operation 4018 includes receiving from a requestor device a marketing impact information indicative of a physiological response by a person to a general advertisement and a request for a targeted-advertisement responsive to the marketing impact information. The operation 4022 includes receiving from a requester device at least one of a raw, partially transformed, or transformed marketing impact information indicative of a physiological response by a person to a general advertisement. The operation 4024 includes receiving from a requestor device a marketing impact information indicative of a reaction by a person to a general advertisement. The operation 4026 includes receiving from a requestor device a marketing impact information indicative of at least one of a positive or a negative reaction by a person to a general advertisement.

Figure 64:
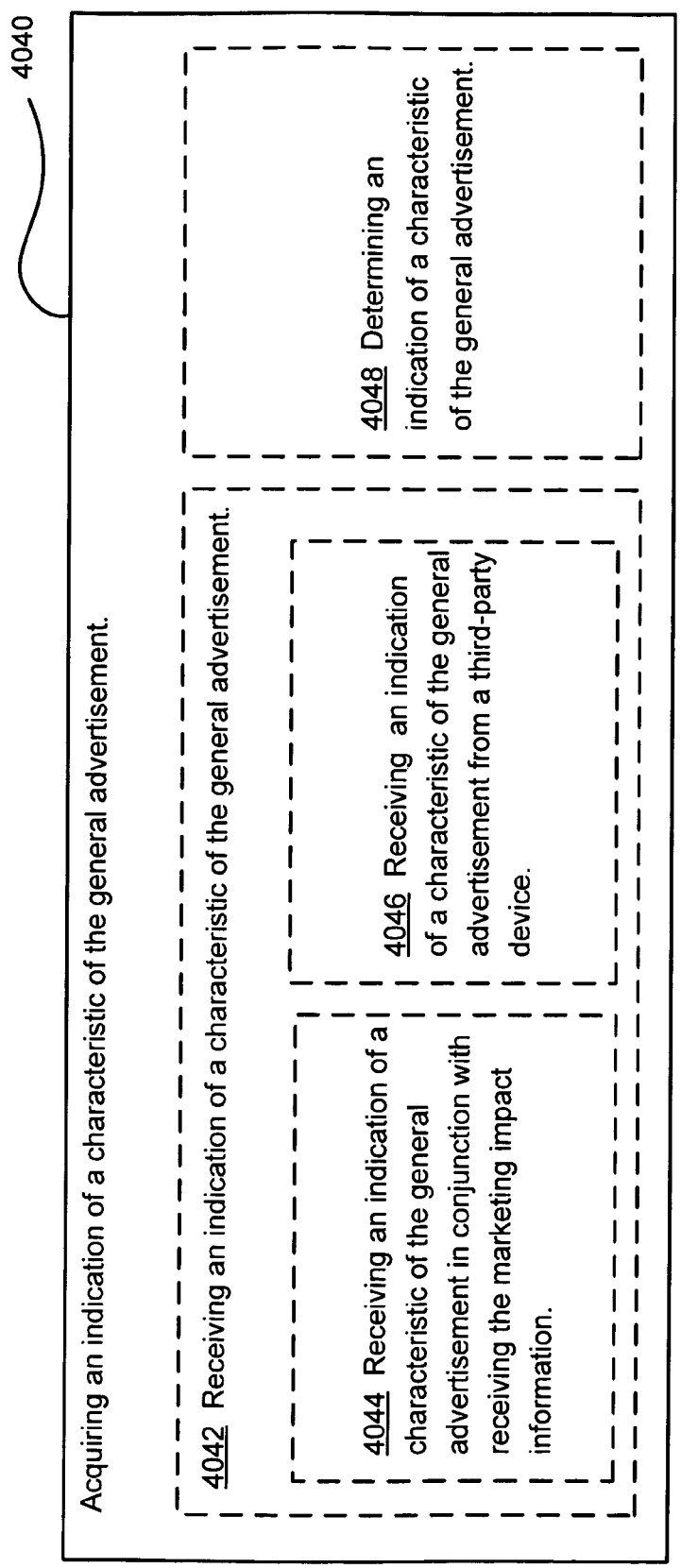
FIG. 64 illustrates another alternative embodiment of the operational flow of FIG. 62.

FIG. 64 illustrates another alternative embodiment of the operational flow 4000 of FIG. 62. The classification operation 4040 may include at least one additional operation. The at least one additional operation may include an operation 4042, or an operation 4048. The operation 4042 includes receiving an indication of a characteristic of the general advertisement. The operation 4048 includes determining an indication of a characteristic of the general advertisement.

The operation 4042 may include at least one additional operation. The at least one additional operation may include an operation 4044, or an operation 4046. The operation 4044 includes receiving an indication of a characteristic of the general advertisement in conjunction with receiving the marketing impact information. The operation 4046 includes receiving an indication of a characteristic of the general advertisement from a third-party device.

Figure 65:
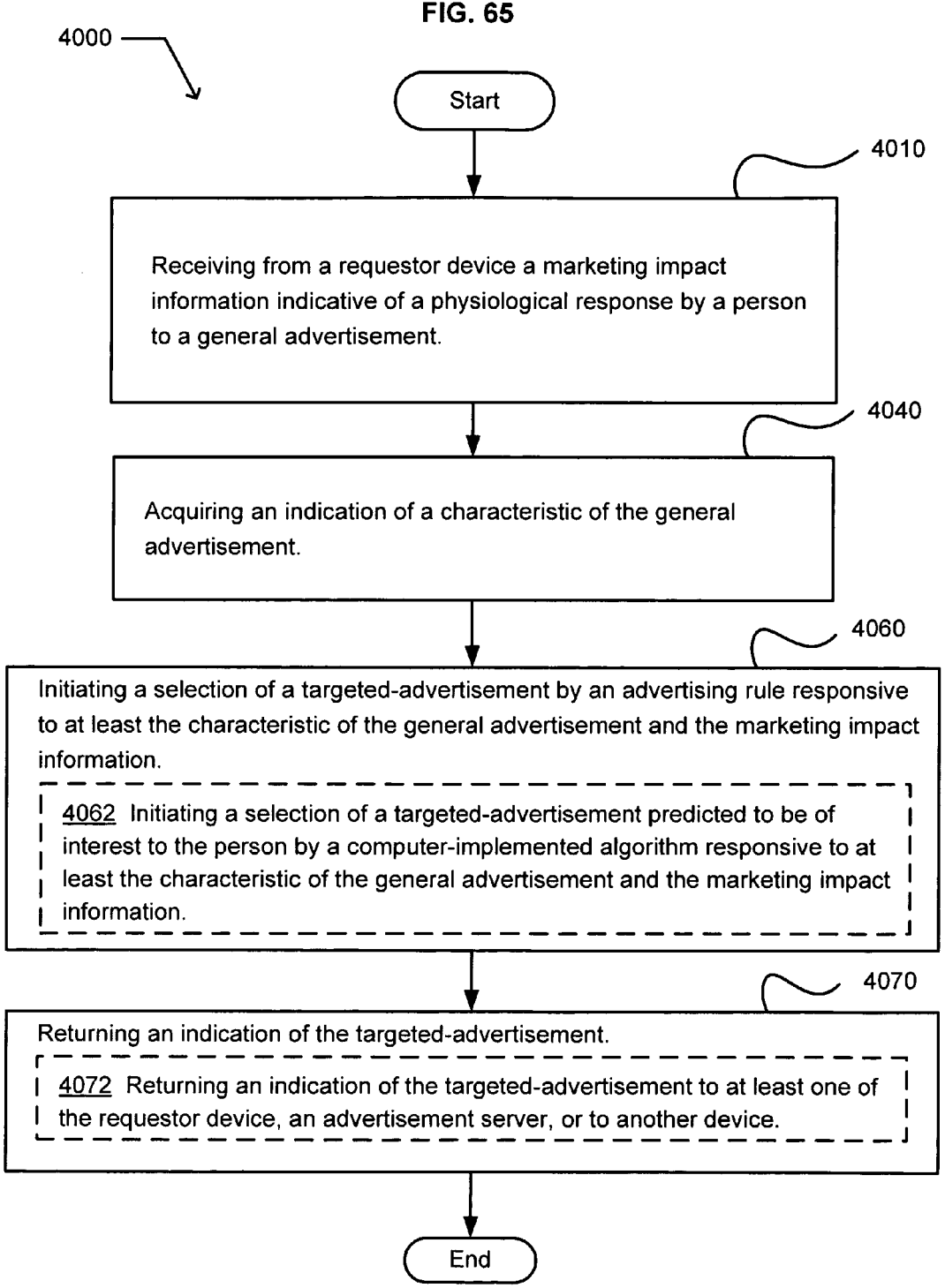
FIG. 65 illustrates a further alternative embodiment of the operational flow of FIG. 62.

FIG. 65 illustrates a further alternative embodiment of the operational flow 4000 of FIG. 62. The choosing operation 4060 may include at least one additional operation, such as the operation 4062. The operation 4062 includes initiating a selection of a targeted-advertisement predicted to be of interest to the person by a computer-implemented algorithm responsive to at least the characteristic of the general advertisement and the marketing impact information. The reply operation 4070 may include at least one additional operation, such as the operation 4072. The operation 4072 includes returning an indication of the targeted-advertisement to at least one of the requestor device, an advertisement server, or to another device.

Figure 66:
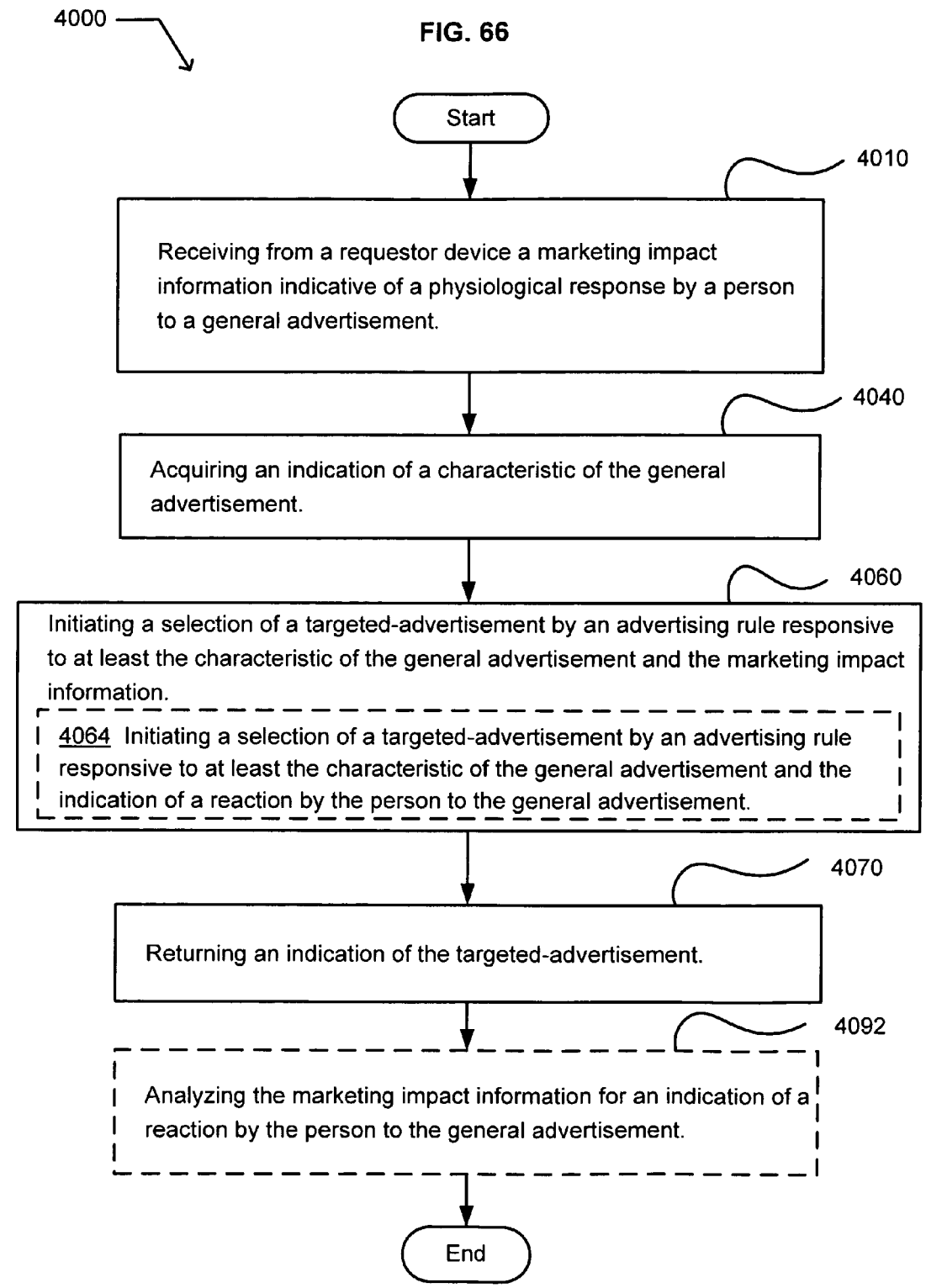
FIG. 66 illustrates an alternative embodiment of the operational flow of FIG. 62.

FIG. 66 illustrates an alternative embodiment of the operational flow 4000 of FIG. 62. The operational flow may include at least one additional operation, such as a recognition operation 4092. The recognition operation includes analyzing the marketing impact information for an indication of a reaction by the person to the general advertisement. The recognition operation may be implemented using the recognition circuit 3992 of FIG. 61. In an alternative embodiment, the choosing operation 4060 may include at least one additional operation, such as an operation 4064. The operation 4064 includes initiating a selection of a targeted-advertisement by an advertising rule responsive to at least the characteristic of the general advertisement and the indication of a reaction by the person to the general advertisement.

Figure 67:
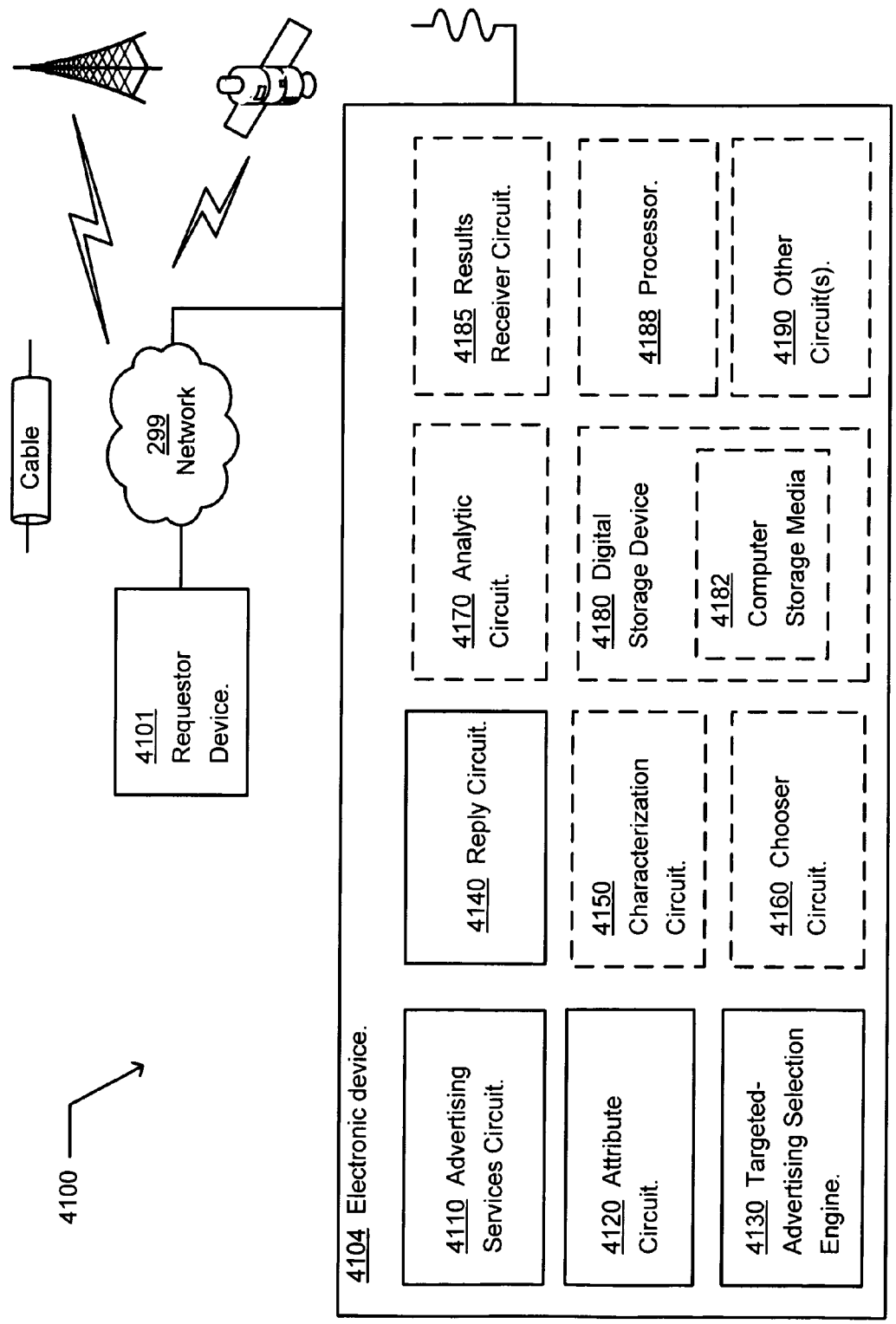
FIG. 67 illustrates an example environment that includes an electronic device.

FIG. 67 illustrates an example environment 4100 that includes an electronic device 4104. In an embodiment, the electronic device 4104 may include a network server electronic device, or a group of network server electronic devices. In another embodiment, the electronic device may include an advertising server, such as the adserver 3398 of FIG. 52, and/or the adserver 3504 of FIG. 58. The electronic device includes an advertising services circuit 4110, an attribute circuit 4120, a targeted-advertising selection engine 4130, and a reply circuit 4140.

In another embodiment, the electronic device 4104 includes at least one additional circuit. The at least one additional circuit may include a characterization circuit 4150, a chooser circuit 4160, an analytic circuit 4170, a digital storage device 4180, a results receiver circuit 4185, a processor 4188, and/or an additional circuit(s) 4190. The processor 4188 may be at least substantially similar to the processing unit 21 described in conjunction with FIG. 1, and/or the processor 120 described in conjunction with FIG. 2. In an embodiment, at least one circuit may be implemented using Application Specific Integrated Circuits (ASICs), Field Programmable Gate Arrays (FPGAs), digital signal processors (DSPs), or other integrated formats. In a further embodiment, one or more of the circuits and/or the electronic device may be implemented in hardware, software, and/or firmware.

In an embodiment, the electronic device 4104 may be coupled to the network 299 via a wireless link, a satellite link, and/or a wired link. In another embodiment, the electronic device is operable to communicate with other networked electronic devices, such as a server operable to serve advertising and/or other digital content. In a further embodiment, the electronic device is operable to communicate with a requestor device 4101. In an embodiment, the requestor electronic device is operable to acquire information indicative of a physiological response by a person to a general advertisement, such as the electronic device 3301 of FIG. 52, and/or the electronic apparatus 3501 of FIG. 58.

The advertising services circuit 4110 includes an advertising services circuit operable to receive from a requestor device a marketing impact information indicative of a physiological response by a person to a general advertisement. In an embodiment, a receipt of the marketing impact information may be considered a request for a targeted-advertisement. In an alternative embodiment, the advertising services circuit may further include an advertising services circuit operable to receive from a requestor device a marketing impact information based at least in part on data produced by a sensor coupled to the person and indicative of a physiological response by a person to a general advertisement. In another alternative embodiment, the advertising services circuit further includes an advertising services circuit operable to receive a marketing impact information based at least in part on data produced by a sensor coupled to the person and indicative of a physiological response by a person to a general advertisement. In a further embodiment, the advertising services circuit further includes an advertising services circuit operable to receive a marketing impact information indicative of a physiological response by a person to a general advertisement, and to transform the marketing impact information to include an indication of a reaction by the person to the general advertisement. In an alternative embodiment, the advertising services circuit further includes an advertising services circuit operable to receive a marketing impact information based at least in part on data produced by a sensor coupled to the person and indicative of a physiological response by a person to a general advertisement, and a request for the targeted-advertisement.

The attribute circuit 4120 includes an attribute circuit operable to obtain an indication of a characteristic of the general advertisement. In an alternative embodiment, the attribute circuit further includes an attribute circuit operable to acquire an indication of a characteristic of the general advertisement. In another embodiment, the attribute circuit further includes an attribute circuit operable to determine an indication of a characteristic of the general advertisement.

The targeted advertising selection engine 4130 includes a targeted-advertising selection engine operable to pick a targeted-advertisement based on at least the indication of a characteristic of the general advertisement and the marketing impact information. The reply circuit 4140 includes a reply circuit operable to return an indication of the targeted-advertisement. In an alternative embodiment, the reply circuit may further include a reply circuit operable to return an indication of the targeted-advertisement to the requestor device. In another alternative embodiment, the reply circuit further includes a reply circuit operable to return an indication of the targeted-advertisement to an advertising server.

Figure 68:
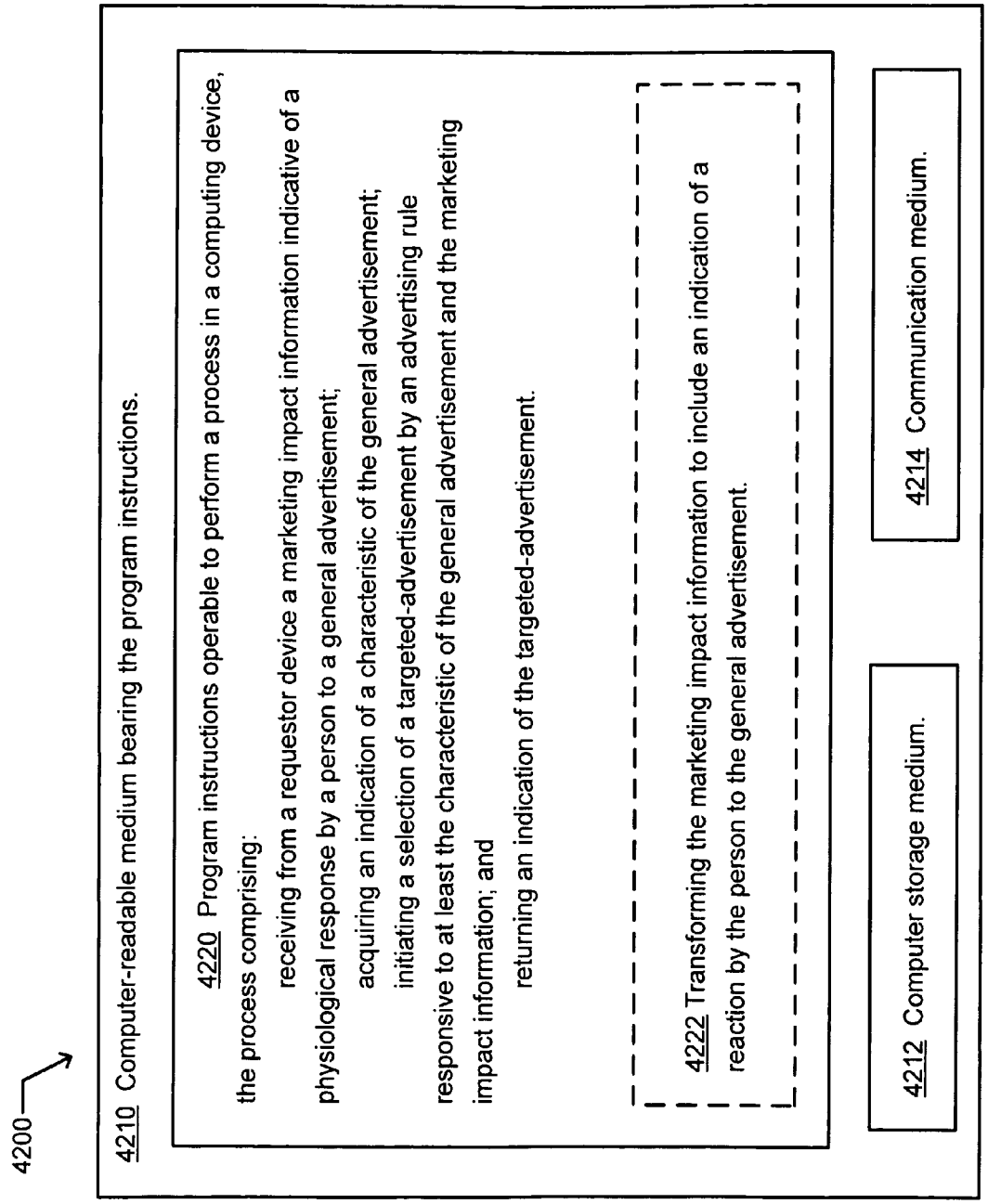
FIG. 68 illustrates an example computer program product.

FIG. 68 illustrates an example computer program product 4200. The computer program product includes a computer-readable medium 4210 bearing program instructions 4220. The program instructions are operable to perform a process in a computing device. The process includes receiving from a requestor device a marketing impact information indicative of a physiological response by a person to a general advertisement. The process also includes acquiring an indication of a characteristic of the general advertisement. The process further includes initiating a selection of a targeted-advertisement by an advertising rule responsive to at least the characteristic of the general advertisement and the marketing impact information. The process also includes returning an indication of the targeted-advertisement. In an alternative embodiment, the process further comprises transforming the marketing impact information to include an indication of a reaction by the person to the general advertisement. In another embodiment, the computer-readable medium includes a computer storage medium 4212. In a further embodiment, the computer-readable medium includes a communications medium 4214.

FIG. 69 illustrates an example system 4300 that includes an electronic device 4305. The electronic device includes means 4310 for receiving from a requester device a marketing impact information indicative of a physiological response by a person to a general advertisement. The electronic device also includes means 4320 for acquiring an indication of a characteristic of the general advertisement. The electronic device further includes means 4330 for initiating a selection of a targeted-advertisement by an advertising rule responsive to at least the characteristic of the general advertisement and the marketing impact information. The electronic device also includes means 4340 for returning an indication of the targeted-advertisement.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a hardware-containing system comprising:
   receiving from a requestor device at least one indication of a physiological response by a person to a general advertisement displayed on a billboard or a poster, the at least one indication indicative of a marketing impact on the person;
   acquiring an indication of a characteristic of the general advertisement displayed on the billboard or the poster including at least:
      capturing, by a camera, an image of the general advertisement displayed on the billboard or the poster;
      determining at least one content attribute of the captured image of the general advertisement by analysis of the image; and
      characterizing the at least one content attribute of the captured image of the general advertisement;
   initiating a selection of a targeted-advertisement based at least partially on the characteristic of the general advertisement and the at least one indication of the physiological response by the person to the general advertisement; and
   returning an indication of the targeted-advertisement, wherein at least one of the acquiring or the initiating are performed by an electronic device.

2. The method of claim 1, wherein the receiving from a requestor device at least one indication of a physiological response by a person to a general advertisement further includes:
   receiving from a requestor device at least one indication of a physiological response by a person to a general advertisement displayed on a billboard or a poster, wherein the physiological response includes at least one of an eye gaze direction, an eye movement, eye dwell time, a movement of an eyelid, an eye blink, a pupil dilation, a lip movement, a brain wave, a heart rate, a respiration rate, or a voice quality response.

3. The method of claim 1, wherein the receiving from a requestor device at least one indication of a physiological response by a person to a general advertisement further includes:
   at least one of:
      obtaining at least one indication of a physiological response by a person to a general advertisement displayed on a billboard or a poster and based at least in part on data produced by a wearable/mountable sensor coupled to the person;
      receiving from a requestor device at least one indication of a physiological response by a person to a general advertisement displayed on a billboard or a poster based at least in part on data produced by a sensor that is worn by the person; or
      receiving from a requestor device at least one indication of a physiological response by a person to a general advertisement displayed on a billboard or a poster based at least in part on data produced by a cell phone that is held by the person.

4. The method of claim 1, wherein the receiving from a requestor device at least one indication of a physiological response by a person to a general advertisement further includes:
   receiving from a requestor device at least one indication of a physiological response by a person to a general advertisement displayed on a billboard or a poster and a request for a targeted-advertisement that is more specific or personalized to the person than the general advertisement displayed on the billboard or the poster.

5. The method of claim 1, wherein the receiving from a requestor device at least one indication of a physiological response by a person to a general advertisement further includes:
   receiving from a requestor device at least one of a raw, partially transformed, or transformed at least one indication of a physiological response by a person to a general advertisement displayed on a billboard or a poster.

6. The method of claim 1, wherein the acquiring an indication of a characteristic of the general advertisement includes:
   capturing, by a camera, an image of the general advertisement displayed on the billboard or the poster;
   determining at least one content attribute of the general advertisement by analysis of the image; and
   characterizing the at least one content attribute of the general advertisement displayed on the billboard or the poster including characterization of at least one of content, subject matter, dialog, cultural, ethnic, linguistic, visual, verbal, sexual, price range, local, global, or brand characteristic.

7. The method of claim 1, wherein the initiating a selection of a targeted-advertisement based at least partially on the characteristic of the general advertisement and the marketing impact information further includes:
   initiating a selection of a targeted-advertisement by a computer-implemented algorithm responsive to at least an indication of expression by the person in response to the characteristic of the general advertisement and the at least one indication of the physiological response by the person to the general advertisement.

8. The method of claim 1, wherein the returning an indication of the targeted-advertisement further includes:
   returning an indication of the targeted-advertisement to at least one of the requestor device, an advertisement server, or to another device.

9. The method of claim 1, further comprising:
   analyzing the physiological response by the person for an indication of a reaction by the person to the general advertisement.

10. An electronic device comprising:
    at least one processing unit including at least:
      an advertising services circuit operable to receive from a requestor device at least one indication of a physiological response by a person to a general advertisement displayed on a billboard or a poster, the at least one indication indicative of a marketing impact on the person;
      an attribute circuit operable to obtain an indication of a characteristic of the general advertisement displayed on the billboard or the poster including at least:
        a camera operable for capturing an image of the general advertisement displayed on the billboard or the poster;
        circuitry configured for determining at least one content attribute of the captured image of the general advertisement by analysis of the image; and
        circuitry configured for characterizing the at least one content attribute of the captured image of the general advertisement;
      a targeted-advertising selection engine operable to select a targeted-advertisement based least partially on the indication of a characteristic of the general advertisement and the at least one indication of the physiological response by the person to the general advertisement; and
      a reply circuit operable to return an indication of the targeted-advertisement.

11. The electronic device of claim 10, further comprising:
    a digital storage device operable to save data indicative of the targeted-advertisement.

12. The electronic device of claim 10, wherein the advertising services circuit further includes:
    an advertising services circuit operable to receive from a requestor device at least one indication based at least in part on data produced by a sensor coupled to the person and indicative of a physiological response indicative of a marketing impact on a person to a general advertisement displayed on a billboard or a poster, wherein the physiological response includes at least one of an eye gaze direction, an eye movement, eye dwell time, a movement of an eyelid, an eye blink, a pupil dilation, a lip movement, a brain wave, a heart rate, a respiration rate, or a voice quality response.

13. The electronic device of claim 10, wherein the advertising services circuit further includes:
    at least one of:
      an advertising services circuit operable to receive at least one indication based at least in part on data produced by a wearable/mountable electronic brain wave sensor coupled to the person and indicative of a physiological response by a person to a general advertisement displayed on a billboard or a poster; or
      an advertising services circuit operable to receive at least one indication based at least in part on data produced by a wearable/mountable sensor coupled to the person and indicative of a physiological response by a person to a general advertisement displayed on a billboard or a poster; or
      an advertising services circuit operable to receive at least one indication of a physiological response by a person to a general advertisement displayed on a billboard or a poster based at least in part on data produced by a cell phone that is held by the person.

14. The electronic device of claim 10, wherein the advertising services circuit further includes:
    an advertising services circuit operable to receive at least one indication of a physiological response by a person to a general advertisement, and to transform the at least one indication to include an indication of a reaction by the person to the general advertisement.

15. The electronic device of claim 10, wherein the attribute circuit includes:
    a camera operable for capturing an image of the general advertisement displayed on the billboard or the poster;
    circuitry configured for determining at least one content attribute of the captured image of the general advertisement by analysis of the image; and
    circuitry configured for characterizing the at least one content attribute of the captured image of the general advertisement into classes including at least one of content, subject matter, dialog, cultural, ethnic, linguistic, visual, verbal, sexual, price range, local, global, or brand characteristic.

16. The electronic device of claim 10, wherein the attribute circuit further includes:
    a camera operable for capturing an image of the general advertisement displayed on the billboard or the poster, wherein the image includes at least one of text, logo, photograph, picture, classified ad, graphic information, static image, placement ad, search advertising, contextual advertising, commercial message, map ad; or a static advertisement;

circuitry configured for determining at least one content attribute of the captured image of the general advertisement by analysis of the image; and circuitry configured for characterizing the at least one content attribute of the captured image of the general advertisement.

17. The electronic device of claim 10, wherein the reply circuit further includes:

a reply circuit operable to return an indication of the targeted-advertisement to the requestor device.

18. The electronic device of claim 10, wherein the reply circuit further includes:

a reply circuit operable to return an indication of the targeted-advertisement to an advertising server.

19. The electronic device of claim 10 wherein the at least one processing unit further comprises:

a response sensor apparatus operable to acquire data indicative of a physiological response by a person to a general advertisement including at least one static advertisement distinct from the electronic device; and a characterization circuit operable to characterize the at least one static advertisement and determine at least one characteristic of the general advertisement based at least in part on the characterization of the at least one static advertisement.

20. The electronic device of claim 10 wherein the attribute circuit further includes:

an analytic circuit operable to determine at least one content attribute of the general advertisement displayed on the billboard or the poster by analysis of the image.

21. The electronic device of claim 10 wherein the attribute circuit further includes:

an analytic circuit operable to determine at least one content attribute of the general advertisement displayed on the billboard or the poster by analysis of the image, the at least one content attribute including at least one of a manufacturer of a product, a color of the product, a model of the product, a style of the product, a category, a tag, a subject, a color, a texture, or a theme attribute indicated in the static advertisement.

22. The electronic device of claim 10 wherein the attribute circuit further includes:

a style analytic circuit operable to determine at least one content attribute of the general advertisement displayed on the billboard or the poster by analysis of the image, the at least one content attribute including at least one of a manufacturer of a product, a color of the product, a model of the product, a style of the product, a category, a tag, a subject, a color, a texture, or a theme attribute indicated in the billboard or the poster.

23. The electronic device of claim 10 wherein the attribute circuit further includes:

a sub-hierarchy analytic circuit operable to determine at least one content attribute of the general advertisement displayed on the billboard or the poster including at least one of a subset, a drilldown, or a step-down in hierarchy.

24. The electronic device of claim 10 wherein the targeted-advertising selection engine comprises:

a query circuit operable to facilitate a search for a focused content using a search parameter corresponding to at least one content attribute of the general advertisement displayed on the billboard or the poster.

25. The electronic device of claim 10 wherein the attribute circuit further includes:

an analytic circuit operable to determine at least one content attribute of the general advertisement displayed on the billboard or the poster by analysis of the image, the at least one content attribute including at least one of content, subject matter, dialog, cultural, ethnic, linguistic, visual, verbal, sexual, price range, local, global, or brand characteristic.

26. The electronic device of claim 10 wherein the attribute circuit further includes:

an analytic circuit operable to determine the indication of at least one content attribute of the general advertisement displayed on the billboard or the poster by analysis of the image, the indication of the at least one content attribute including at least one of content, subject matter, dialog, cultural, ethnic, linguistic, visual, verbal, sexual, price range, local, global, or brand characteristic.

27. The electronic device of claim 10 wherein the targeted-advertising selection engine comprises:

a query circuit operable to facilitate a search via a Web search engine with tools to search through Web sites, images, videos, news, and other categories at least one of a Web database or a Web index for at least one targeted-advertisement corresponding to an indication of expression by the person as the physiological response by the person to the general advertisement displayed on the billboard on the poster; and select the targeted-advertisement from a result of the search.

28. The electronic device of claim 10 wherein the advertising services circuit further includes:

an advertising services circuit operable to receive from a requestor device at least one indication of a physiological response by a person to the general advertisement displayed on a billboard or a poster and based at least in part on data not directly inputted by the person using a user direct-input device.

29. The electronic device of claim 10 wherein the targeted-advertising selection engine comprises:

a query circuit operable to initiate a selection of a targeted-advertisement including determining a content attribute of the targeted-advertisement that is a sub-category of the common contextual attribute of the general advertisement displayed on the billboard or the poster.

30. The electronic device of claim 10 wherein the targeted-advertising selection engine comprises:

a query circuit operable to initiate a selection of a targeted-advertisement including at least performing a search for the targeted-advertisement using a search parameter corresponding to data indicative of a physiological response of the person to the general advertisement and to a contextual attribute common to the general advertisement displayed on the billboard or the poster and the targeted-advertisement.

31. The electronic device of claim 10 wherein the targeted-advertising selection engine comprises:

a query circuit operable to initiate a selection of a targeted-advertisement including at least performing a search using one or more search parameters corresponding to one or more of duration of the person's gaze or the person's electrical brain wave response to the general advertisement displayed on the billboard or the poster.

32. The electronic device of claim 10 wherein the targeted-advertising selection engine comprises:

a query circuit operable to initiate a Web search using a Web search engine including at least one of a product search, a service search, a sporting result search, a news search, a restaurant search, a movie search, or a car repair search.

33. The electronic device of claim 10 wherein the targeted-advertising selection engine comprises:
a query circuit operable to initiate a selection of a targeted-advertisement using at least one search term corresponding to at least the characteristic of the general advertisement displayed on the billboard or the poster, the at least one indication of the physiological response by the person to the general advertisement, and a historical Internet-related behavior of the person.

34. The electronic system of claim 10 wherein the attribute circuit further includes:
an analytic circuit operable to obtain at least one static advertisement via a network communication and perform at least one analytical operation including one or more of machine learning or analysis of the image to determine at least one content attribute of the at least one static advertisement.

35. The electronic system of claim 10 wherein the attribute circuit further includes:
at least one sensor operable to acquire optically based observation data of the person; and
an analytic circuit operable to perform at least one analytical operation including one or more of machine learning or analysis of the image to determine at least one content attribute of at least one static advertisement.

36. The electronic system of claim 10, further comprising:
a wireless link operable to receive an audio-visual transmission including at least one product placement embedded in audio-visual content; and
a response sensor apparatus operable to acquire data indicative of a physiological response by the person to an electronically-displayed general advertisement including the at least one product placement embedded in audio-visual content.

37. The electronic system of claim 10, further comprising:
a wireless receiver operable to receive a cell phone transmission including at least one picture sent by a remote person to the person; and
a response sensor apparatus operable to acquire data indicative of physiological response by the person to an electronically-displayed a general advertisement including the at least one picture sent by a remote person to the person.

38. The electronic system of claim 10, further comprising:
a camera operable to capture an image of at least one of the billboard or the poster; and
a response sensor apparatus operable to acquire data indicative of a physiological response by the person to the general advertisement including the image of at least one of the billboard or the poster.

39. A computer program product comprising:
one or more program instructions operable to perform a process in a computing device, the process including at least:
receiving from a requestor device at least one indication of a physiological response by a person to a general advertisement displayed on a billboard or a poster, the at least one indication indicative of a marketing impact on the person;
acquiring an indication of a characteristic of the general advertisement displayed on the billboard or the poster including at least:
capturing, by a camera, an image of the general advertisement displayed on the billboard or the poster;
determining at least one content attribute of the captured image of the general advertisement by analysis of the image; and
characterizing the at least one content attribute of the captured image of the general advertisement;
initiating a selection of a targeted-advertisement by an advertising rule responsive to at least the characteristic of the general advertisement and the marketing impact information at least one indication of the physiological response by the person to the general advertisement; and
returning an indication of the targeted-advertisement; and
a non-transitory computer-readable storage medium bearing the program instructions.

40. An electronic device comprising:
means for receiving from a requestor device at least one indication of a physiological response by a person to a general advertisement displayed on a billboard or a poster, the at least one indication indicative of a marketing impact on the person;
means for acquiring an indication of a characteristic of the general advertisement displayed on the billboard or the poster including at least:
means for capturing an image of the general advertisement displayed on the billboard or the poster;
means for determining at least one content attribute of the captured image of the general advertisement by analysis of the image; and
means for characterizing the at least one content attribute of the captured image of the general advertisement;
means for initiating a selection of a targeted-advertisement based at least partially on the characteristic of the general advertisement and the at least one indication of the physiological response by the person to the general advertisement; and
means for returning an indication of the targeted-advertisement, and wherein at least one of the means for acquiring or initiating is at least partially implemented using hardware.

* * * * *